US012068677B2

(12) United States Patent
Nishibata et al.

(10) Patent No.: US 12,068,677 B2
(45) Date of Patent: Aug. 20, 2024

(54) DRIVE CIRCUIT FOR POWER CONVERTER

(71) Applicant: DENSO CORPORATION, Kariya (JP)

(72) Inventors: Kouichi Nishibata, Kariya (JP); Masanori Yamamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 17/887,862

(22) Filed: Aug. 15, 2022

(65) Prior Publication Data

US 2022/0393568 A1    Dec. 8, 2022

Related U.S. Application Data

(63) Continuation of application No. PCT/JP2021/003039, filed on Jan. 28, 2021.

(30) Foreign Application Priority Data

Feb. 13, 2020    (JP) .................. 2020-022525

(51) Int. Cl.
*H02M 1/084*    (2006.01)
*H02K 11/20*    (2016.01)
*H02K 11/33*    (2016.01)
*H02M 7/537*    (2006.01)
*H02P 27/06*    (2006.01)
*H02P 29/024*   (2016.01)

(52) U.S. Cl.
CPC ............ *H02M 1/084* (2013.01); *H02K 11/20* (2016.01); *H02K 11/33* (2016.01); *H02M 7/537* (2013.01); *H02P 27/06* (2013.01); *H02P 29/024* (2013.01)

(58) Field of Classification Search
CPC ....... H02M 1/084; H02M 7/537; H02P 27/06; H02P 29/024; H02K 11/20; H02K 11/33
See application file for complete search history.

(56) References Cited

U.S. PATENT DOCUMENTS

| | | | |
|---|---|---|---|
| 2013/0033908 A1 | 2/2013 | Schwarz et al. | |
| 2019/0157969 A1* | 5/2019 | Nishibata | ............... H03K 17/18 |
| 2020/0021185 A1* | 1/2020 | Yamamura | ............... H02M 1/08 |
| 2022/0393504 A1* | 12/2022 | Nishibata | .......... H02M 7/53871 |
| 2023/0006664 A1* | 1/2023 | Inoue | ................... H03K 17/168 |
| 2023/0129767 A1* | 4/2023 | Nishibata | .............. H02P 29/024 |

FOREIGN PATENT DOCUMENTS

| | | |
|---|---|---|
| JP | 6162445 B2 | 7/2017 |
| JP | 2019-122238 A | 7/2019 |

* cited by examiner

*Primary Examiner* — Adolf D Berhane
(74) *Attorney, Agent, or Firm* — Oliff PLC

(57) ABSTRACT

In a control circuit for a power converter applicable to a system including a rotary electric machine, a fail-safe controller performs, in response to determination that there is a failure in the system, a short-circuit control routine that turns on predetermined turn-on arm switches, and turns off predetermined turn-off arm switches. The turn-on arm switches bare one of (i) upper-arm switches and (ii) lower-arm switches, and the turn-off arm switches are the other of (i) the upper-arm switches and (ii) the lower-arm switches. An on determiner detects a drive state of each turn-on arm switch upon determination that the turn-on is instructed for the corresponding turn-on arm switch, and determines, based on the drive state of each turn-on arm switch, whether the turn-on arm switches are switchable to be on in preparation for a short-circuit control routine performed by a short-circuit controller.

15 Claims, 22 Drawing Sheets

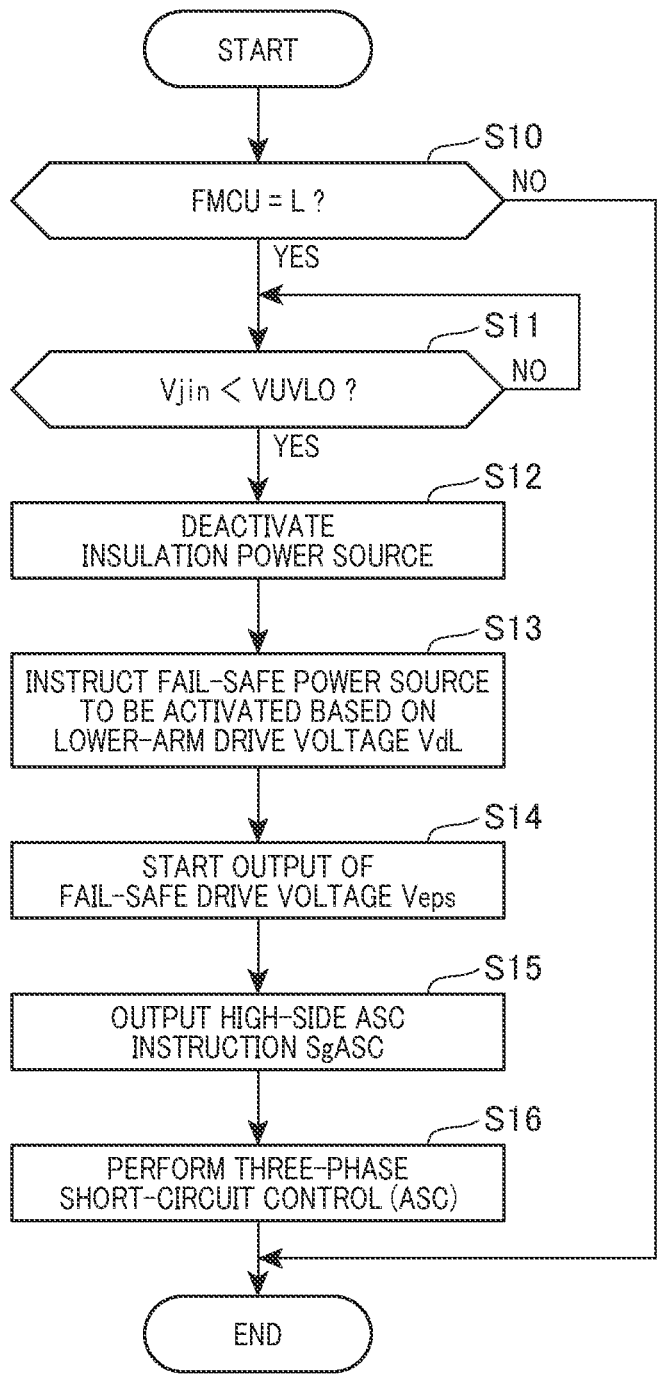

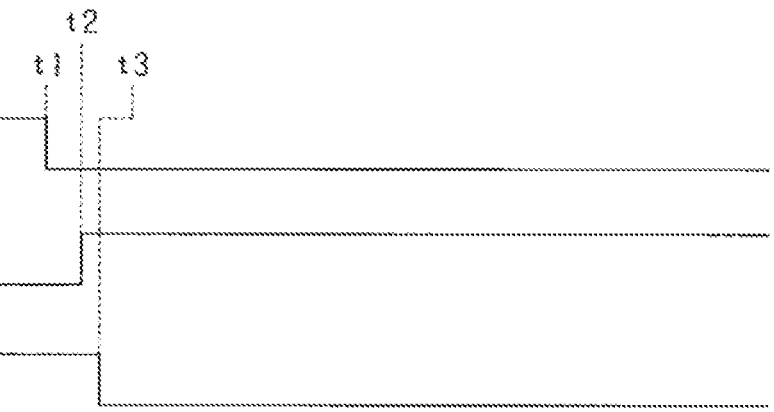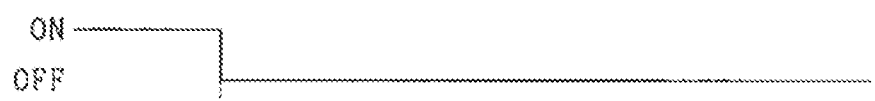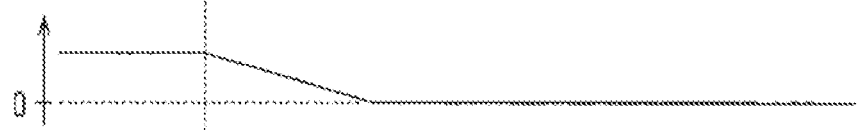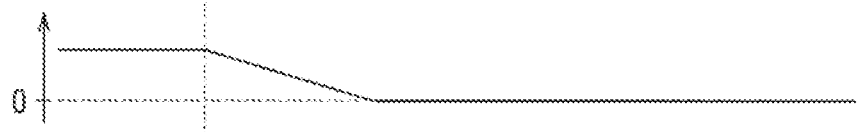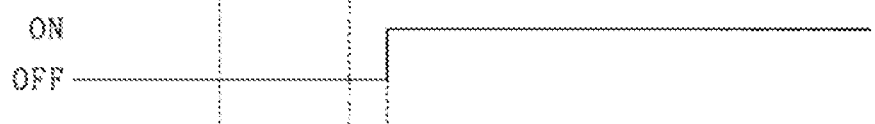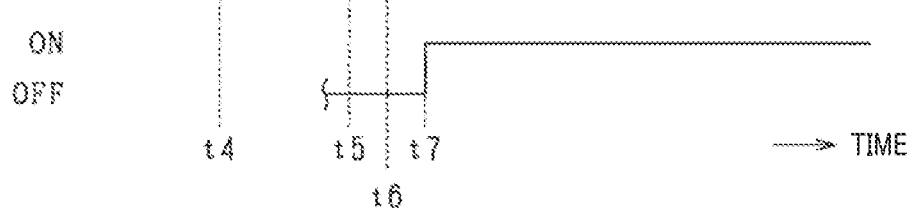

VB

VHin

LOW-VOLTAGE POWER SOURCE

MICROCOMPUTER

VdH, VdL

Veps

DRIVE CIRCUIT FOR POWER CONVERTER

CROSS REFERENCE TO RELATED APPLICATION

The present application is a bypass continuation application of a currently pending international application No. PCT/JP2021/003039 filed on Jan. 28, 2021 designating the United States of America, the entire disclosure of which is incorporated herein by reference, the internal application being based on and claiming the benefit of priority of Japanese Patent Application No. 2020-022525 filed on Feb. 13, 2020. The disclosure of the Japanese Patent Application No. 2020-022525 is incorporated in its entirety herein by reference.

TECHNICAL FIELD

The present disclosure relates to control circuits for a power converter that includes predetermined pairs of upper- and lower-arm switches; each pair of upper- and lower-arm switches is electrically connected to a corresponding one of predetermined phase windings of a rotary electric machine.

BACKGROUND

Such a control circuit can perform a short-circuit control task that turns on or keeps on one of the upper- and lower-arm switches of each pair while turns off or keeps off the other of the upper- and lower-arm switches of the corresponding pair.

SUMMARY

An exemplary aspect of the present disclosure provides a control circuit for a power converter applicable to a system including a rotary electric machine. In the control circuit, a fail-safe controller performs, in response to determination that there is a failure in the system, a short-circuit control routine that turns on predetermined turn-on arm switches, and turns off predetermined turn-off arm switches. The turn-on arm switches bare one of (i) upper-arm switches and (ii) lower-arm switches, and the turn-off arm switches are the other of (i) the upper-arm switches and (ii) the lower-arm switches. An on determiner included in the control circuit detects a drive state of each turn-on arm switch upon determination that the turn-on is instructed for the corresponding turn-on arm switch, and determines, based on the drive state of each turn-on arm switch, whether the turn-on arm switches are switchable to be on in preparation for a short-circuit control routine performed by a short-circuit controller.

BRIEF DESCRIPTION OF THE DRAWINGS

Other aspects of the present disclosure will become apparent from the following description of embodiments with reference to the accompanying drawings in which:

FIG. 5 is a flowchart schematically illustrating a three-phase short-circuit control routine carried out in response to a high-side ASC instruction;

FIGS. 6A to 6I are a joint timing chart schematically illustrating how an example of the three-phase short-circuit control routine carried out is carried out;

DETAILED DESCRIPTION OF EMBODIMENTS

Figure 1:
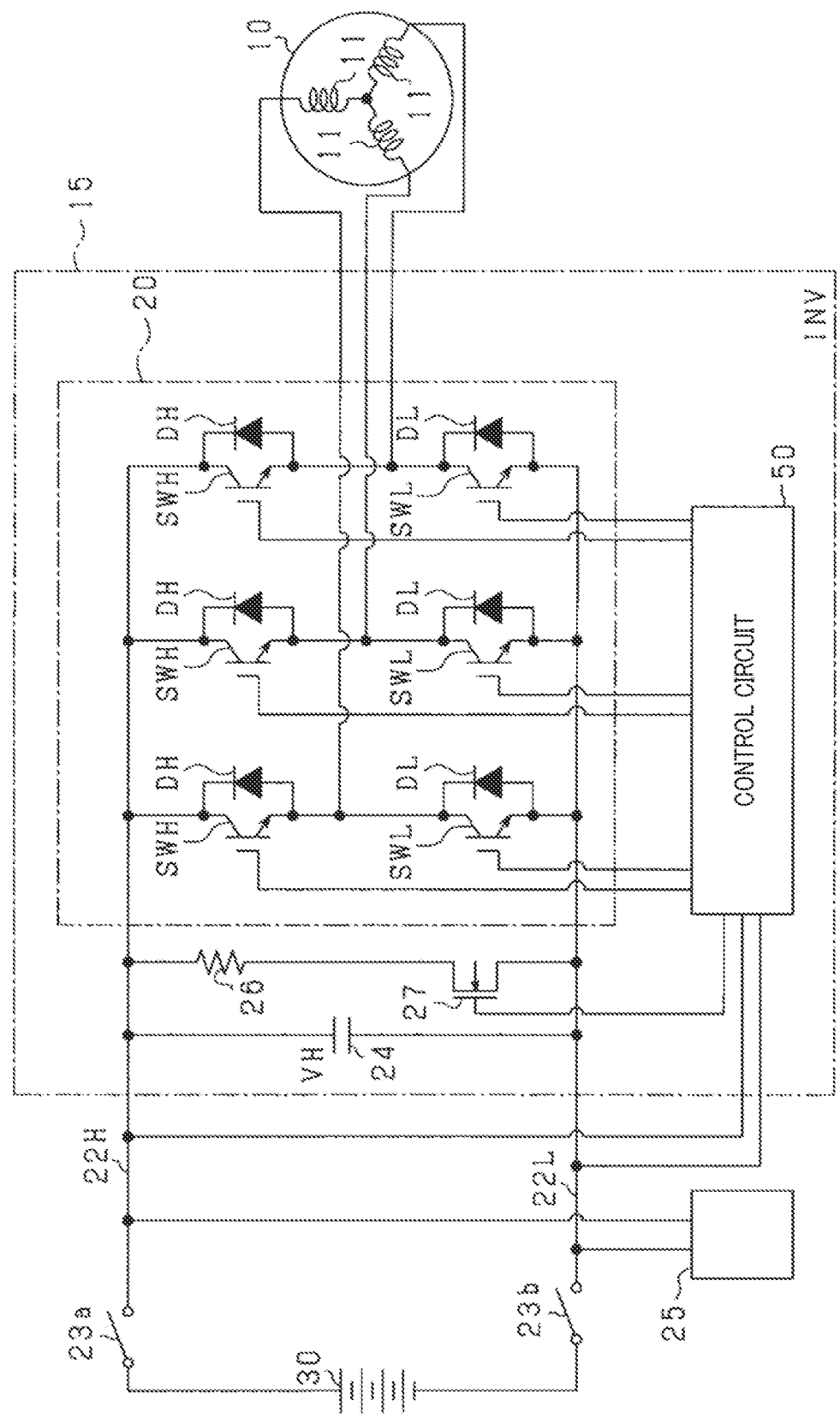
FIG. 1 is an overall structural diagram of a power control system according to the first embodiment of the present disclosure.

A know power control system includes a rotary electric machine including multiphase windings, a power converter including plural pairs of upper- and lower-arm switches, and a control circuit for controlling the upper- and lower-arm switches of each pair. Each pair of upper- and lower-arm switches is electrically connected to a corresponding one of the multiphase windings. Diodes are connected in antiparallel to the respective upper- and lower-arm switches.

The control circuit can perform shutdown control that forcibly shuts down, i.e., turns off, each pair of upper- and lower-arm switches upon determination that there is a failure in, for example, the rotary electric machine constituting the system.

Let us consider a situation where, when the control circuit performs the shutdown control, a counter electromotive voltage is generated across any one phase winding of the multiphase windings based on rotation of a magnetic rotor of the rotary electric machine.

In this situation, the counter electromotive voltage may cause a line voltage between any two-phase windings to become higher than a voltage across a power storage device that is connected in parallel to each pair of upper- and lower-arm switches, i.e., is connected to one of input/output (I/O) portions of the power converter. The reason why the line voltage becomes higher than the voltage across the power storage device is because, for example, the amount of magnetic flux created by the magnetic rotor is large and/or the rotational speed of the rotor is high.

The line voltage between any two-phase windings, which is higher than the voltage across the power storage device, may cause a current induced through the two-phase windings to flow, as a regenerative current, through a closed loop comprised of the two-phase windings, diodes connected in antiparallel to the corresponding switches, and the power storage device. This greatly increases a direct-current (DC) voltage across the I/O portion of the power converter connected to the power storage device. This may cause at least one of the power storage device, the power converter, and other devices connected to the power storage device to have failed.

In order to address such an issue, a known control circuit, which is disclosed in Japanese Unexamined Patent Application Publication (Translation of PCT Application) No. 2013-506390, performs the short-circuit control task described above. Specifically, the short-circuit control turns on or keeps on one of the upper- and lower-arm switches of each pair while turning off or keeping off the other of the upper- and lower-arm switches of the corresponding pair.

A failure in the system, which makes it difficult for the control circuit to perform the short-circuit control task, may result in a great increase in the DC voltage across the I/O portion connected to the power storage device without any hold-down measure of the great increase in the DC voltage.

From this viewpoint, the present disclosure seeks to provide control circuits for a power converter in such a power control system, each of which is capable of determining whether to perform the short-circuit control task normally in preparation for a failure in the power control system.

A first exemplary measure of the present disclosure provides a control circuit for a power converter applicable to a system in which a power storage unit and a rotary electric machine including multiphase windings are provided. The power converter includes multiphase switch modules, and each of the switch modules includes a pair of an upper-arm switch and a lower-arm switch. The upper-arm switch and the lower-arm switch of each phase switch module are electrically connected to a corresponding one of the multiphase windings.

The control circuit includes a switching instruction generator configured to generate switching instructions for the respective upper- and lower-arm switches for drive control of the rotary electric machine. Each switching instruction instructs turn-on or turn-off of the corresponding switch. The control circuit includes a switch driver configured to perform a drive operation that turns on or off the respective upper- and lower-arm switches based on the respective switching instructions. The control circuit includes a failure determiner configured to determine whether there is a failure in the system. The control circuit includes a fail-safe controller configured to perform, in response to determination that there is a failure in the system, a short-circuit control routine that turns on predetermined turn-on arm switches, and turns off predetermined turn-off arm switches. The turn-on arm switches are one of (i) the upper-arm switches and (ii) the lower-arm switches, and the turn-off arm switches are the other of (i) the upper-arm switches and (ii) the lower-arm switches.

The control circuit includes an on determiner. The on determiner is configured to detect a drive state of each turn-on arm switch upon determination that the turn-on is instructed for the corresponding turn-on arm switch by the switching instruction generator. The on determiner is configured to determine, based on the drive state of each turn-on arm switch, whether the turn-on arm switches are switchable to be on in preparation for the short-circuit control routine performed by the short-circuit controller.

A second exemplary measure of the present disclosure provides a control circuit for a power converter applicable to a system in which a power storage unit and a rotary electric machine including multiphase windings are provided. The power converter includes multiphase switch modules, and each of the switch modules includes a pair of an upper-arm switch and a lower-arm switch. The upper-arm switch and the lower-arm switch of each phase switch module are electrically connected to a corresponding one of the multiphase windings.

The control circuit includes a switching instruction generator configured to generate switching instructions for the respective upper- and lower-arm switches for drive control of the rotary electric machine. Each switching instruction instructs turn-on or turn-off of the corresponding switch. The control circuit includes a switch driver configured to perform a drive operation that turns on or off the respective upper- and lower-arm switches based on the respective switching instructions. The control circuit includes a failure determiner configured to determine whether there is a failure in the system. The control circuit includes a fail-safe controller configured to perform, in response to determination that there is a failure in the system, a short-circuit control routine that turns on predetermined turn-on arm switches, and turns off predetermined turn-off arm switches. The turn-on arm switches are one of (i) the upper-arm switches and (ii) the lower-arm switches, and the turn-off arm switches are the other of (i) the upper-arm switches and (ii) the lower-arm switches.

The control circuit includes an off determiner. The off determiner is configured to detect a drive state of each turn-off arm switch. The off determiner is configured to determine, based on the drive state of each turn-off arm switch, whether the turn-off arm switches are switchable to be off in preparation for the short-circuit control routine performed by the short-circuit controller.

Each of the first and second exemplary measures makes it possible to accurately determine whether successful execution of the short-circuit control is established in preparation for a determination that there is a failure in the system.

In accordance with the above exemplary measures, the following describes embodiments of the present disclosure with reference to the accompanying drawings; each embodiment embodies a corresponding one of various drive circuits included in the present disclosure. In the embodiments, like parts between the embodiments, to which like reference characters are assigned, are omitted or simplified to avoid redundant description.

First Embodiment

The following describes a control circuit according the first embodiment with reference to FIGS. 1 to 11; the control circuit according to the first embodiment is embodied as a control circuit for a three-phase inverter 15 as a power converter. A power control system including a rotary electric machine 10 and the inverter 15 is installed in a vehicle, such as an electric vehicle or a hybrid vehicle.

Referring to FIG. 1, the power control system includes the rotary electric machine 10 and the inverter 15.

The rotary electric machine 10 serves as a main engine in the vehicle, and includes a rotor that is coupled to one or more driving wheels of the vehicle while rotational power is transferrable between the rotor and the one or more driving wheels. The power control system of the first embodiment uses a synchronous motor, more specifically a permanent magnet synchronous motor as the rotary electric machine 10.

The inverter 15 includes a switching device 20 and a control circuit 50. The switching device 20 is comprised of three-phase (UVW-phase) series-connected switch modules; the series-connected switch module for each phase is comprised of a switch SWH of an upper-arm and a switch SWL of a lower-arm switch connected in series to each other.

The connection point between the upper- and lower-arm switches SWH and SWL for each phase is connected to a first end of the corresponding one of three-phase stator windings 11. Opposite second ends of the three-phase windings 11 are connected to a common junction, i.e., a neutral point such that three-phase windings 11 have a phase difference of 120 electrical degrees from each other.

The first embodiment uses, as each of the upper- and lower-arm switches SWH and SWL, an IGBT selected from various types of voltage-controlled semiconductor switches.

The switching device 20 is comprised of upper-arm diodes DH serving as flyback diodes are connected in antiparallel to the respective upper-arm switches SWH. Similarly, the switching device 20 is comprised of lower-arm diodes DL serving as flyback diodes connected in antiparallel to the respective lower-arm switches SWL.

The power control system includes a high-voltage power source 30 having positive and negative terminals. The collector, serving as a high-potential terminal, of each upper-arm switch SWH is connected to the positive terminal of the high-voltage power source 30 through a high-voltage electrical path 22H. Similarly, the emitter, serving as a low-potential terminal, of each lower-arm switch SWL is connected to the negative terminal of the high-voltage power source 30 through a low-voltage electrical path 22L. The first embodiment uses a secondary battery as the high-voltage power source 30. The secondary battery as the high-voltage power source has an output voltage, i.e., a rated voltage of, for example, 100 volts (V) or above.

The power control system includes a first shutoff switch 23a mounted on the high-voltage electrical path 22H, and a second shutoff switch 23b mounted on the low-voltage electrical path 22L. Each of the first and second shutoff switches 23a and 23b is comprised of, for example, a relay switch or a semiconductor switch. The control circuit 50 included in the inverter 15 can be configured to turn on or off each of the first and second shutoff switches 23a and 23b or a higher-level ECU, which is higher in level than the control circuit 50, can be configured to turn on or off each of the first and second shutoff switches 23a and 23b The inverter 15 includes a smoothing capacitor 24 that serves as a power storage unit. The smoothing capacitor 24 is arranged to electrically connect between a first point on the high-voltage electrical path 22H and a second point on the low-voltage electrical path 22L; the first point is located to be closer to the switching device 20 than the first shutoff switch 23a is, and the second point is located to be closer to the switching device 20 than the second shutoff switch 23b is.

The power control system includes vehicular electrical devices 25, which include at least one of, for example, a power compressor and a DC-DC converter. The power compressor constitutes an air-conditioning system installed in the vehicle, and is energized by the high-voltage power source 30 to circulate a refrigerant in a refrigeration cycle of the air-conditioning system. The DC-DC converter is configured to lower the output voltage of the high-voltage power source 30, and supply a lowered output voltage to low-voltage loads that include, for example, a low-voltage power source 31 (see FIG. 2). The low-voltage power source 31 according to the first embodiment is a secondary battery, such as a lead-acid storage battery, which has an output voltage, i.e., a rated voltage, lower than the output voltage of the high-voltage battery 30. For example, the secondary battery has an output voltage, i.e., the rated voltage, of, for example, 12 V.

The inverter 15 includes a discharge resistor 26 and a discharge switch 27, which are connected in series to each other. The series-connected circuit component comprised of the discharge resistor 26 and the discharge switch 27 is arranged to electrically connect between a third point on the high-voltage electrical path 22H and a fourth point on the low-voltage electrical path 22L; the third point is located to be closer to the switching device 20 than the first shutoff switch 23a is, and the fourth point is located to be closer to the switching device 20 than the second shutoff switch 23b is.

The control circuit 50 is configured to instruct the discharge switch 27 to be turned on or turned off.

Figure 2:
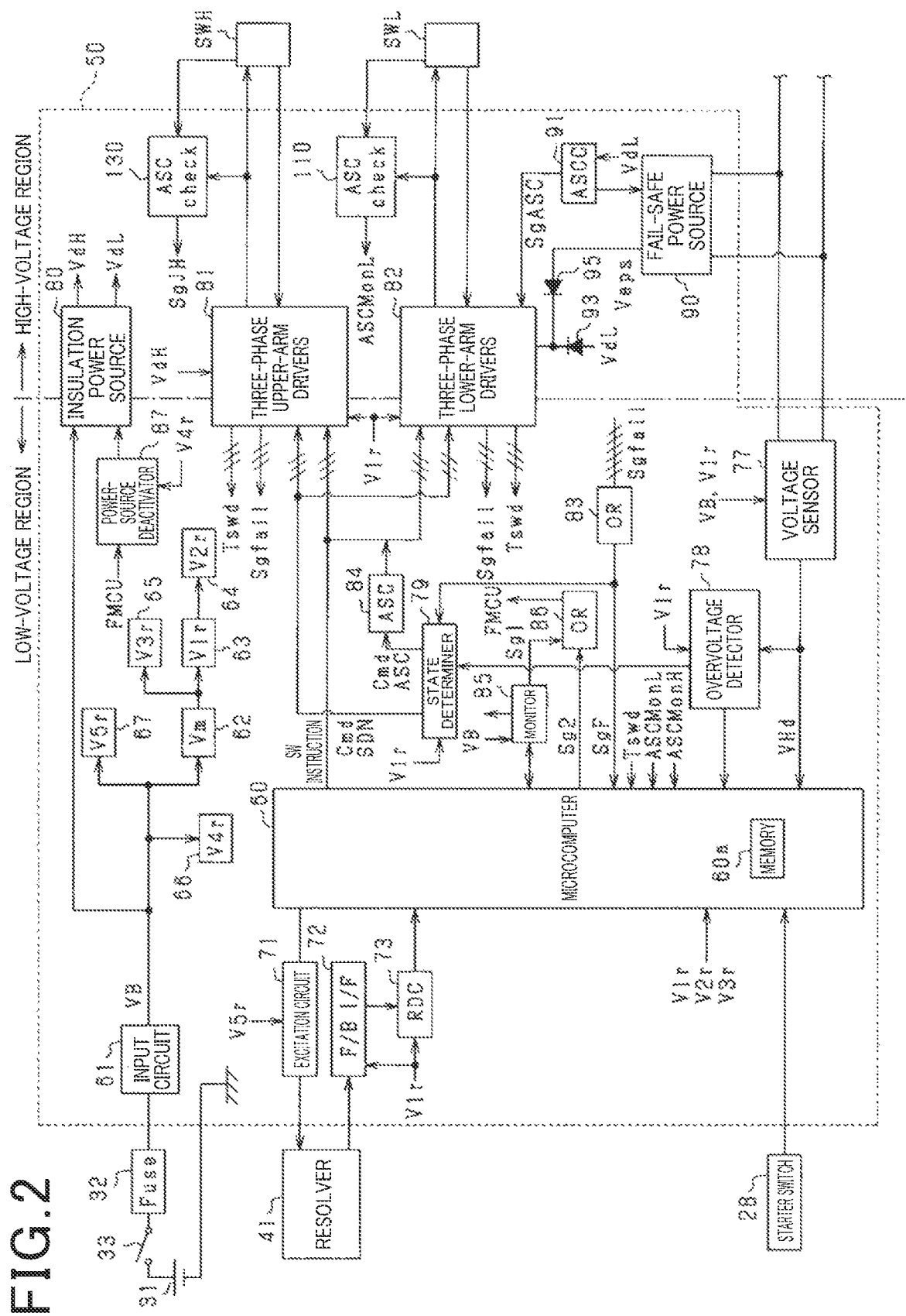
FIG. 2 is a circuit block diagram schematically illustrating the configurations of a control circuit and its peripheral components.

Next, the following describes the control circuit 50 using FIG. 2.

The control circuit 50 includes an input circuit 61, an intermediate power supply circuit 62, first to fifth low-voltage power supply circuits 63 to 67, and a microcomputer 60. The low-voltage power source 31 has positive and negative terminals. The positive terminal of the low-voltage power source 31 is connected to the input circuit 61 through a fuse 32 and a power switch 33. The negative terminal of the low-voltage power source 31 is connected to a predetermined ground serving as a signal common.

The power control system includes an angular sensor 41. The angular sensor 41 is configured to output an angular signal indicative of a rotational electric angle of the rotor of the rotary electric machine 10. The angular sensor 41 is comprised of, for example, a resolver, an encoder, or an MR sensor including one or more magnetoresistive effect elements. The angular sensor 41 according to the first embodiment is comprised of the resolver.

The intermediate power supply circuit 62 is configured to lower an output voltage VB of the input circuit 61 to thereby generate an intermediate voltage Vm of, for example, 6 V. The first low-voltage power supply circuit 63 is configured to lower the output voltage VB of the intermediate power supply circuit 62 to thereby generate a first voltage V1$r$ of, for example, 5 V.

The second low-voltage power supply circuit 64 is configured to lower the first voltage V1$r$ outputted from the first low-voltage power supply circuit 63 to thereby generate a second voltage V2$r$ of, for example, 3.3 V. The third low-voltage power supply circuit 65 is configured to lower the output voltage Vm of the intermediate power supply circuit 62 or the first voltage V1$r$ outputted from the first low-voltage power supply circuit 63 to thereby generate a third voltage V3$r$. For example, the third voltage V3$r$ according to the first embodiment is set to a voltage of, for example, 1.2 V, which is lower than the second voltage V2$r$.

The fourth low-voltage power supply circuit 66 is configured to lower the output voltage VB of the input circuit 61 to thereby generate a fourth voltage V4$r$ of, for example, 5 V. The fourth voltage V4$r$ according to the first embodiment is set to be equal to the first voltage V1$r$. The fifth low-voltage power supply circuit 67 is configured to boost the output voltage VB of the input circuit 61 to thereby generate a fifth voltage V5$r$ of, for example, 30 V.

The input circuit 61, the low-voltage power supply circuits 62 to 67, and the microcomputer 60 are installed in a low-voltage region of the control circuit 50.

The control circuit 50 includes an excitation circuit 71, a FB interface 72, and a resolver digital converter 73.

The excitation circuit 71 can start working based on the fifth voltage V5$r$ supplied from the fifth low-voltage power supply circuit 67 to supply a substantially sinusoidal excitation signal to a stator of the resolver 41. The angular signal outputted from the stator of the resolver 41 is inputted to the resolver digital converter 73 via the FB interface unit 72. Each of the resolver digital converter 73 via the FB interface unit 72 can start working based on the first voltage V1$r$ supplied from the first low-voltage power supply circuit 63.

The resolver digital converter 73 can start working and calculate, based on the angular signal outputted from the FB interface unit 72, the rotational electric angle of the rotor of the rotary electric machine 10. The calculated rotational electric angle of the rotor of the rotary electric machine 10 is inputted to the microcomputer 60. The microcomputer 60 is configured to compute, based on the inputted rotational electric angle of the rotor of the rotary electric machine 10, an electric angular velocity of the rotor of the rotary electric machine 10.

The excitation circuit 71, the FB interface unit 72, and the resolver digital converter 73 are installed in the low-voltage region of the control circuit 50.

Specifically, the microcomputer 60 includes a CPU and peripheral circuits other than the CPU; the peripheral circuits include, for example, an input/output (I/O) interface and an analog/digital (A/D) converter. The I/O interface enables the CPU to communicate signals with external devices. To the microcomputer 60, the first voltage V1$r$ of the first low-voltage power supply circuit 63, the second voltage V2$r$ of the second low-voltage power supply circuit 64, and the third voltage V3$r$ of the third low-voltage power supply circuit 65.

The control circuit 50 includes a voltage sensor 77, an overvoltage detector 78, and a state determiner 79. The voltage sensor 77 is electrically connected to the high- and low-voltage electrical paths 22H and 22L. The voltage sensor 77 can start working based on the output voltage VB supplied from the input circuit 61 and the fifth voltage V5$r$ supplied from the fifth low-voltage power supply circuit 67, and output a voltage signal based on a voltage across the smoothing capacitor 24. The voltage signal outputted from the voltage sensor 77 is inputted to the microcomputer 60 and the overvoltage detector 78.

The overvoltage detector 78 can start working based on the first voltage V1$r$ supplied from the first low-voltage power supply circuit 63. The overvoltage detector 78 is configured to calculate the voltage across the smoothing capacitor 24 in accordance with the voltage signal outputted from the voltage sensor 77 and inputted thereto, and determine whether the voltage across the smoothing capacitor 24 has exceeded a predetermined upper limit voltage. The overvoltage detector 78 is configured to output, to the microcomputer 60 and the state determiner 79, an overvoltage signal upon determination that the voltage across the smoothing capacitor 24 has exceeded the predetermined upper limit voltage.

The state determiner 79 can start working based on the first voltage V1$r$ supplied from the first low-voltage power supply circuit 63. The state determiner 79 according to the first embodiment is comprised of a logic circuit. The voltage sensor 77, the overvoltage detector 78, and the state determiner 79 are installed in the low-voltage region of the control circuit 50.

The power control system includes a starter switch 28. The starter switch 28 is comprised of, for example, an ignition switch or a push start switch, and operable by a user of the vehicle.

The higher-level ECU is configured to switch the power supply switch 33 from an off state to an on state upon determination that the starter switch 28 is switched from an off state to an on state. This causes the low-voltage power source 31 to start power supply to the control circuit 50.

The higher-level ECU is additionally configured to switch the power supply switch 33 from the on state to the off state upon determination that the starter switch 28 is switched from the on state to the off state. Specifically, the higher-level ECU is programmed to perform a predetermined termination sequence in response to determination that the starter switch 28 is switched from the on state to the off state, and thereafter switch the power supply switch 33 from the on state to the off state. This causes the low-voltage power source 31 to stop the power supply to the control circuit 50.

The microcomputer 60 is configured to generate switching instructions (SW instructions) for the respective switches SWH and SWL of the switching device 20; these switching instructions control on-off switching operations of the respective the switches SWH and SWL for adjusting a value of a controlled variable, such as torque, of the rotary electric machine 10 to a commanded value.

The microcomputer 60 is specially configured to generate the switching instructions in accordance with, for example, the output signal of the angular sensor 41.

Each switching instruction is one of an on instruction that instructs the corresponding switch to be turned on, and an off instruction that instructs the corresponding switch to be turned off. More specifically, the microcomputer 60 is configured to cyclically generate, for the upper- and lower-arm switches SWH and SWL of each phase, the switching instructions that instruct the upper- and lower-arm switches SWH and SWL of the corresponding phase to be alternately turned on. That is, the microcomputer 60 according to the first embodiment includes a switching instruction generator.

The control circuit 50 includes an insulation power source 80, upper-arm drivers 81, and lower-arm drivers 82. The upper-arm drivers 81 are provided for the respective upper-arm switches SWH and the lower-arm drivers 82 are provided for the respective lower-arm switches SWL according to the first embodiment. That is, the total six drivers 81, 82 are provided.

Figure 4:
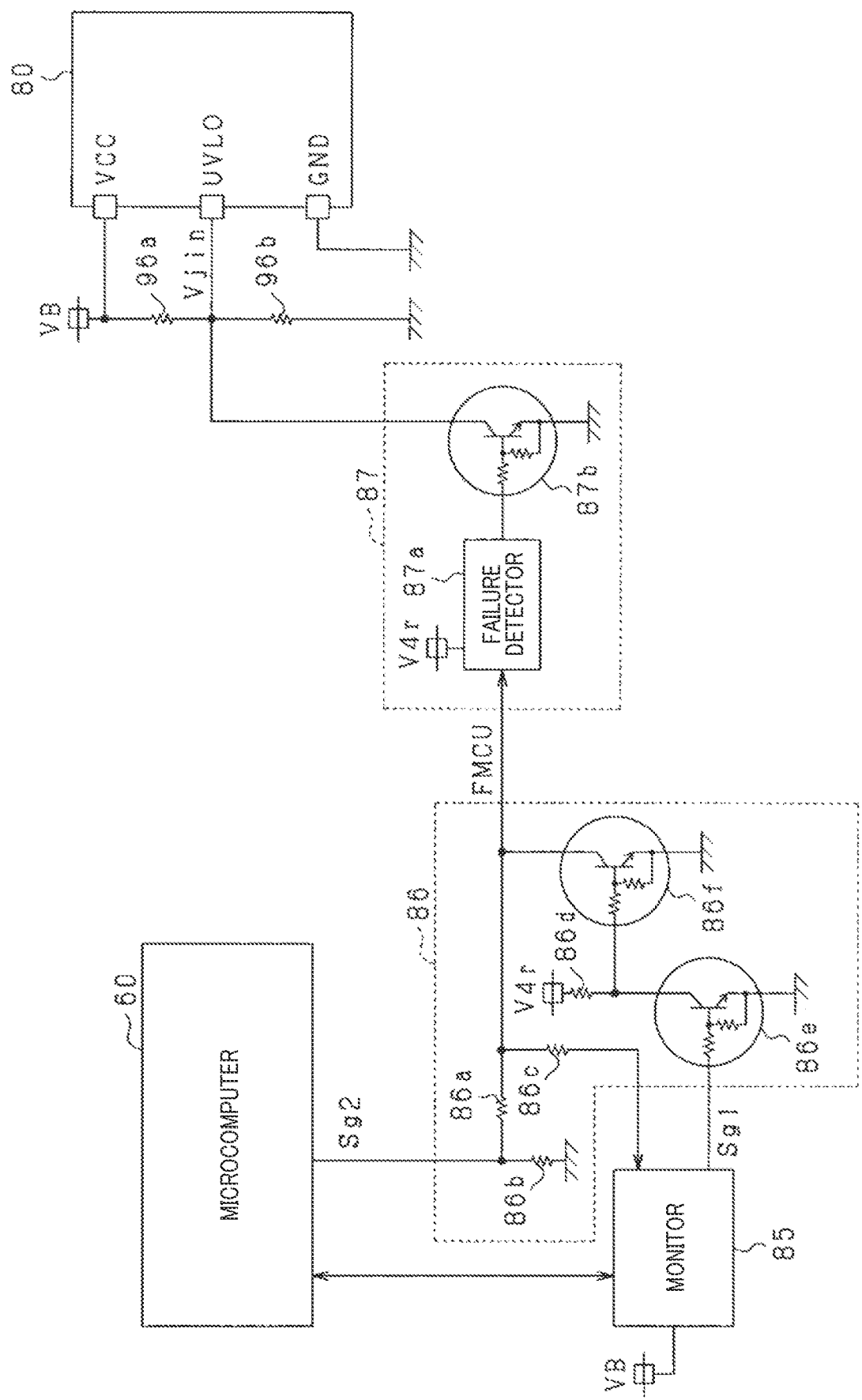
FIG. 4 is a circuit block diagram schematically illustrating the configurations of an OR circuit, and a power-source deactivator, and their peripheral components.

The insulation power source 80 has first and second output terminals, and a UVLO terminal (see FIG. 4).

The insulation power source 80 is configured to generate, based on the output voltage VB supplied from the input circuit 61, an upper-arm drive voltage VdH to be supplied to the upper-arm switches SWH, and a lower-arm drive voltage VdL to be supplied to the lower-arm switches SWL.

The insulation power source 80 is configured to individually output, via the first output terminal, the upper-arm drive voltage VdH to each of the upper-arm switches SWH, and individually output, via the second output terminal, the lower-arm drive voltage VdL to each of the lower-arm switches SWL.

Each of the insulation power source 80 and the drivers 81 and 82 is installed in both the low-voltage region and the high-voltage region while straddling a boundary between the low-voltage region and the high-voltage region. Specifically, the insulation power source 80 includes upper-arm insulation power sources provided for the respective three-phase upper-arm drivers 81, and a lower-arm insulation power source commonly provided for the three-phase lower-arm drivers 82. A power controller included in the insulation power source 80 is configured to commonly control both the upper-arm insulation power sources and the lower-arm insulation power source. Lower-arm insulation power sources can be provided for the respective three-phase lower-arm drivers 82.

Figure 3:
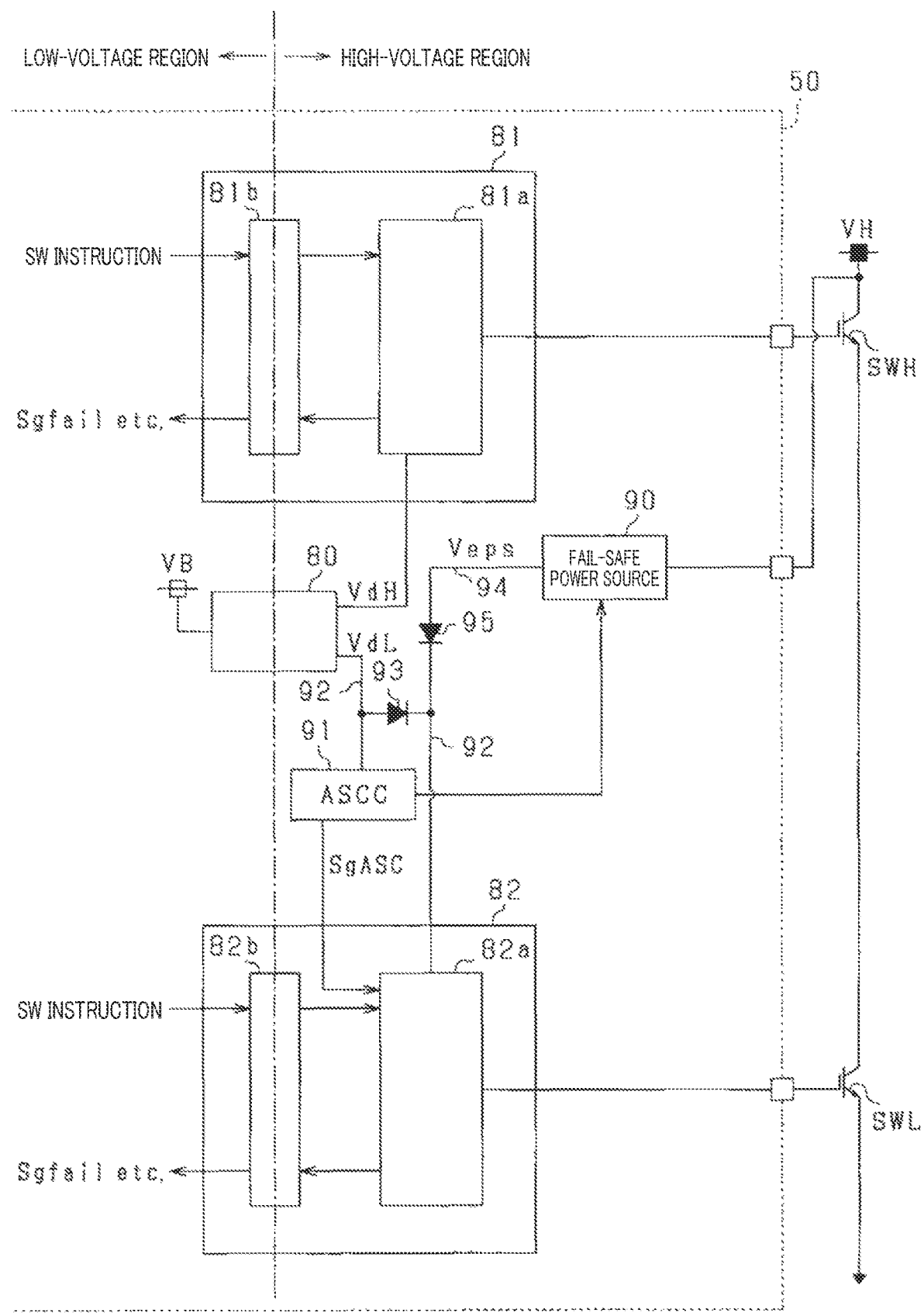
FIG. 3 is a circuit block diagram schematically illustrating the configurations of upper- and lower-arm drivers and their peripheral components.

Next, the following describes each of the upper- and lower-arm drivers 81 and 82 with reference to FIG. 3.

Each phase upper-arm driver 81 includes an upper-arm drive unit 81a serving as a switch driver, and an upper-arm insulation communicator 81b.

The upper-arm drive unit 81a is installed in the high-voltage region. The upper-arm insulation transfer unit 81b is installed in both the low-voltage region and the high-voltage region while straddling the boundary between the low-voltage region and the high-voltage region. The upper-arm insulation transfer unit 81b is configured to transmit the switching instruction for the corresponding phase upper-arm switch SWH outputted from the microcomputer 60 to the corresponding phase upper-arm switch SWH while electrically isolating between the high- and low-voltage regions. The upper-arm insulation transfer unit 81b is comprised of, for example, a photocoupler or a magnetic coupler.

The upper-arm drive unit 81a of each phase upper-arm driver 81 can start working based on an upper-arm drive voltage VdH supplied from the insulation power source 80. The upper-arm insulation transfer unit 81b of each phase upper-arm driver 81 is comprised of a high-voltage transfer unit installed in the high-voltage region and a low-voltage transfer unit installed in the low-voltage region. The high-voltage transfer unit of the upper-arm insulation transfer unit 81b of each phase upper-arm driver 81 can start working based on the upper-arm drive voltage VdH supplied from the insulation power source 80. The low-voltage transfer unit of the upper-arm insulation transfer unit 81b of each phase upper-arm driver 81 can start working based on the first voltage V1r supplied from the first low-voltage power source 63.

The upper-arm drive unit 81a of each phase upper-arm driver 81 is configured to supply a charge current to the gate of the corresponding phase upper-arm switch SWH upon determination that the inputted switching instruction is the on instruction. This causes a voltage at the gate of each phase upper-arm switch SWH to become higher than or equal to a predetermined threshold voltage Vth, resulting in the corresponding upper-arm switch SWH being turned on. In contrast, the upper-arm drive unit 81a of each phase upper-arm driver 81 is configured to enables a discharge current to flow from the gate of the corresponding phase upper-arm switch SWH to the emitter thereof upon determination that the inputted switching instruction is the off instruction. This causes the voltage at the gate of each phase upper-arm switch SWH to become lower than the predetermined threshold voltage Vth, resulting in the corresponding upper-arm switch SWH being turned off.

The upper-arm drive unit 81a of each phase upper-arm driver 81 is configured to, upon determination that a failure has occurred in at least one of the upper-arm drive unit 81a itself and the corresponding phase upper-arm switch SWH, transmit, to the microcomputer 60 via the upper-arm insulation transfer unit 81b, (i) a failure signal Sgfail indicative of information about the occurrence of an anomaly or a failure in at least one of the upper-arm drive unit 81a itself and the corresponding phase upper-arm switch SWH; and (ii) information about a temperature Tswd of the corresponding phase upper-arm switch SWH. Failures or anomalies in at least one of the upper-arm switches SWH include an overheat fault, an overvoltage fault, and an overcurrent fault.

Each phase lower-arm driver 82 includes a lower-arm drive unit 82a serving as the switch driver, and a lower-arm insulation transfer unit 82b. Because the basic structure of the lower-arm driver 82 is substantially identical to the basic structure of the upper-arm driver 81, some of detailed descriptions of the structure of each phase lower-arm driver 82 will be omitted hereinafter.

The lower-arm drive unit 82a of each phase lower-arm driver 82 can start working based on a lower-arm drive voltage VdL supplied from the insulation power source 80. The lower-arm insulation transfer unit 82b of each phase lower-arm driver 82 is comprised of a high-voltage transfer unit installed in the high-voltage region and a low-voltage transfer unit installed in the low-voltage region. The high-voltage transfer unit of the lower-arm insulation transfer unit 82b of each phase lower-arm driver 82 can start working based on the lower-arm drive voltage VdL supplied from the insulation power source 80. The low-voltage transfer unit of the lower-arm insulation transfer unit 82b of each phase lower-arm driver 82 can start working based on the first voltage V1r supplied from the first low-voltage power source 63.

The lower-arm drive unit 82a of each phase lower-arm driver 82 is configured to supply a charge current to the gate of the corresponding phase lower-arm switch SWL upon determination that the inputted switching instruction is the on instruction. This causes a voltage at the gate of each phase lower-arm switch SWL to become higher than or equal to a predetermined threshold voltage Vth, resulting in the corresponding lower-arm switch SWL being turned on. In contrast, the lower-arm drive unit 82a of each phase lower-arm driver 82 is configured to enables a discharge current to flow from the gate of the corresponding phase lower-arm switch SWL to the emitter thereof upon determination that the inputted switching instruction is the off instruction. This causes the voltage at the gate of each phase lower-arm switch SWL to become lower than the predetermined threshold voltage Vth, resulting in the corresponding lower-arm switch SWL being turned off.

The lower-arm drive unit 82a of each phase lower-arm driver 82 is configured to, upon determination that a failure has occurred in at least one of the lower-arm drive unit 82a itself and the corresponding phase lower-arm switch SWL, transmit, to the microcomputer 60 via the lower-arm insulation transfer unit 82b, (i) a failure signal Sgfail indicative of information about the occurrence of a failure in at least one of the lower-arm drive unit 82a itself and the corresponding phase lower-arm switch SWL; and (ii) information about a temperature Tswd of the corresponding phase lower-arm switch SWL. Failures or anomalies in at least one of the lower-arm switches SWL include an overheat fault, an overvoltage fault, and an overcurrent fault.

Actually, the control circuit 50 includes a discharge-switch driver for driving the discharge switch 27, and a discharge-switch insulation transfer unit for transferring instruction of the microcomputer 60 to the discharge-switch driver, and the illustrations of the discharge-switch driver and the discharge-switch insulation transfer unit in respective FIGS. 2 and 3 are omitted.

Referring to FIG. 2, the control circuit 50 includes a failure detector 83. The failure detector 83 is installed in the low-voltage region, and the failure detector 83 is configured such that the failure signals Sgfail outputted from the drivers 81 and 82 are inputted thereto.

The failure detector 83 according to the first embodiment is configured to output a failure information signal SgF with a logical high-level H to the microcomputer 60 and the state determiner 79 in response to the failure signal(s) Sgfail being inputted thereto from at least one of the drivers 81 and 82. In contrast, the failure detector 83 according to the first embodiment is configured to output the failure information signal SgF with a logical low-level L to the microcomputer 60 and the state determiner 79 in response to no failure signal(s) Sgfail being inputted thereto from the drivers 81 and 82.

The microcomputer 60 includes a memory 60a serving as a storage unit, and receives the failure information signal SgF outputted thereto, and stores the failure information signal SgF in the memory 60a. The memory 60a is comprised of a non-transitory tangible storage medium, such as a non-volatile memory except for ROMs.

The control circuit 50 includes a low-side ASC instructor 84, a monitor unit 85, an OR circuit 86, and a power-source deactivator 87 serving as a failure determiner; the components 84, 85, 86, and 87 are installed in the low-voltage region. The monitor 85 can start working based on the output voltage VB supplied from the input circuit 61, and the power-source deactivator 87 can start working based on the fourth voltage V4r supplied from the fourth low-voltage power supply circuit 66.

The low-side ASC output unit 84 is configured to operate, in response to a low-side ASC instruction CmdASC being inputted thereto from the state determiner 79, to forcibly change the switching instruction for each phase lower-arm driver 82 to the on instruction independently of whether the switching instruction inputted to each phase lower-arm driver 82 from the microcomputer 60 is the on instruction or the off instruction.

Next, the following describes components of the control circuit 50 installed in the high-voltage region thereof with reference to FIGS. 2 and 3.

The control circuit 50 includes a fail-safe power source 90 and a high-side ASC instructor 91 serving as a fail-safe controller. The fail-safe power source 90 has an input terminal and an output terminal; the input terminal of the fail-safe power source 90 is connected to a high-side electrode of the smoothing capacitor 24. The fail-safe power source 90 is configured to generate a fail-safe drive voltage Veps based on the output voltage VH of the smoothing capacitor 24. The first embodiment can use one of various types of power sources. The first embodiment uses a switched-mode power supply. The fail-safe drive voltage Veps is outputted from the output terminal of the fail-safe power source 90 is adjusted to a target voltage.

The control circuit 50 includes a normal-mode power path 92, a normal-mode diode 93, a fail-safe power path 94, and a fail-safe diode 95.

The normal-mode power path 92 is comprised of a first path and a second path. A first end of the first path of the normal-mode power path 92 is connected to the second output terminal of the insulation power source 80, and a second end of the first path of the normal-mode power path 92 is connected to a first end of the second path of the normal-mode power path 92. A second end of the second path of the normal-mode power path 92 is connected to the lower-arm drive unit 82a of each lower-arm driver 82. This enables the lower-arm drive voltage VdL to be supplied to the lower-arm drive unit 82a through the normal-mode power path 92. The normal-mode diode 93 is provided on the first path of the normal-mode power path 92 with the anode connected to the second output terminal of the insulation power source 80.

The first end of the second path of the normal-mode power path 92 is connected to the fail-safe power path 94. The fail-safe diode 95 is provided on the fail-safe power path 94 with the anode connected to the output terminal of the fail-safe power source 90. The fail-safe power path 94 enables the fail-safe drive voltage Veps to be supplied to the lower-arm drive unit 82a of each lower-arm driver 82.

Next, the following describes the OR circuit 86, the power-source deactivator 87, and other peripheral components with reference to FIG. 4.

The OR circuit 86 includes first to fourth resistors 86a to 86d and first and second switches 86e and 86f. Each of the first to fourth resistors 86a to 86d has opposing first and second ends.

The microcomputer 60 and the first end of the second resistor 86b are connected to the first end of the first resistor 86a. The second end of the second resistor 86b is connected to the predetermined ground. The second end of the first resistor 86a is connected to the monitor 85 through the third resistor 86c.

The fourth low-voltage power supply circuit 66 is connected to the first end of the fourth resistor 86d, and the second end of the fourth resistor 86d is connected to the predetermined ground through the first switch 86e.

The first switch 86e, which consists of a bipolar transistor, has the base to which a first determination signal Sg1 is supplied from the monitor 85. The second end of the first resistor 86a is also connected to the predetermined ground through the second switch 86f. The second switch 86f, which consists of a bipolar transistor, has the base to which a connection point between the second end of the fourth resistor 86d and the first switch 86e is connected.

The microcomputer 60, which has a self-diagnostic function, is configured to determine whether there are no malfunctions therein, and set a logical level of a second determination signal Sg2 to a high level (H) upon determination that there are no malfunctions therein. This results in a failure information signal FMCU, which is an output signal of the OR circuit 86, being set to the high level. In contrast, the microcomputer 60 is configured to set the logical level of the second determination signal Sg2 to a low level (L) upon determination that there is a malfunction therein. This results in the failure information signal FMCU being set to the low level.

The monitor 85, which is comprised of a watchdog counter (WDC) or a function watchdog counter (F-WDC), has a function of monitoring whether there is a malfunction in the microcomputer 60. The monitor 85 is configured to determine whether there is a malfunction in the microcomputer 60, and set the logical level of the first determination signal Sg1 to the low level upon determination that there are no malfunctions in the microcomputer 60. This holds the first and second switches 86e and 86f to be in an off state, resulting in the failure information signal FMCU being set to the low level.

In contrast, the monitor 85 is configured to set the logical level of the first determination signal Sg1 to the high level upon determination that there is a malfunction in the microcomputer 60. This changes the first and second switches 86e and 86f from the off state to an on state, resulting in the failure information signal FMCU being set to the low level.

The control circuit 50 includes a voltage-division resistor module (96a, 96b) comprised of first and second voltage-division resistors 96a and 96b connected in series to each other. The voltage-division resistor module (96a, 96b) has opposing first and second ends.

The failure information signal FMCU is inputted to the power-source deactivator 87. The power-source deactivator 87 includes a failure detector 87a and a change switch 87b having opposing first and second ends. The first end of the change switch 87b is connected to the predetermined ground, and the second end of the change switch 87b is connected to the connection point between the first and second voltage-division resistors 96a and 96b of the voltage-division resistor module (96a, 96b). To the first end of the voltage-division resistor module (96a, 96b), the input circuit 61 is connected, and the second end of the voltage-division resistor module (96a, 96b) is connected to the predetermined ground. The UVLO terminal of the insulation power source 80 is connected to the connection point between the first and second voltage-division resistors 96a and 96b of the voltage-division resistor module (96a, 96b).

The insulation power source 80 includes a controller, and the controller of the insulation power source 80 is configured to determine whether a determination voltage Vjin, which is a voltage inputted to the connection point of the voltage-division resistor module (96a, 96b), has decreased below a low-voltage threshold VUVLO, and execute a low-voltage malfunction prevention task that deactivates the insulation power source 80.

In contrast, the controller of the insulation power source 80 is configured to cancel execution of the low-voltage malfunction prevention task to thereby activate the insulation power source 80 again upon determination that the determination voltage Vjin, which decreased from the low-voltage threshold VUVLO, has increased over a predetermined cancel threshold that is set to be lower than the output voltage VB of the input circuit 61.

The failure detector 87a can start working based on the fourth voltage V4r supplied from the fourth low-voltage power supply circuit 66. The failure detector 87a is configured to determine whether the logical level of the failure information signal FMCU is the high level or the low level, and turn off the change switch 87b upon determination that the logical level of the failure information signal FMCU is the high level. This results in the determination voltage Vjin being set to be higher than or equal to the low-voltage threshold VUVLO.

Otherwise, the failure detector 87a is configured to turn on the change switch 87b upon determination that the logical level of the failure information signal FMCU is the low level. This results in the determination voltage Vjin being set to be lower than the low-voltage threshold VUVLO, causing the controller of the insulation power source 80 to execute the low-voltage malfunction prevention task. Execution of the low-voltage malfunction prevention task deactivates the insulation power source 80, so that each of the upper- and lower-arm drive voltage VdH and VdL starts to fall toward 0 V.

In particular, the control circuit 50 according to the first embodiment is capable of performing a three-phase short-circuit control routine, i.e., an active short-circuit (ASC) control routine, even if the switch device 20 is in a shutdown state due to the occurrence of a failure in the control circuit 50. The shutdown state of the switch device 20 represents that the upper- and lower-arm switches SWH and SWL of all the three-phases are in the off state.

Failures or malfunctions that can occur in the control circuit 50 include
(1) Malfunctions in the microcomputer 60
(2) Failures in at least one of the intermediate power supply circuit 62 and the first to third low-voltage power supply circuits 63 to 65
(3) Failures caused by abnormal transfer of the switching instructions from the insulation power source 80 to at least one of the upper- and lower-arm drivers 81 and 82
(4) Failures caused by a difficulty in voltage output from the insulation power source 80

The failures caused by a difficulty in voltage output from the insulation power source 80 include failures in the insulation power source 80 itself, and power-supply anomalies from the low-voltage power source 31 to the insulation power source 80.

The power-supply failures from the low-voltage power source 31 to the insulation power source 80 occur due to a break in the electrical path from the lower-voltage power source 31 to the insulation power source 80, such as a break in the input circuit 61.

The failures caused by anomaly transfer of the switching instructions from the insulation power source 80 to, as an example, the lower-arm driver 82 of a selected phase include a break in the signal path from the microcomputer 60 to the lower-arm insulation transfer unit 82b of the lower-arm driver 82 of the selected phase.

The above failures can occur in the control circuit 50 due to, for example, a collision of the vehicle with something.

Next, the following describes the three-phase short-circuit control routine carried out by predetermined components included in the control circuit 50 upon determination that there is an anomaly in the control circuit 50 with reference to FIG. 5.

In step S10 of the three-phase short-circuit control routine, the failure detector 87a of the power-source deactivator 87 determines whether the logical level of the failure information signal FMCU is the low level. The low level of the second determination signal Sg2 outputted from the microcomputer 60 or the low level of the first determination signal Sg1 outputted from the monitor 85 causes the logical level of the failure information signal FMCU to be the low level. An anomaly or a failure in the intermediate power supply circuit 62 or at least one of the first to third low-voltage power supply circuits 63 to 65 causes the logical level of the second determination signal Sg2 outputted from the microcomputer 60 to be the low level.

Upon determination that the logical level of the failure information signal FMCU is the low level (YES in step S10), the failure detector 87a switches the switch 87b from the off state to the on state in step S11. This results in the determination voltage Vjin inputted to the UVLO terminal of the insulation power source 80 decreasing toward 0 V that is defined as a ground potential.

In step S11, the power controller of the insulation power source 80 determines whether the determination voltage Vjin is below the low-voltage threshold VUVL, thus waiting until the determination voltage Vjin is below the low-voltage threshold VUVL.

Otherwise, upon determination that the determination voltage Vjin is below the low-voltage threshold VUVL (YES in step S11), the power controller of the insulation power source 80 performs the low-voltage malfunction prevention task to thereby deactivate the insulation power source 80 in step S12. This results in the upper- and lower-arm drive voltages VdH and VdL outputted from the insulation power source 80 falling toward 0 V.

Next, the high-side ASC instructor 91 measures the lower-arm drive voltage VdL outputted from the insulation power source 80, and instructs the fail-safe power source 90 to be activated after the measured lower-arm drive voltage VdL starts to fall in step S13. This results in the fail-safe power source 90 starting to output the fail-safe drive voltage Veps in step S14.

Specifically, the high-side ASC instructor 91 waits until a sufficient period, which is required for each upper-arm switch SWH to be in the off state, has elapsed since the measured lower-arm drive voltage VdL started to fall, and instructs the fail-safe power source 90 to be activated in step S13. This prevents the upper- and lower-arm switches SWH and SWL of each pair from short-circuiting therebetween For example, the high-side ASC instructor 91 can instruct the insulation power source 90 to be activated upon determination that the measured lower-arm drive voltage VdL, which started to fall, has decreased below a predetermined voltage Vp. The predetermined voltage Vp is set to a value that enables the high-side ASC instructor 91 to determine that the sufficient period has elapsed since the measured lower-arm drive voltage VdL started to fall. For example, the predetermined voltage Vp can be set to be lower than or equal to the threshold voltage Vth.

As another example, the high-side ASC instructor 91 can instruct the insulation power source 90 to be activated upon determination that a predetermined period has elapsed since the measured lower-arm drive voltage VdL started to fall. The predetermined period should be set to a value that enables the high-side ASC instructor 91 to determine that the sufficient period has elapsed since the measured lower-arm drive voltage VdL started to fall.

Following the operation in step S14, the high-side ASC instructor 91 outputs a high-side ASC instruction SgASC to the lower-arm drive unit 82a of each lower-arm driver 82 in step S15. In response to the high-side ASC instruction, the lower-arm drive unit 82a of each lower-arm driver 82 turns on the corresponding one of the three-phase lower-arm switches SWL in step S16. This results in the three-phase lower-arm switches SWL, which are on-side switches, being turned on while the three-phase off-side switches are turned off, making it possible to complete the three-phase short-circuit control routine.

Next, the following further describes the three-phase short-circuit control routine illustrated in FIG. 5 with reference to FIGS. 6A to 6I.

FIG. 6A represents how a result of determination of whether there is a malfunction in the microcomputer 60 changes over time, FIG. 6B represents how the first determination signal Sg1 outputted from the monitor 5 changes over time, and FIG. 6C represents how the failure information signal FMCU changes over time.

FIG. 6D represents how the operating state of the insulation power source 80 changes over time, FIG. 6E represents how the upper-arm drive voltage VdH outputted from the insulation power source 80 changes over time, and FIG. 6F represents how the lower-arm drive voltage VdL outputted from the insulation power source 80 changes over time.

FIG. 6G represents how the operating state of the fail-safe power source 90 changes over time, FIG. 6H represents how the high-side ASC instruction SgASC outputted from the high-side ASC instructor 91 changes over time, and FIG. 6I represents how the drive state of each phase lower-arm switch SWL changes over time.

A failure, i.e., a malfunction, occurs at time t1. This results in the logical level of the first determination signal Sg1 is changed from the low level to the high level at time t2, and the logical level of the failure information signal FMCU is changed from the high level to the low level at time t3. This causes the change switch 87b to be switched from the off state to the on state, resulting in the low-voltage malfunction prevention task of the insulation power source 80 being carried out. This results in the insulation power source 80 being deactivated at time t4, resulting in the upper- and lower-arm drive voltages VdH and VdL starting to fall.

At time t5 when the sufficient period has elapsed since the measured lower-arm drive voltage VdL started to fall at the time t4, activation of the fail-safe power source 90 is instructed. This causes the fail-safe power source 90 to start outputting of the fail-safe voltage Veps. As described above, whether the sufficient period has elapsed since the measured lower-arm drive voltage VdL started to fall can be determined based on whether the measured lower-arm drive voltage VdL, which started to fall, has decreased below the predetermined voltage Vp, or whether the predetermined period has elapsed since the measured lower-arm drive voltage VdL started to fall.

Thereafter, the high-side ASC instruction SgASC is outputted from the high-side ASC instructor 91 to the lower-arm drive unit 82a of each lower-arm driver 82 at time t6. This causes the lower-arm drive units 82a of the respective three-phase lower-arm drivers 82 to turn on the respective three-phase lower-arm switches SWL at time t7.

A failure in the low-voltage power source 31, a failure in the input circuit 61, a break in the electrical path from the lower-voltage power source 31 to the insulation power source 80, or a failure in the insulation power source 80 triggers the control circuit 50 to execute the operations in steps S11 to S16, making it possible for the control circuit 50 to perform the three-phase short-circuit control routine. That is, execution of the low-voltage malfunction prevention task deactivates the insulation power source 80, so that each of the upper- and lower-arm drive voltage VdH and VdL decreases toward 0 V, making it possible to complete the three-phase short-circuit control routine.

An overvoltage failure in, for example, an upper-arm switch SWH also triggers the control circuit 50 to perform the three-phase short-circuit control routine. Specifically, the state determiner 79 determines whether the overvoltage signal is inputted thereto from the overvoltage detector 78, and outputs the low-side ASC instruction CmdASC to the low-side ASC instructor 84 upon determination that the overvoltage signal is inputted thereto from the overvoltage detector 78.

In response to the low-side ASC instruction CmdASC being inputted thereto, the low-side ASC instructor 84 outputs a shutdown instruction CmdSDN that forcibly changes the switching instruction for each phase upper-arm driver 81 to the off instruction independently of whether the switching instruction inputted to each phase upper-arm driver 81 from the microcomputer 60 is the on instruction or the off instruction.

In response to the low-side ASC instruction CmdASC being inputted thereto, the low-side ASC instructor 84 forcibly changes the switching instruction for each phase lower-arm driver 82 to the on instruction independently of whether the switching instruction inputted to each phase lower-arm driver 82 from the microcomputer 60 is the on instruction or the off instruction.

This makes it possible to complete the three-phase short-circuit control routine.

Additionally, the three-phase short-circuit control routine is carried out for the following case.

Specifically, the microcomputer 60 determines whether there is a failure in any one of the upper-arm switches SWH and lower-arm switches SWL in accordance with the failure information signal SgF outputted from the failure detector 83. Upon determination that there is a failure in any one of the upper-arm switches SWH and lower-arm switches SWL, the microcomputer 60 identifies at least one of the upper- and lower-arm switches SWH and SWL; the identified at least one switch is determined to have failed. In addition, the microcomputer 60 identifies that the failure in the identified at least one switch is one of the open fault and the short-circuit fault.

In response to determination that there is a short-circuit fault in the identified at least one switch in the identified one of the upper-arm and the lower-arm, the microcomputer 60 outputs, as the switching instruction, the on instruction to each of the three-phase switches of the identified one of the upper-arm and the lower-arm, and outputs, as the switching instruction, the off instruction to each of the three-phase switches of the other of the upper-arm and the lower-arm. This makes it possible to complete the three-phase short-circuit control routine.

Additionally, in response to determination that there is an open fault in the identified at least one switch in the identified one of the upper-arm and the lower-arm, the microcomputer 60 outputs, as the switching instruction, the on instruction to each of the three-phase switches of the other of the upper-arm and the lower-arm, and outputs, as the switching instruction, the off instruction to each of the three-phase switches of the identified one of the upper-arm and the lower-arm. This makes it possible to complete the three-phase short-circuit control routine.

Next, the following describes components installed in the control circuit 110, which are capable of checking whether the control circuit 110 executes the three-phase short-circuit routine accurately.

The control circuit 110 includes a lower-arm ASC check unit 110 and an upper-arm ASC check unit 130 installed in the high-side region thereof. The lower-arm ASC check unit 110 can start working based on, for example, the lower-arm drive voltage VdL supplied thereto. The upper-arm ASC check unit 130 can start working based on, for example, the upper-arm drive voltage VdH supplied thereto.

Figure 7:
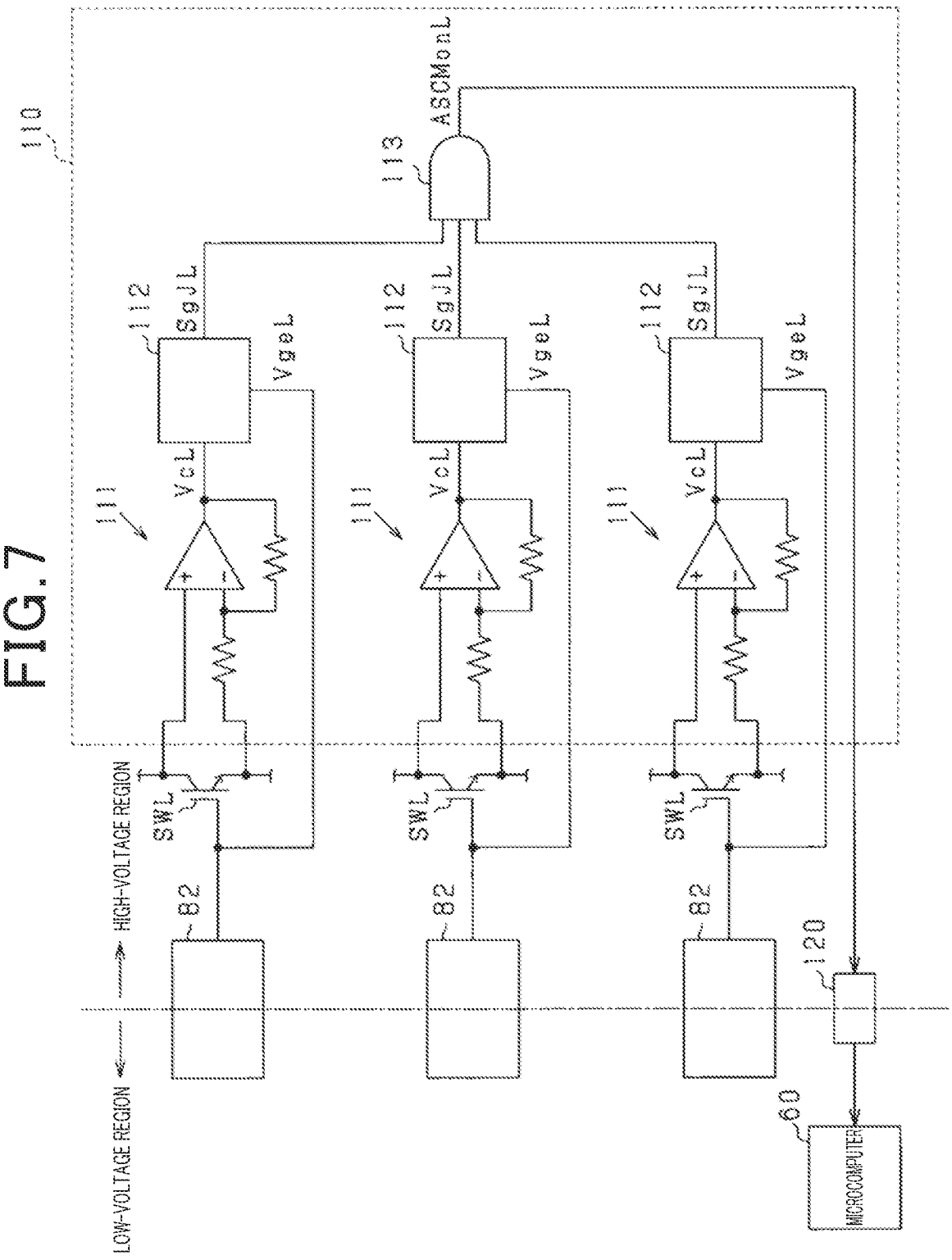
FIG. 7 is a circuit block diagram schematically illustrating the configurations of a lower-arm ASC check unit and its peripheral components.

First, the following describes the lower-arm ASC check unit 110 with reference to FIG. 7.

The lower-arm ASC check unit 110 includes lower-arm switch voltage detectors 111, lower-arm determiners 112, and a lower-arm AND circuit 113.

The lower-arm switch voltage detectors 111 are individually provided for the respective three-phase lower-arm switches SWL, and the lower-arm determiners 112 are individually provided for the respective three-phase lower-arm switches SWL. The lower-arm AND circuit 113 is commonly provided for the set of the three-phase lower-arm switches SWL. The lower-arm ASC check unit 110 and the microcomputer 60 according to the first embodiment serve as an on determiner.

Each lower-arm switch voltage detector 111, which is comprised of, for example, a differential amplifier, is configured to detect a collector-emitter voltage VceL, which is a potential difference between the collector and emitter, of the corresponding lower-arm switch SWL, and output an output signal VcL indicative of the detected collector-emitter voltage VceL. The output signal VcL outputted from each lower-arm switch voltage detector 111 is input to the corresponding lower-arm determiner 112. A voltage VgeL at the gate of each lower-arm switch SWL is also inputted to the corresponding lower-arm determiner 112.

Each lower-arm determiner 112 is configured to determine whether both the following first and second conditions are satisfied. The first condition is that the gate voltage VgeL of the corresponding lower-arm switch SWL is higher than or equal to a predetermined on-determination voltage Vjon. The second condition is that a value of the output signal VcL outputted from the corresponding lower-arm switch voltage detector 111 is adjacent to or equal to 0 V.

Specifically, each lower-arm determiner 112 is configured to determine that the corresponding lower-arm switch SWL is in the on state upon determination that both the first and second conditions are satisfied, thus setting a logical level of a lower-arm determination signal SgJL to the high level. The on-determination voltage Vjon can be set to be equal to the threshold voltage Vth, or can be set to be higher than the threshold voltage Vth and lower than the lower-arm drive voltage VdL.

Otherwise, each lower-arm determiner 112 is configured to set the logical level of the lower-arm determination signal SgJL to the low level upon determination that at least one of the first and second conditions is unsatisfied.

The lower-arm determination signals SgJL outputted from the respective three-phase lower-arm determiners 112 are inputted to the lower-arm AND circuit 113. The lower-arm AND circuit 113 is configured to set a logical level of a lower-arm ASC check signal ASCMonL to the high level upon determination that all the three-phase lower-arm determination signals SgJL has the high level. In contrast, the lower-arm AND circuit 113 is configured to set the logical level of the lower-arm ASC check signal ASCMonL to the low level upon determination that at least one of the three-phase lower-arm determination signals SgJL has the low level.

The lower-arm ASC check signal ASCMonL outputted from the lower-arm AND circuit 113 is transmitted to the microcomputer 60 through a lower-arm insulation transfer unit 120 included in the control circuit 50.

The lower-arm insulation transfer unit 120 is installed in both the low-voltage region and the high-voltage region while straddling the boundary between the low-voltage region and the high-voltage region. The lower-arm insulation transfer unit 120 is comprised of, for example, a photocoupler or a magnetic coupler.

Specifically, the lower-arm insulation transfer unit 120 includes a high-voltage transfer unit installed in the high-voltage region and a low-voltage transfer unit installed in the low-voltage region. The high-voltage transfer unit of the lower-arm insulation transfer unit 120 can start working based on the upper-arm drive voltage VdH supplied from the insulation power source 80. The low-voltage transfer unit of the lower-arm insulation transfer unit 120 can start working based on the first voltage V1r supplied from the first low-voltage power source 63.

Figure 8:
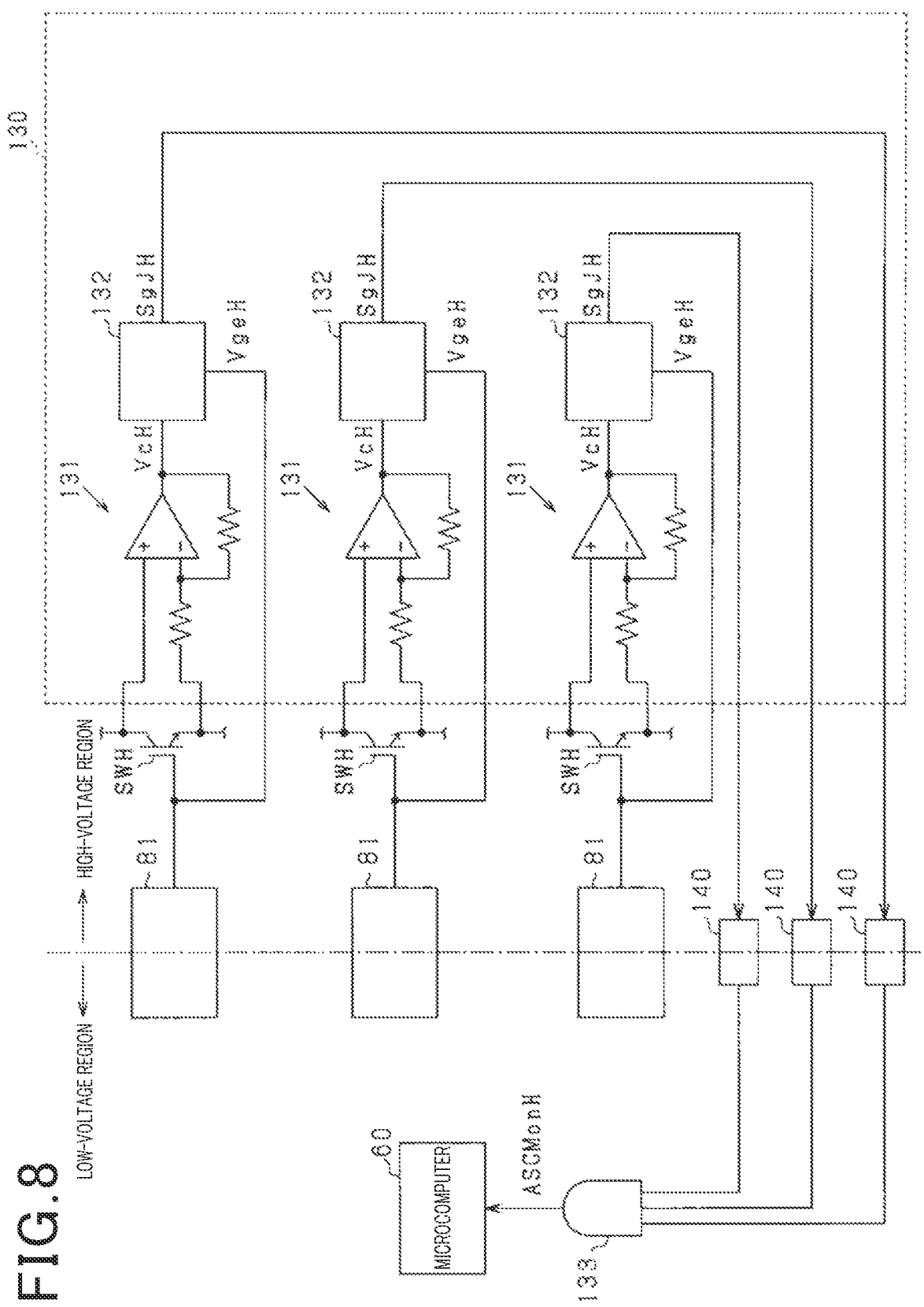
FIG. 8 is a circuit block diagram schematically illustrating the configurations of an upper-arm ASC check unit and its peripheral components.

Next, the following describes the upper-arm ASC check unit 130 with reference to FIG. 8.

The upper-arm ASC check unit 130 includes upper-arm switch voltage detectors 131 and upper-arm determiners 132.

The upper-arm switch voltage detectors 131 are individually provided for the respective three-phase upper-arm switches SWH, and the upper-arm determiners 132 are individually provided for the respective three-phase upper-arm switches SWH.

The control circuit 50 includes an upper-arm AND circuit 133 installed in the low-voltage region thereof.

The upper-arm ASC check unit 130, the upper-arm AND circuit 133, and the microcomputer 60 according to the first embodiment serve as an off determiner.

Each upper-arm switch voltage detector 131, which is comprised of, for example, a differential amplifier, is configured to detect a collector-emitter voltage VceH of the corresponding upper-arm switch SWH, and output an output signal VcH indicative of the detected collector-emitter voltage VceH. The output signal VcH outputted from each upper-arm switch voltage detector 131 is input to the corresponding upper-arm determiner 132. A voltage VgeH at the gate of each upper-arm switch SWH is also inputted to the corresponding upper-arm determiner 132.

Each upper-arm determiner 132 is configured to determine whether both the following third and fourth conditions are satisfied. The third condition is that the gate voltage VgeL of the corresponding upper-arm switch SWH is lower than or equal to a predetermined off-determination voltage Vjoff. The fourth condition is that the collector-emitter voltage VceH of the corresponding upper-arm switch SWH is adjacent to or equal to a terminal voltage across the high-voltage power source 30.

Specifically, each upper-arm determiner 132 is configured to determine that the corresponding upper-arm switch SWH is in the off state upon determination that both the third and fourth conditions are satisfied, thus setting a logical level of an upper-arm determination signal SgJH to the high level. Each upper-arm determiner 132 is configured to determine whether the fourth condition is satisfied in accordance with the output signal VcH of the corresponding upper-arm voltage detector 131. The off-determination voltage Vjoff can be set to be lower than the threshold voltage Vth.

Otherwise, each upper-arm determiner 132 is configured to set the logical level of the higher-arm determination signal SgJH to the low level upon determination that at least one of the third and fourth conditions is unsatisfied.

The upper-arm determination signals SgJH outputted from the respective three-phase upper-arm determiners 132 are inputted to an upper-arm AND circuit 133 through respective three-phase upper-arm insulation transfer units 140 included in the control circuit 50.

Each of the upper-arm insulation transfer units 140 is installed in both the low-voltage region and the high-voltage region while straddling the boundary between the low-voltage region and the high-voltage region. Each of the upper-arm insulation transfer units 140 is comprised of, for example, a photocoupler or a magnetic coupler.

Specifically, each upper-arm insulation transfer unit 140 includes a high-voltage transfer unit installed in the high-voltage region and a low-voltage transfer unit installed in the low-voltage region. The high-voltage transfer unit of each upper-arm insulation transfer unit 140 can start working based on the upper-arm drive voltage VdH supplied from the insulation power source 80. The high-voltage transfer unit of each upper-arm insulation transfer unit 140 can start working based on the first voltage V1r supplied from the first low-voltage power source 63.

The upper-arm AND circuit 133 is configured to perform an AND task that (1) Sets a logical level of an upper-arm ASC check signal ASCMonH to the high level upon determination that all the three-phase upper-arm determination signals SgJH has the high level (2) Sets the logical level of the upper-arm ASC check signal ASCMonH to the low level upon determination that at least one of the three-phase upper-arm determination signals SgJH has the low level The upper-arm ASC check signal ASCMonH outputted from the upper-arm AND circuit 133 is transmitted to the microcomputer 60.

The upper-arm AND circuit 133 can be eliminated from the control circuit 50, and the upper-arm determination signals SgJH outputted from the respective upper-arm determiners 132 can be directly inputted to the microcomputer 60 through the respective upper-arm insulation transfer units 140. In this modification, the microcomputer 60 can be configured to perform the AND task carried out by the upper-arm AND circuit 133.

Figure 9:
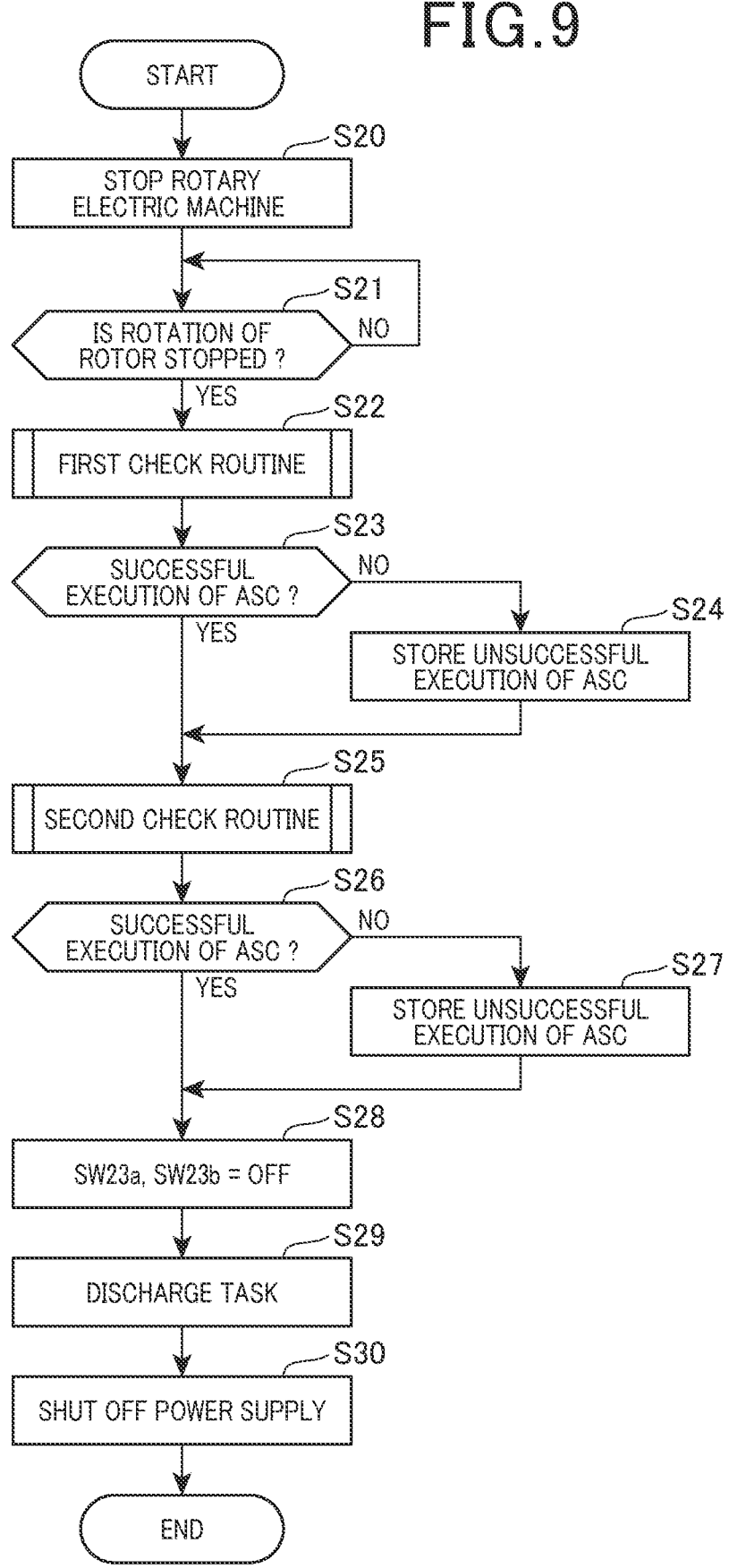
FIG. 9 is a flowchart schematically illustrating a check routine for checking whether successful execution of the three-phase short-circuit control routine is ensured.

Next, the following describes a check routine for checking whether successful execution of the three-phase short-circuit control routine is ensured, in other words, whether the three-phase short-circuit control routine is executable successfully, with reference to FIG. 9.

In step S20 of the check routine, the microcomputer 60 performs a task of stopping the rotary electric machine 10 in response to, for example, a stop instruction sent from the higher-level ECU upon the upper ECU determines that the starter switch 28 is turned off.

Following the operation in step S20, the microcomputer 60 determines whether the rotary electric machine 10 comes to a stop in accordance with, for example, the rotational electric angle of the rotor of the rotary electric machine 10 in step S21, and waits until the rotor of the rotary electric machine 10 comes to a stop upon determination that the rotary electric machine 10 does not come to a stop (NO in step S21).

Figure 10:
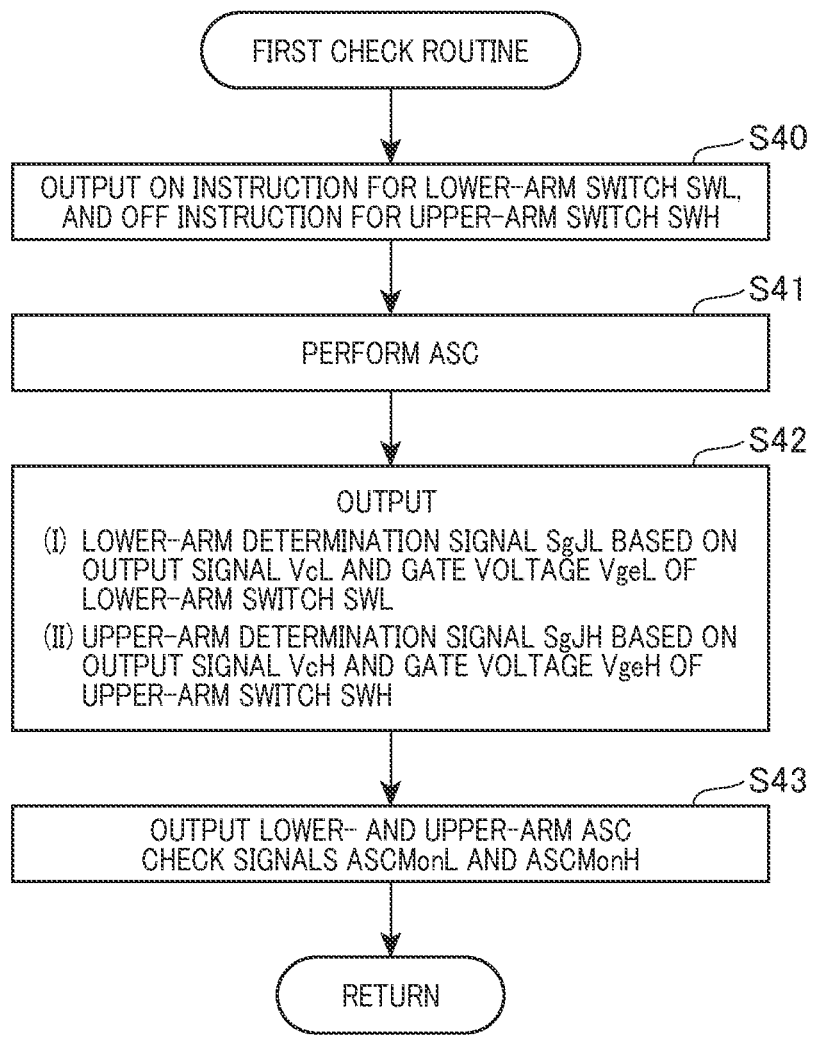
FIG. 10 is a flowchart schematically illustrating a first check routine included in the check routine illustrated in FIG. 9.

Otherwise, upon determination that the rotary electric machine 10 comes to a stop (YES in step S21), the control circuit 50 performs a first check routine in step S22, which is illustrated in FIG. 10.

Specifically, when starting the first check routine, the microcomputer 60 outputs the on instruction to each of the three-phase lower-arm drivers 82, and outputs the off instruction to each of the three-phase upper-arm drivers 81 in step S40.

In response to the on instruction, the lower-arm drive unit 82a of each phase lower-arm driver 82 for example supplies the charge current to the gate of the corresponding phase lower-arm switch SWL to thereby turn on the corresponding phase lower-arm switch SWL in step S41.

In response to the off instruction, the upper-arm drive unit 81*a* of each phase upper-arm driver 81 turns off the corresponding phase upper-arm switch SWH in step S41.

That is, the operation in step S40 instructs each lower-arm switch SWL to be turned on and instructs each upper-arm switch SWH to be turned off without being triggered by deactivation of the insulation power source 80.

Next, each phase lower-arm determiner 112 determines whether both the first and second conditions are satisfied in step S42, and sets the logical level of the lower-arm determination signal SgJL for the corresponding phase to the high level upon determination that both the first and second conditions are satisfied in step S42. Otherwise, each phase lower-arm determiner 112 sets the logical level of the lower-arm determination signal SgJL for the corresponding phase to the low level upon determination that at least one of the first and second conditions are unsatisfied in step S42.

In step S42, each phase upper-arm determiner 132 determines whether both the third and fourth conditions are satisfied, and sets the logical level of the upper-arm determination signal SgJH for the corresponding phase to the high level upon determination that both the third and fourth conditions are satisfied. Otherwise, each phase upper-arm determiner 132 sets the logical level of the upper-arm determination signal SgJH for the corresponding phase to the low level upon determination that at least one of the third and fourth conditions are unsatisfied in step S42.

Next, the lower-arm AND circuit 113 sets the logical level of the lower-arm ASC check signal ASCMonL to the high level upon determination that all the three-phase lower-arm determination signals SgJL has the high level in step S43. Otherwise, the lower-arm AND circuit 113 sets the logical level of the lower-arm ASC check signal ASCMonL to the low level upon determination that at least one of the three-phase lower-arm determination signals SgJL has the low level in step S43.

In step S43, the upper-arm AND circuit 133 sets the logical level of the upper-arm ASC check signal ASCMonH to the high level upon determination that all the three-phase upper-arm determination signals SgJH has the high level. Otherwise, in step S43, the upper-arm AND circuit 133 sets the logical level of the upper-arm ASC check signal ASCMonH to the low level upon determination that at least one of the three-phase upper-arm determination signals SgJH has the low level. Thus, the first check routine is terminated, and returns to step S23 of the main check routine.

In step S23 of the main check routine, the microcomputer 60 determines whether the three-phase lower-arm switches SWL are switchable to be on in accordance with the lower-arm ASC check signal ASCMonL inputted thereto from the lower-arm insulation transfer unit 120.

Specifically, in step S23, the microcomputer 60 determines whether the logical level of the lower-arm ASC check signal ASCMonL is the high level, and determines that the three-phase lower-arm switches SWL are switchable to be on upon determination that the logical level of the lower-arm ASC check signal ASCMonL is the high level.

Otherwise, the microcomputer 60 determines that the three-phase lower-arm switches SWL are unswitchable to be on upon determination that the logical level of the lower-arm ASC check signal ASCMonL is the low level in step S23.

In step S23, the microcomputer 60 also determines whether the three-phase upper-arm switches SWH are switchable to be off in accordance with the upper-arm ASC check signal ASCMonH inputted thereto.

Specifically, in step S23, the microcomputer 60 determines whether the logical level of the upper-arm ASC check signal ASCMonH is the high level, and determines that the three-phase upper-arm switches SWH are switchable to be off upon determination that the logical level of the upper-arm ASC check signal ASCMonH is the high level.

Otherwise, the microcomputer 60 determines that the three-phase upper-arm switches SWH are unswitchable to be off upon determination that the logical level of the upper-arm ASC check signal ASCMonH is the low level in step S23.

The operations in step S22 and S23 serve as a first task.

Upon determination that the three-phase lower-arm switches SWL are unswitchable to be on or the three-phase upper-arm switches SWH are unswitchable to be off, the microcomputer 60 determines that successful execution of the three-phase short-circuit control routine is not ensured (NO in step S23), the check routine proceeding to step S24. In step S24, the microcomputer 60 stores, in the memory 60*a*, unsuccessful execution information representing that successful execution of the three-phase short-circuit control routine is not ensured. Thereafter, the check routine proceeds to step S25.

Otherwise, upon determination that the three-phase lower-arm switches SWL are switchable to be on and the three-phase upper-arm switches SWH are switchable to be off, the microcomputer 60 determines that successful execution of the three-phase short-circuit control routine is ensured (YES in step S23), the check routine proceeding to step S25.

Figure 11:
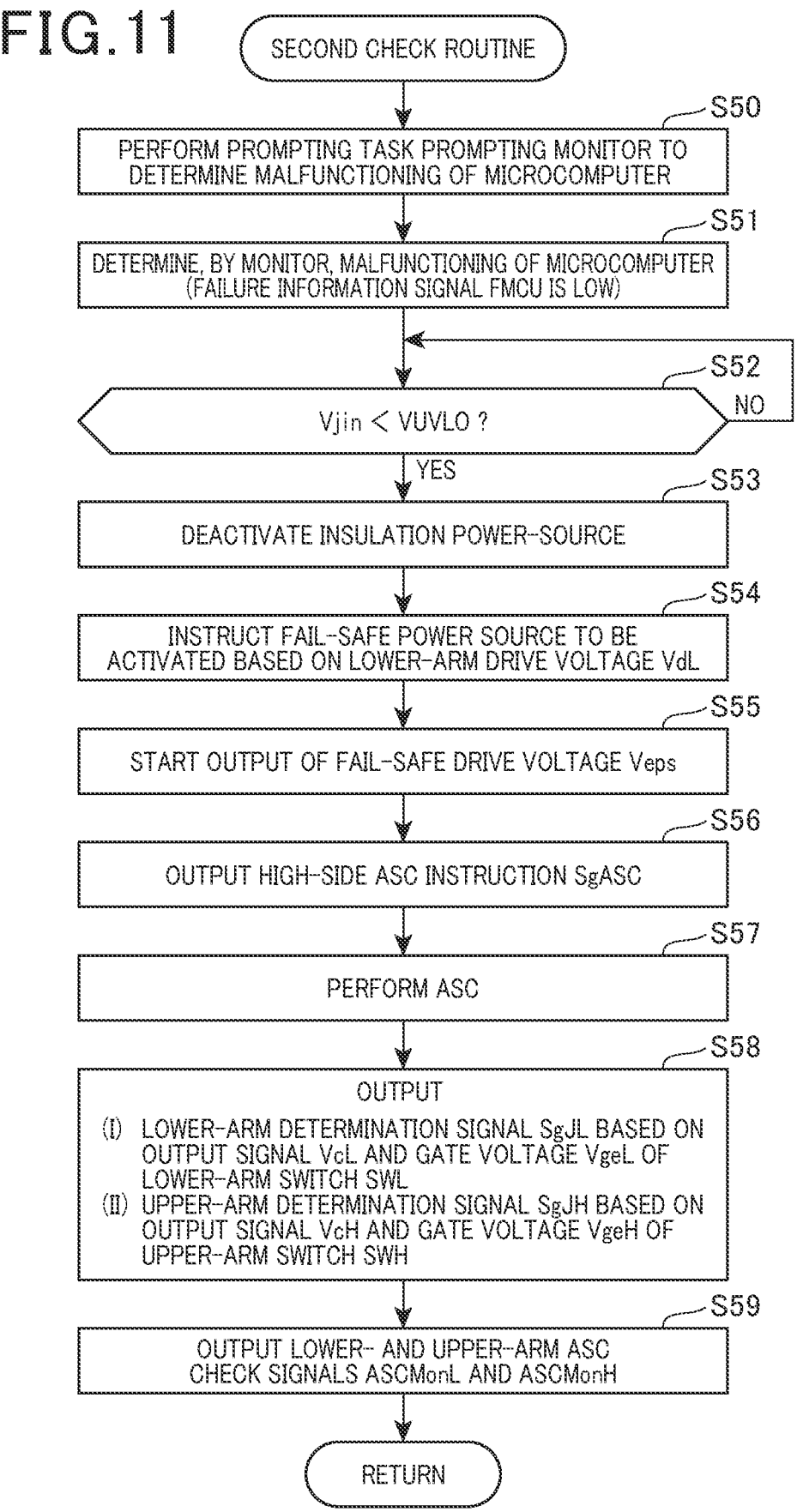
FIG. 11 is a flowchart schematically illustrating a second check routine included in the check routine illustrated in FIG. 9.

In step S25, the control circuit 50 performs a second check routine, which is illustrated in FIG. 11.

Specifically, when starting the second check routine, the microcomputer 60 disables resetting of the microcomputer 60 from the monitor 85, and purposely performs a prompting task of prompting the monitor 85 to determine that there is a malfunction in the microcomputer 60 in step S50 of the second check routine. That is, the prompting task in step S50 is programmed to instruct each lower-arm switch SWL to be turned on in response to deactivation of the insulation power source 80.

Next, the monitor 85 determines that there is a malfunction in the microcomputer 60, and sets the logical level of the first determination signal Sg1 to the high level, resulting in the logical level of the failure information signal FMCU being set to the low level in step S51. The failure detector 87*a* determines whether the logical level of the failure information signal FMCU is the low level, and turns on the change switch 87*b* upon determination that the logical level of the failure information signal FMCU is the low level in step S51. This results in the determination voltage Vjin inputted to the UVLO terminal of the insulation power source 80 decreasing toward 0 V.

In step S52, the power controller of the insulation power source 80 determines whether the determination voltage Vjin is below the low-voltage threshold VUVL, thus waiting until the determination voltage Vjin is below the low-voltage threshold VUVL (NO in step S52).

Otherwise, upon determination that the determination voltage Vjin is below the low-voltage threshold VUVL (YES in step S52), the power controller of the insulation power source 80 performs the low-voltage malfunction prevention task to thereby deactivate the insulation power source 80 in step S53. This results in the upper- and lower-arm drive voltages VdH and VdL outputted from the insulation power source 80 falling toward 0 V.

In step S54, the high-side ASC instructor 91 measures the lower-arm drive voltage VdL outputted from the insulation power source 80, and instructs the fail-safe power source 90 to be activated after the measured lower-arm drive voltage VdL starts to fall. This results in the fail-safe power source 90 starting to output the fail-safe drive voltage Veps in step S55. The operation to instruct the fail-safe power source 90 to be activated in step S54 can be carried out in the same operation in step S13 of FIG. 5.

Following the operation in step S55, the high-side ASC instructor 91 outputs the high-side ASC instruction SgASC to the lower-arm drive unit 82a of each lower-arm driver 82 in step S56. In response to the high-side ASC instruction, the lower-arm drive unit 82a of each lower-arm driver 82 supplies the charge current to the gate of the corresponding one of the three-phase lower-arm switches SWL in step S57.

Next, each phase lower-arm determiner 112 determines whether both the first and second conditions are satisfied in step S58, and sets the logical level of the lower-arm determination signal SgJL for the corresponding phase to the high level upon determination that both the first and second conditions are satisfied in step S58. Otherwise, each phase lower-arm determiner 112 sets the logical level of the lower-arm determination signal SgJL for the corresponding phase to the low level upon determination that at least one of the first and second conditions are unsatisfied in step S58.

In step S58, each phase upper-arm determiner 132 determines whether both the third and fourth conditions are satisfied, and sets the logical level of the upper-arm determination signal SgJH for the corresponding phase to the high level upon determination that both the third and fourth conditions are satisfied. Otherwise, each phase upper-arm determiner 132 sets the logical level of the upper-arm determination signal SgJH for the corresponding phase to the low level upon determination that at least one of the third and fourth conditions are unsatisfied in step S58.

Next, the lower-arm AND circuit 113 sets the logical level of the lower-arm ASC check signal ASCMonL to the high level upon determination that all the three-phase lower-arm determination signals SgJL has the high level in step S59. Otherwise, the lower-arm AND circuit 113 sets the logical level of the lower-arm ASC check signal ASCMonL to the low level upon determination that at least one of the three-phase lower-arm determination signals SgJL has the low level in step S59.

In step S59, the upper-arm AND circuit 133 sets the logical level of the upper-arm ASC check signal ASCMonH to the high level upon determination that all the three-phase upper-arm determination signals SgJH has the high level. Otherwise, in step S59, the upper-arm AND circuit 133 sets the logical level of the upper-arm ASC check signal ASCMonH to the low level upon determination that at least one of the three-phase upper-arm determination signals SgJH has the low level. Thus, the second check routine is terminated, and returns to step S26 of the main check routine.

In step S26 of the main check routine, the microcomputer 60 determines whether the three-phase lower-arm switches SWL are switchable to be on in accordance with the lower-arm ASC check signal ASCMonL inputted thereto from the lower-arm insulation transfer unit 120.

Specifically, in step S26, the microcomputer 60 determines whether the logical level of the lower-arm ASC check signal ASCMonL is the high level, and determines that the three-phase lower-arm switches SWL are switchable to be on upon determination that the logical level of the lower-arm ASC check signal ASCMonL is the high level.

Otherwise, the microcomputer 60 determines that the three-phase lower-arm switches SWL are unswitchable to be on upon determination that the logical level of the lower-arm ASC check signal ASCMonL is the low level in step S26.

In step S26, the microcomputer 60 also determines whether the three-phase upper-arm switches SWH are switchable to be off in accordance with the upper-arm ASC check signal ASCMonH inputted thereto.

Specifically, in step S26, the microcomputer 60 determines whether the logical level of the upper-arm ASC check signal ASCMonH is the high level, and determines that the three-phase upper-arm switches SWH are switchable to be off upon determination that the logical level of the upper-arm ASC check signal ASCMonH is the high level.

Otherwise, the microcomputer 60 determines that the three-phase upper-arm switches SWH are unswitchable to be off upon determination that the logical level of the upper-arm ASC check signal ASCMonH is the low level in step S26.

The operations in step S25 and S26 serve as a second task.

Upon determination that the three-phase lower-arm switches SWL are unswitchable to be on or the three-phase upper-arm switches SWH are unswitchable to be off, the microcomputer 60 determines that successful execution of the three-phase short-circuit control routine is not ensured (NO in step S26), the check routine proceeding to step S27. In step S27, the microcomputer 60 stores, in the memory 60a, unsuccessful execution information representing that successful execution of the three-phase short-circuit control routine is not ensured. Thereafter, the check routine proceeds to step S28.

Otherwise, upon determination that the three-phase lower-arm switches SWL are switchable to be on and the three-phase upper-arm switches SWH are switchable to be off, the microcomputer 60 determines that successful execution of the three-phase short-circuit control routine is ensured (YES in step S26), the check routine proceeding to step S28.

In step S28, the first and second shutoff switches 23a and 23b are turned off.

Next, the microcomputer 60 instructs the discharge switch 27 to be turned on, enabling a current to flow through a closed loop that is comprised of the smoothing capacitor 24, the discharge resistor 26, and the discharge switch 27 based on charge stored in the smoothing capacitor 24 in step S29. The operation in step S29 results in the charge stored in the smoothing capacitor 24 being discharged from the smoothing capacitor 24. This therefore results in the terminal voltage across the smoothing capacitor 24 being 0 V.

Next, the higher-level ECU carries out the predetermined termination sequence, and when completing the predetermined termination sequence, the higher-level ECU switches the power supply switch 33 from the on state to the off state in step S30, resulting in power supply from the low-voltage power source 31 to the control circuit 50 being shut off.

Next, the following offers the following advantageous benefits.

The microcomputer 60 purposely performs, as the second check routine, the prompting task of prompting the monitor 85 to determine that there is a malfunction in the microcomputer 60. Thereafter, execution of the low-voltage malfunction prevention task deactivates the insulation power source 80. After deactivation of the insulation power source 80, the high-side ASC instructor 91 instructs the fail-safe power source 90 to be activated after the measured lower-arm drive voltage VdL starts to fall, and outputs the high-side ASC instruction SgASC to the lower-arm drive unit 82a of each lower-arm driver 82. This provides a turn-on instruction to each of the three-phase lower-arm switches SWL.

The lower-arm ASC check unit 110 detects the on/off state of each of the lower-arm switches SWL, to which the turn-on instruction is provided, and determines, based on the detected on/off state of each of the lower-arm switches SWL, the logical level of the lower-arm ASC check signal ASCMonL to be transmitted to the microcomputer 60.

The upper-arm ASC check unit 130 and the upper-arm AND circuit 133 determine, based on the on/off state of each of the upper-arm switches SWH, the logical level of the upper-arm ASC check signal ASCMonH to be transmitted to the microcomputer 60.

The microcomputer 60 determines, based on the received ASC check signals ASCMonL and ASCMonH, whether the three-phase short-circuit control routine illustrated in FIG. 5 is executable normally. This makes it possible to determine whether successful execution of the three-phase short-circuit control routine is ensured in preparation for the occurrence of a failure in the control circuit 50; this failure may cause the switch device 20 to be in the shutdown state.

The second check routine, which prompts the monitor 85 to determine that there is a malfunction in the microcomputer 60, performs the operations in steps S51 to S57 of FIG. 11; the operations in steps S51 to S57 of FIG. 11 simulate the three-phase short-circuit control routine illustrated in FIG. 5. This provides the turn-on instruction to each of the three-phase lower-arm switches SWL as described above. This enables determination of whether it is possible to carry out the three-phase short-circuit control routine normally, which is illustrated in FIG. 5 and is programmed to be executed for the occurrence of a failure in the control circuit 50; this failure may cause the switch device 20 to be in the shutdown state.

The microcomputer 60 outputs, as the first check routine, outputs the on instruction to each of the three-phase lower-arm drivers 82, and outputs the off instruction to each of the three-phase upper-arm drivers 81.

Then, the lower-arm ASC check unit 110 detects the on/off state of each of the lower-arm switches SWL, to which the turn-on instruction is provided, and determines, based on the detected on/off state of each of the lower-arm switches SWL, the logical level of the lower-arm ASC check signal ASCMonL to be transmitted to the microcomputer 60.

The upper-arm ASC check unit 130 and the upper-arm AND circuit 133 determine, based on the on/off state of each of the upper-arm switches SWH to which the turn-on instruction is provided, the logical level of the upper-arm ASC check signal ASCMonH to be transmitted to the microcomputer 60.

The microcomputer 60 determines, based on the received ASC check signals ASCMonL and ASCMonH, whether successful execution of the three-phase short-circuit control routine is ensured. This enables simulation of an instruction of executing the three-phase short-circuit control routine from the microcomputer 60, making it possible to determine whether successful execution of the three-phase short-circuit control routine is ensured in preparation for the occurrence of a failure in the control circuit 50.

The lower-arm ASC check unit 110 uses the gate voltage VgeL of each of the three-phase lower-arm switches SWL for determining whether the three-phase lower-arm switches SWL are switchable to be on. The first check routine illustrated in FIG. 10 performs a task of charging the gate of each of the lower-arm switches SWL using, as a trigger, the on instruction sent from the microcomputer 60. The second check routine illustrated in FIG. 11 performs a task of charging the gate of each of the lower-arm switches SWL using, as a trigger, an operation of the microcomputer 60. If the gate of each of the lower-arm switches SWL is charged normally, the gate voltage VgeL of each of the lower-arm switches SWL increases. For this reason, the gate voltage VgeL of each lower-arm switch SWL can serve as a parameter for simple and proper determination of whether the electrical path from the microcomputer 60 to the gate of the corresponding lower-arm switch SWL.

Even if the gate voltage VgeL of each lower-arm switch SWL has increased to be higher than or equal to the threshold voltage Vth, it is not always ensured that the corresponding lower-arm switch SWL is in the on state. From this viewpoint, the lower-arm ASC check unit 110 uses the output signal VcL outputted from each lower-arm switch voltage detector 111 for determination of whether the corresponding lower-arm switch SWL is in the on state. Because the output signal VcL outputted from each lower-arm switch voltage detector 111 is changed depending on whether the corresponding lower-arm switch SWL is in the on state or the off state, the output signal VcL outputted from each lower-arm switch voltage detector 111 can serve as a parameter for determination of whether the corresponding lower-arm switch SWL is in the on state. That is, the lower-arm ASC check unit 110 is configured to use both the gate voltage VgeL of each lower-arm switch SWL and the output signal VcL outputted from the corresponding lower-arm switch voltage detector 111 to thereby determine whether the corresponding lower-arm switch SWL is in the on state. This configuration therefore increases an accuracy of determining whether each lower-arm switch SWL is in the on state.

The upper-arm ASC check unit 130 uses the gate voltage VgeH of each of the three-phase upper-arm switches SWH for determining whether the three-phase lower-arm switches SWL are switchable to be off. The first check routine illustrated in FIG. 10 performs a task of discharging the gate of each of the upper-arm switches SWH using, as a trigger, the off instruction sent from the microcomputer 60. If the gate of each of the upper-arm switches SWH is discharged normally, the gate voltage VgeH of each of the upper-arm switches SWH has decreased down to 0 V. For this reason, the gate voltage VgeH of each upper-arm switch SWH can serve as a parameter for simple and proper determination of whether the electrical path from the microcomputer 60 to the gate of the corresponding upper-arm switch SWH.

Even if the gate voltage VgeH of each upper-arm switch SWH has decreased to be lower than the threshold voltage Vth, it is not always ensured that the corresponding upper-arm switch SWH is in the off state. From this viewpoint, the upper-arm ASC check unit 130 uses the output signal VcH outputted from each upper-arm switch voltage detector 131 for determination of whether the corresponding upper-arm switch SWH is in the off state. Because the output signal VcH outputted from each upper-arm switch voltage detector 131 is changed depending on whether the corresponding upper-arm switch SWH is in the on state or the off state, the output signal VcH outputted from each upper-arm switch voltage detector 131 can serve as a parameter for determination of whether the corresponding upper-arm switch SWH is in the off state. That is, the upper-arm ASC check unit 130 is configured to use both the gate voltage VgeH of each upper-arm switch SWH and the output signal VcH outputted from the corresponding upper-arm switch voltage detector 131 to thereby determine whether the corresponding upper-arm switch SWH is in the off state. This configuration therefore increases an accuracy of determining whether each upper-arm switch SWH is in the off state.

The off state of each of the first and second shutoff switches 23a and 23b disables the high-voltage battery 30 from supplying electric power to the smoothing capacitor 24. This disables the fail-safe power source 90, which uses the smoothing capacitor 24 as a power source, from outputting electrical power. This therefore makes it difficult to switch the three-phase lower-arm switches SWL to be on even if the three-phase lower-arm switches SWL are instructed to be turned on based on the operations in steps S50 to S57 illustrated in FIG. 11. In this case, it is erroneously determined that the three-phase short-circuit control routine cannot be executed accurately although the three-phase short-circuit control routine can be actually executed accurately.

From this viewpoint, the operations in steps S25 and S26 in FIG. 9 are programmed to be carried out before the first and second shutoff switches 23a and 23b are switched to be off. This prevents such an erroneous determination that the three-phase short-circuit control routine cannot be executed accurately although the three-phase short-circuit control routine can be actually executed accurately.

The second check routine is programmed to be carried out after the first check routine. This reduces a time required for performing a task of checking whether successful execution of the three-phase short-circuit control routine is ensured.

In contrast, let us assume that the first check routine is programmed to be carried out after the second check routine. This would make longer the time required for executing the task of checking whether successful execution of the three-phase short-circuit control routine is ensured, resulting in a time required for executing the check routine illustrated in FIG. 9 being longer.

That is, the second check routine provides the turn-on instruction to each of the lower-arm switches SWL in response to deactivation of the insulation power source 80. After deactivation of the insulation power source 80, it would be necessary to activate the insulation power source 80 again for execution of the first check routine, resulting in a time required for completion of the first and second check routines being longer.

If the three-phase short-circuit control routine is carried out while rotation of the rotor of the rotary electric machine 10 is stopped, no circulation current flows through any closed loop that is comprised of any two of the three-phase stator windings 11 and corresponding two of the lower-arm switches SWL, because no counter electromotive voltage occurs in the three-phase stator windings 11. For this reason, it is preferable to perform the task of checking whether successful execution of the three-phase short-circuit control routine is ensured while rotation of the rotor is stopped so that no circulation current flows through any closed loop.

Even if the shutdown control described above is carried out while the rotor is rotated to keep a line voltage between any two of the three-phase windings 11 lower than or equal to the terminal voltage across the smoothing capacitor 24, no circulation current flows through any closed loop that is comprised of any two of the three-phase stator windings 11 and the smoothing capacitor 24.

In contrast, if the three-phase short-circuit control routine is carried out while the rotor is rotated to keep a line voltage between any two of the three-phase windings 11 lower than or equal to the terminal voltage across the smoothing capacitor 24, a circulation current flows through any closed loop that is comprised of any two of the three-phase stator windings 11 and the smoothing capacitor 24.

While rotation of the rotor is stopped, no circulation current flows through any closed loop that is comprised of any two of the three-phase stator windings 11 and the smoothing capacitor 24 even if the shutdown control or the three-phase short-circuit control routine is carried out. That is, while rotation of the rotor is stopped, how a current flows through any closed loop in the rotary electric machine 10 under execution of the shutdown control and how a current flows through any closed loop in the rotary electric machine 10 under execution of the three-phase short-circuit control routine are substantially identical to each other. It therefore may be difficult to determine whether the three-phase lower-arm switches SWL are in the on state in accordance with how a current flows through any closed loop in the rotary electric machine 10.

From this viewpoint, each of the first and second check routines according to the first embodiment is configured to use the gate voltage VgeH of each upper-arm switch SWH, the gate voltage VgeL of each lower-arm switch SWL, the output signal VcH outputted from each upper-arm switch voltage detector 131, and the output signal VcL outputted from each lower-arm switch voltage detector 111 in order to determine whether successful execution of the three-phase short-circuit control routine is ensured.

This configuration enables proper determination of whether the three-phase lower-arm switches SWL are in the on state and determination of whether the three-phase upper-arm switches SWH are in the off state even if rotation of the rotor is stopped, making it possible for the first and second check routines to reliably determine whether successful execution of the three-phase short-circuit control routine is ensured.

Modifications of the First Embodiment

The following describes modifications of the first embodiment.

The following describes a first modification of the first embodiment.

The microcomputer 60 according to the first modification can be configured to perform, after completion of the operation in, for example, step S43 of the first check routine illustrated in FIG. 10, a task of outputting the on instruction to each of the three-phase upper-arm drivers 81 and outputting the off instruction to each of the three-phase lower-arm drivers 82. This first modification aims to check whether successful execution of the three-phase short-circuit control routine is ensured in preparation for the occurrence of a short-circuit fault in one of the upper-arm switches SWH. In this first modification, each of the upper-arm determiners 132, the upper-arm AND circuit 133, the lower-arm determiners 112, and the lower-arm AND circuit 113 can have a modified configuration as follows.

First, the following describes the modified configuration of each upper-arm determiner 132 and the upper-arm AND circuit 133 according to the first modification.

Specifically, each upper-arm determiner 132 according to the first modification uses the on-determination voltage Vjon in place of the off-determination voltage Vjoff.

Each upper-arm determiner 132 according to the first modification is configured to determine whether both the following fifth and sixth conditions are satisfied. The fifth condition is that the gate voltage VgeH of the corresponding upper-arm switch SWH is higher than or equal to the predetermined on-determination voltage Vjon. The sixth condition is that the value of the output signal VcH outputted from the corresponding upper-arm switch voltage detector 131 is adjacent to or equal to 0 V.

Specifically, each upper-arm determiner 132 according to the first modification is configured to set the logical level of the higher-arm determination signal SgJH to the high level upon determination that both the fifth and sixth conditions are satisfied. Otherwise, each upper-arm determiner 132 is configured to set the logical level of the higher-arm determination signal SgJH to the low level upon determination that at least one of the fifth and sixth conditions is unsatisfied.

The upper-arm AND circuit 133 according to the first modification is configured to perform the AND task that
  (1) Determines that the three-phase upper-arm switches SWH are in the on state upon determination that all the three-phase upper-arm determination signals SgJH has the high level, thus setting the logical level of the upper-arm ASC check signal ASCMonH to the high level
  (2) Determines that the three-phase upper-arm switches SWH are unswitchable to be on upon determination that at least one of the three-phase upper-arm determination signals SgJH has the low level, thus setting the logical level of the upper-arm ASC check signal ASCMonH to the low level Next, the following describes the modified configuration of each lower-arm determiner 112 and the lower-arm AND circuit 113 according to the first modification.

Specifically, each lower-arm determiner 112 according to the first modification uses the off-determination voltage Vjoff in place of the on-determination voltage Vjon.

Each lower-arm determiner 112 according to the first modification is configured to determine whether both the following seventh and eighth conditions are satisfied. The seventh condition is that the gate voltage VgeL of the corresponding lower-arm switch SWL is lower than or equal to the predetermined off-determination voltage Vjoff. The eighth condition is that the collector-emitter voltage VceL of the corresponding lower-arm switch SWL is adjacent to or equal to the terminal voltage across the high-voltage power source 30.

Specifically, each lower-arm determiner 112 according to the first modification is configured to set the logical level of the lower-arm determination signal SgJL to the high level upon determination that both the seventh and eighth conditions are satisfied. In particular, each lower-arm determiner 112 according to the first modification is configured to determine whether the eighth condition is satisfied in accordance with the output signal VcL of the corresponding lower-arm switch voltage detector 111.

Otherwise, each lower-arm determiner 112 is configured to set the logical level of the lower-arm determination signal SgJL to the low level upon determination that at least one of the seventh and eighth conditions is unsatisfied.

The lower-arm AND circuit 113 according to the first modification is configured to perform the AND task that
  (1) Determines that the three-phase lower-arm switches SWL are in the off state upon determination that all the three-phase lower-arm determination signals SgJL has the high level, thus setting the logical level of the lower-arm ASC check signal ASCMonL to the high level
  (2) Determines that the three-phase lower-arm switches SWL are unswitchable to be off upon determination that at least one of the three-phase lower-arm determination signals SgJL has the low level, thus setting the logical level of the lower-arm ASC check signal ASCMonL to the low level The following describes a second modification of the first embodiment.

The operations in steps S22 and S23 illustrated in FIG. 9 perform (i) lower-arm determination of whether the three-phase lower-arm switches SWL are switchable to be on, and (ii) upper-arm determination of whether the three-phase upper-arm switches SWH are switchable to be off, but the operations in steps S22 and S23 according to the second modification can be configured to perform any one of the lower-arm determination and the upper-arm determination. If the operations in steps S22 and S23 are modified not to perform the upper-arm determination, the upper-arm ASC check unit 130 can be eliminated from the control circuit 50. Otherwise, if the operations in steps S22 and S23 are modified not to perform the lower-arm determination, the lower-arm ASC check unit 110 can be eliminated from the control circuit 50.

The following describes a third modification of the first embodiment.

The operations in steps S25 and S26 illustrated in FIG. 9 perform (i) the lower-arm determination of whether the three-phase lower-arm switches SWL are switchable to be on, and (ii) the upper-arm determination of whether the three-phase upper-arm switches SWH are switchable to be off, but the operations in steps S22 and S23 according to the third modification can be configured to perform any one of the lower-arm determination and the upper-arm determination.

The following describes a fourth modification of the first embodiment.

The first embodiment describes a method of determining whether the upper-arm switches SWH are switchable to be off using the gate voltage VgeH of each upper-arm switch SWH and the output signal VcH outputted from each upper-arm switch voltage detector 131, but the present disclosure is not limited to the above method.

Specifically, the first embodiment according to the fourth embodiment can be configured to perform any one of the following methods A and B as the method of determining whether the upper-arm switches SWH are switchable to be off.

First, the following describes the method A.

Specifically, the microcomputer 60 outputs the off instruction to each of the three-phase upper-arm drivers 81, and outputs the on instruction to each of the three-phase lower-arm drivers 82. A short-circuit fault in one of the upper-arm switches SWH would cause the fault upper-arm switch SWH and the corresponding lower-arm switch SWL to be short-circuited, so that an overcurrent fault would be detected by the upper-arm driver 81 for the fault upper-arm switch SWH. This would result in information about the occurrence of an overcurrent fault being transferred from the corresponding upper-arm drive unit 81a to the microcomputer 60.

That is, the microcomputer 60 determines that the upper-arm switches SWH are unswitchable to be off when receiving the information about the occurrence of an overcurrent fault, and determines that the upper-arm switches SWH are switchable to be off when not receiving the information about the occurrence of an overcurrent fault.

Next, the following describes the method B.

As a precondition for performing the method B, a DC current sensor is provided in at least one of the high-voltage electrical path 22H and the low-voltage electrical path 22L.

A measured value of the DC current sensor is outputted therefrom to the microcomputer 60 through, for example, a current interface.

Based on the precondition, the microcomputer 60 outputs the off instruction to each of the three-phase upper-arm drivers 81, and outputs the on instruction to each of the three-phase lower-arm drivers 82. A short-circuit fault in one of the upper-arm switches SWH would cause the fault upper-arm switch SWH and the corresponding lower-arm switch SWL to be short-circuited, so that an overcurrent would be measured by the DC current sensor.

The microcomputer 60 determines whether there is an overcurrent fault in at least one of the switches SWH and SWL based on the measured values of the DC current sensor, and determines that the upper-arm switches SWH are unswitchable to be off upon determination that there is an overcurrent fault in one of the upper-arm switches SWH based on the measured values of the DC current sensor. Otherwise, the microcomputer 60 determines that the upper-arm switches SWH are switchable to be off upon determination that there are no overcurrent faults in each of the upper-arm switches SWH based on the measured values of the DC current sensor.

The above method B can use, in place of the DC current sensor, a power-source monitor for monitoring the high-voltage power source 30, and determine whether the upper-arm switches SWH are unswitchable to be off in accordance with values of a DC current of the high-voltage power source 30, which are measured by the power source monitor.

The following describes a fifth modification of the first embodiment.

The lower-arm switch voltage detectors 111 and lower-arm determiners 112 of the lower-arm ASC check unit 110 can be installed in the respective lower-arm drivers 82, and the upper-arm switch voltage detectors 131 and upper-arm determiners 132 of the upper-arm ASC check unit 130 can be installed in the respective upper-arm drivers 81.

The following describes a sixth modification of the first embodiment.

The three-phase short-circuit control routine according to the sixth modification can be configured to turn on the three-phase upper-arm switches SWH, and to turn off the three-phase lower-arm switches SWL. In the sixth modification, the fail-safe power source 90 can be comprised of plural fail-safe power sources 90 provided for the respective three-phase upper-arm drive units 81a. In this modification, the upper-arm switch voltage detectors 131 and upper-arm determiners 132 of the upper-arm ASC check unit 130 can be installed in the respective upper-arm drivers 81.

The following describes a seventh modification of the first embodiment.

The microcomputer 60 or another microcomputer can functionally include the ASC check units 110 and 130.

The following describes an eighth modification of the first embodiment.

The check results outputted from the ASC check unit 110 can be transferred through a communication interface to the microcomputer 60 in place of the insulation transfer unit 120. Similarly, the check results outputted from the ASC check unit 130 can be transferred through a communication interface to the microcomputer 60 in place of the insulation transfer units 140. As the communication interface, an SPI®, a CAN interface, a UART interface, an Ethernet® interface, or a parallel communication interface can be used.

The check results transferred through the communication interface are represented by, for example, binary digital data or Duty signals.

The following describes a ninth modification of the first embodiment.

The configuration of each lower-arm switch voltage detector 111 for detecting the collector-emitter voltage VceL of the corresponding lower-arm switch SWL is not limited to that illustrated in FIG. 7. The collector-emitter voltage VceL of each lower-arm switch SWL can be detected using voltage-division capacitors. The collector-emitter voltage VceH of each upper-arm switch SWH can also be detected using voltage-division capacitors.

The following describes a tenth modification of the first embodiment.

In place of the lower-arm determiners 112 provided for the respective three-phase lower-arm switches SWL, a lower-arm determiner can be commonly provided for the three-phase lower-arm switches SWL. In this modification, the output signal VcL outputted from each lower-arm switch voltage detector 111 and the gate voltage VgeL of each lower-arm switch SWL are collectively transmitted to the shared lower-arm determiner.

The following describes an eleventh modification of the first embodiment.

The check results for the respective lower-arm switches SWL obtained by the lower-arm ASC check unit 110 can be carried out by a component installed in the low-voltage region of the control circuit 50, such as the microcomputer 60. This modification can be employed for a case where the lower-arm switch voltage detectors 111 and lower-arm determiners 112 of the lower-arm ASC check unit 110 are installed in the respective lower-arm drivers 82.

Determination of whether successful execution of the three-phase short-circuit control routine is ensured can be carried out based on only the output signal VcL outputted from each lower-arm switch voltage detector 111 without using the gate voltage VgeL of each lower-arm switch SWL. In this modification, determination of whether successful execution of the three-phase short-circuit control routine is ensured using only the output signal VcL outputted from each lower-arm switch voltage detector 111 can be carried out by the microcomputer 60 as follows.

The microcomputer 60 is configured to obtain first information about the output signal VcH outputted from each upper-arm switch voltage detector 131 and obtain second information about the output signal VcL outputted from each lower-arm switch voltage detector 111 while outputting the off instruction to each three-phase upper-arm switch SWH and outputting the on instruction to each three-phase lower-arm switch SWL.

Then, the microcomputer 60 is configured to determine whether the collector-emitter voltage VceL of each lower-arm switch SWL has one of a first value adjacent to 0 V and a second value equal to 0 V in accordance with the second information about the output signal VcL outputted from each lower-arm switch voltage detector 111. Similarly, the microcomputer 60 is configured to determine whether the collector-emitter voltage VceH of each upper-arm switch SWH has one of a third value adjacent to 0 V and a fourth value equal to 0 V in accordance with the first information about the output signal VcH outputted from each upper-arm switch voltage detector 131.

Then, the microcomputer 60 is configured to determine that successful execution of the three-phase short-circuit control routine is ensured upon determination that both (i) the collector-emitter voltage VceL each lower-arm switch SWL has one of the first value adjacent to 0 V and the second value equal to 0 V and (ii) the collector-emitter voltage VceH of each upper-arm switch SWH has one of the third value adjacent to 0 V and the fourth value equal to 0 V.

In the eleventh modification, the output signal VcH outputted from each upper-arm switch voltage detector 131 and the output signal VcL outputted from each lower-arm switch voltage detector 111 become enable only while the microcomputer 60 outputs the off instruction to each three-phase upper-arm switch SWH and outputs the on instruction to each three-phase lower-arm switch SWL. This prevents, which all the switches SWH and SWL are in the off state, erroneous determination of whether successful execution of the three-phase short-circuit control routine is ensured due to (1) Change of the output signal VcH for each upper-arm switch SWH, which is caused by impedances around the corresponding upper-arm switch SWH (2) Change of the output signal VcL for each lower-arm switch SWL, which is caused by impedances around the corresponding lower-arm switch SWL The following describes a twelfth modification of the first embodiment.

Each of the first and second check routines can be carried out while the rotor is rotating.

As a thirteenth modification of the first embodiment, the three-phase short-circuit control routine illustrated in FIG. 9 can be modified such that, upon determination that successful execution of the three-phase short-circuit control routine is not ensured (NO in step S23), the three-phase short-circuit control routine proceeds to step S28 while skipping the operations in steps S25 to S27.

As a fourteenth modification of the first embodiment, the first check routine can be eliminated from the three-phase short-circuit control routine illustrated in FIG. 9.

As a fifteenth modification of the first embodiment, the failure information signal FMCU for deactivating the insulation power source 80 can be generated based on any one of the first determination signal Sg1 and the second determination signal Sg2.

The high-side ASC instructor 91 according to a sixteenth modification of the first embodiment can be configured to output the of the high-side ASC instruction SgASC in accordance with the upper-arm drive voltage VdH in place of the lower-arm drive voltage VdL. That is, the high-side ASC instructor 91 according to the sixteenth modification can be configured to obtain information about the upper-arm drive voltage VdH through an insulation transfer unit.

In place of the output voltage VB of the input circuit 61 to be supplied to the monitor 85, a voltage of another power source or power supply circuit except for the first to third low-voltage power supply circuits 63 to 65 can be used as a voltage to be supplied to the monitor 85 according to a seventeenth modification of the first embodiment.

The insulation power source 80 can be comprised of an upper-arm insulation power source for the upper-arm switches SWH and a lower-arm insulation power source for the lower-arm switches SWL according to an eighteenth modification, and the power controller, which constitutes the insulation power source 80, can be comprised of first and second power controllers provided for the respective upper- and lower-arm insulation power sources according to the eighteenth modification. In this eighteenth modification, executing the low-voltage malfunction prevention task deactivates both the first and second power controllers provided for the respective upper- and lower-arm insulation power sources, thus deactivating the insulation power source 80.

A coupler anomaly, which makes it difficult to supply the first voltage V1r of the first low-voltage power supply circuit 63 to the low-voltage transfer unit of each of the upper- and lower-arm insulation transfer units 81b and 82b, may result in difficulty in transfer of the switching instructions from the microcomputer 60 to each of the upper- and lower-arm drive units 81a and 82a. This may result in the switch device 20 being in the shutdown state.

For addressing such an issue, the first embodiment can employ the following configuration according to a nineteenth modification.

The configuration according to the nineteenth modification is that a selected power supply circuit, which differs from the first low-voltage power supply circuit 63, is provided for the low-voltage transfer unit of the lower-arm insulation transfer unit 81b. As the selected power supply circuit, it is possible to employ a power supply circuit that can avoid the occurrence of a dependent failure if there is a failure in the first low-voltage power supply circuit 63, such as the fourth low-voltage power supply circuit 66 that lowers the output voltage VB of the input circuit 61 to thereby generate the fourth voltage V4r of, for example, 5 V.

The configuration according to the nineteenth modification deactivates the insulation power source 80 in response to a decrease in the output voltage of the selected power supply circuit, and causes the high-side ASC instructor 91 to output the high-side ASC instruction SgASC to the lower-arm drive unit 82a of each lower-arm driver 82. Specifically, the failure detector 87a of the power-source deactivator 87 measures the output voltage of the selected power supply circuit, and turns on the change switch 87b upon determination that the measured output voltage decreases down to a predetermined threshold voltage. The configuration according to the nineteenth modification set forth above makes it possible to execute the three-phase short-circuit control routine even if there is a coupler anomaly in the control circuit 50.

Second Embodiment

Figure 12:
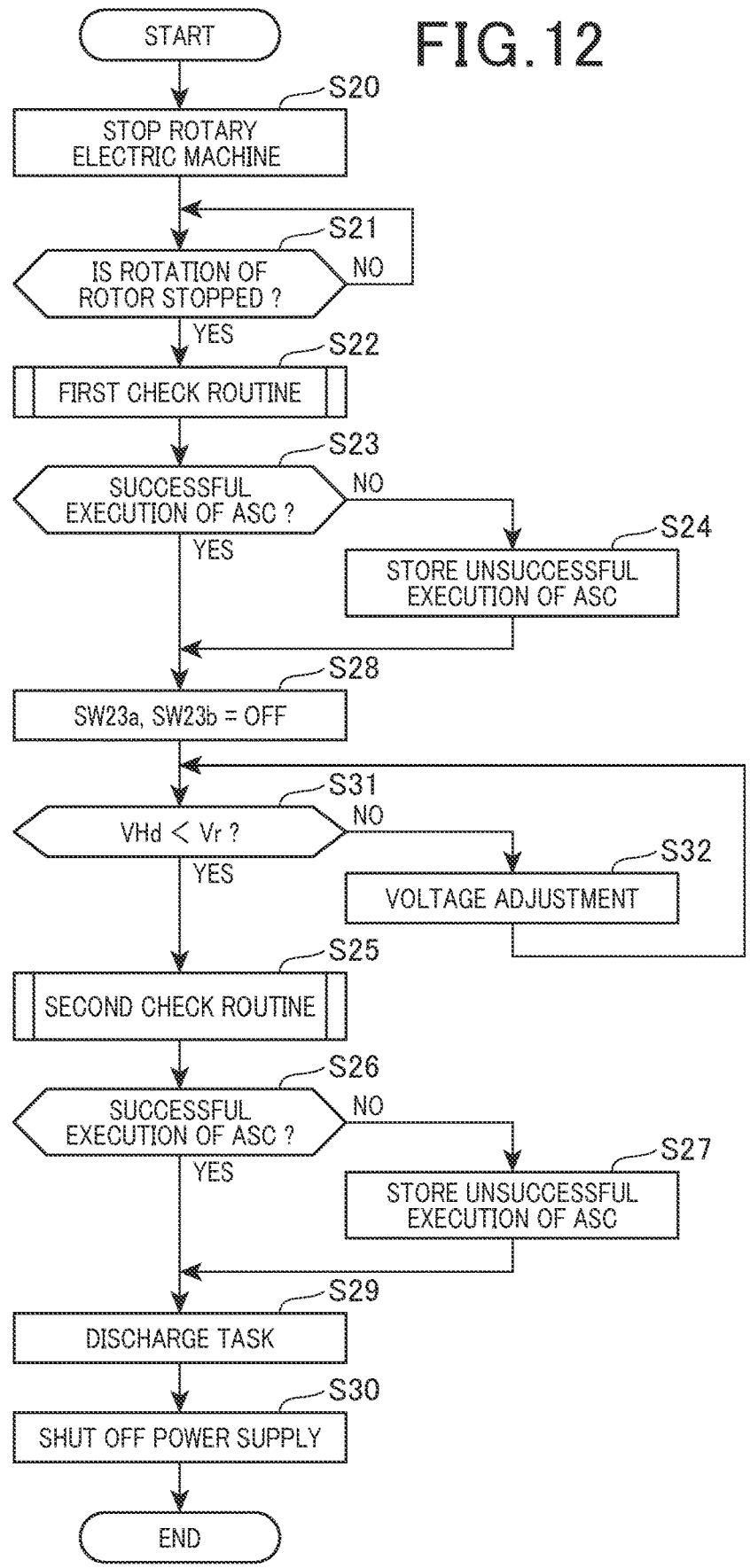
FIG. 12 is a flowchart schematically illustrating a check routine for checking whether successful execution of the three-phase short-circuit control routine is ensured according to the second embodiment.

The following describes the second embodiment of the present disclosure while focusing on different points of the second embodiment from the first embodiment with reference to FIG. 12. A part of the check routine according to the second embodiment is changed from the check routine according to the first embodiment. Identical step numbers are assigned in FIGS. 9 and 12 to respective identical operations between the check routines illustrated in respective FIGS. 9 and 12.

Upon determination that successful execution of the three-phase short-circuit control routine is ensured (YES in step S23) or the operation in step S24 is completed, the operation in step S28 is carried out.

Following the operation in step S28, the microcomputer 60 determines whether the terminal voltage across the smoothing capacitor 24, which will be referred to as reference character VHd, is lower than a predetermined threshold value Vr in step S31. The predetermined threshold value Vr is set to be lower than the terminal voltage, for example, the rated voltage, across the high-voltage power source 30 and higher than 0 V.

Upon determination that the terminal voltage VHd across the smoothing capacitor 24 is higher than or equal to the predetermined threshold value Vr (NO in step S31), the microcomputer 60 serves as a discharge controller to perform a voltage adjustment task of reducing the terminal voltage across the smoothing capacitor 23 in step S32, returning to the determination in step S31. As the voltage adjustment task, the microcomputer 60 for example performs one of (1) A first discharge task that uses the discharge resistor 26 based on turn-on of the discharge switch 27
(2) A second discharge task that drives the DC/DC converter included in the electrical devices 25
(3) A third discharge task that controls the switching device 20 to cause a current to flow in the three-phase windings 11

As the third discharge task, the microcomputer 60 preferably causes a d-axis current to only flow in the three-phase windings 11 without flow of a q-axis current in the three-phase windings 11, thus preventing the rotary electric machine 10 from generating torque.

Otherwise, upon determination that the terminal voltage VHd across the smoothing capacitor 24 is lower than the predetermined threshold value Vr (YES in step S31), the microcomputer 60 performs the second check routine set forth above. That is, the fail-safe power source 90 starts to output the fail-safe drive voltage Veps based on the terminal voltage VHd across the smoothing capacitor 24 as an input voltage thereto while the terminal voltage VHd across the smoothing capacitor 24 is lower than the predetermined threshold value Vr (see step S55 in FIG. 11). This reduces the input voltage inputted to the fail-safe power source 90, making it possible to slow the progress of deterioration of the fail-safe power source 90 and prevent the occurrence of a malfunction in the fail-safe power source 90.

For example, if a switched-mode power supply is used as the fail-safe power source 90, it is possible to reduce loss, especially switching loss, caused in the fail-safe power source 90, thus keeping heat generation in the fail-safe power source 90 in check. As another example, if a linear power supply is used as the fail-safe power source 90, it is possible to reduce the difference between the input voltage inputted to the fail-safe power source 90 and the output voltage outputted therefrom, thereby reducing a level of heat generated from switches, such as MOSFETs, constituting the fail-safe power source 90.

Modification of the Second Embodiment

The discharge switch 27 can be eliminated from the inverter 15. In this modification, the microcomputer 60 is programmed to wait, after the first and second shutoff switches 23a and 23b being turned off in step S28, until the terminal voltage VHd across the smoothing capacitor 24 has decreased below the predetermined threshold value Vr, and thereafter perform the second check routine in step S25.

Third Embodiment

Figure 13:
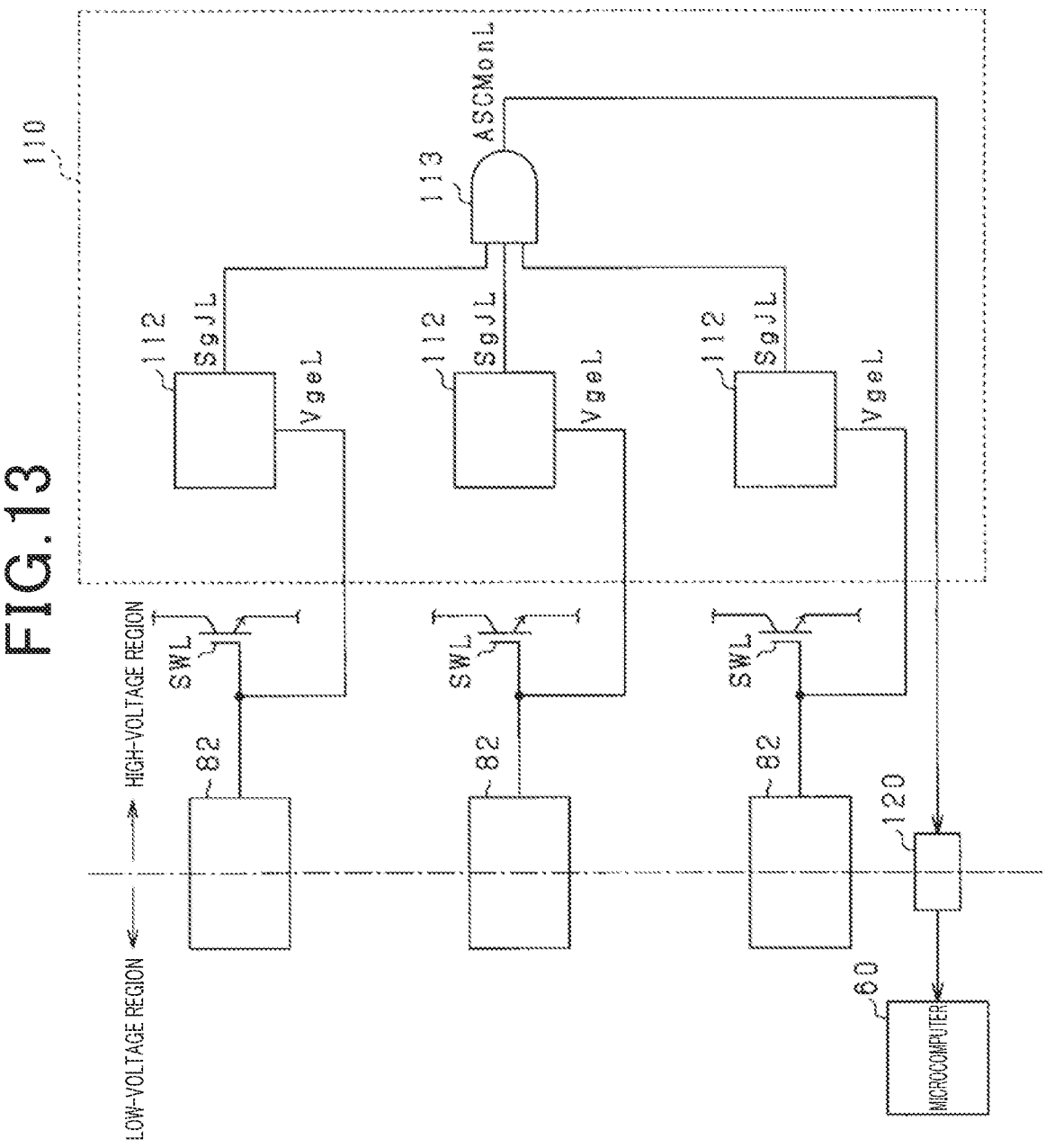
FIG. 13 is a circuit block diagram schematically illustrating the configurations of a lower-arm ASC check unit and its peripheral components according to the third embodiment.
Figure 14:
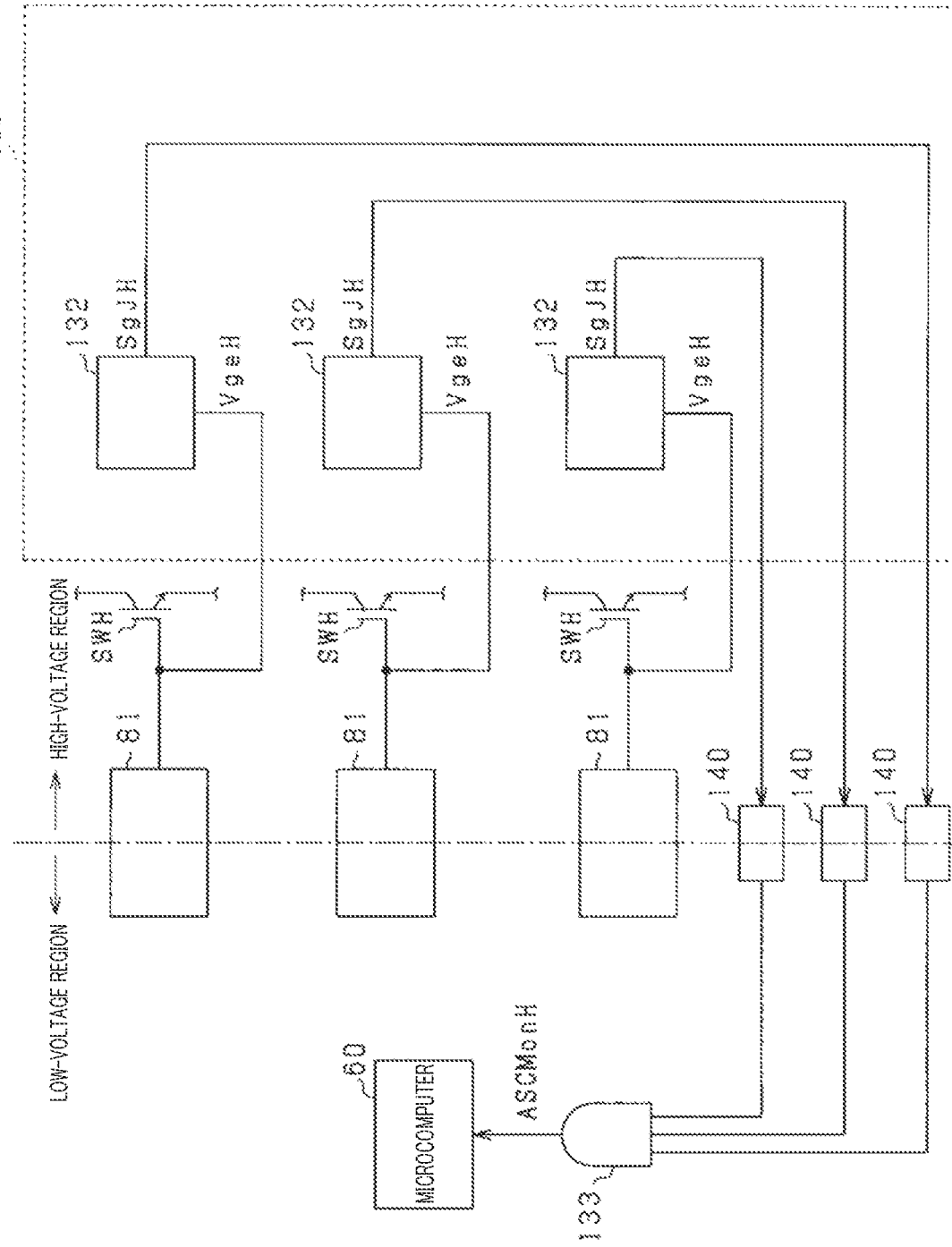
FIG. 14 is a circuit block diagram schematically illustrating the configurations of an upper-arm ASC check unit and its peripheral components according to the third embodiment.

The following describes the third embodiment of the present disclosure while focusing on different points of the third embodiment from the first embodiment with reference to FIGS. 13 to 17. As illustrated in FIGS. 13 and 14, the configuration of each of the ASC check units 110 and 130 according to the third embodiment is changed from that of the corresponding one of the ASC check units 110 and 130 according to the first embodiment. Identical reference characters are assigned in FIGS. 7 and 13 to respective identical components between the lower-arm ASC check units 110 illustrated in respective FIGS. 7 and 13. Similarly, identical reference characters are assigned in FIGS. 8 and 14 to respective identical components between the upper-arm ASC check units 130 illustrated in respective FIGS. 8 and 14.

Referring to FIG. 13, the lower-arm check unit 110 includes no lower-arm switch voltage detectors 111, so that no output signals VcL outputted from the respective lower-arm voltage detectors 111 are inputted to the respective lower-arm determiners 112.

Each lower-arm determiner 112 is configured to determine whether the gate voltage VgeL of the corresponding lower-arm switch SWL is higher than or equal to the on-determination voltage Vjon, and set the logical level of the lower-arm determination signal SgJL to the high level upon determination that the gate voltage VgeL of the corresponding lower-arm switch SWL is higher than or equal to the on-determination voltage Vjon. Otherwise, each lower-arm determiner 112 is configured to set the logical level of the lower-arm determination signal SgJL to the low level upon determination that the gate voltage VgeL of the corresponding lower-arm switch SWL is lower than the on-determination voltage Vjon.

Referring to FIG. 14, the upper-arm check unit 130 includes no upper-arm switch voltage detectors 131, so that no output signals VcH outputted from the respective upper-arm voltage detectors 131 are inputted to the respective upper-arm determiners 132.

Each upper-arm determiner 132 is configured to determine whether the gate voltage VgeH of the corresponding upper-arm switch SWH is lower than or equal to the off-determination voltage Vjoff, and set the logical level of the upper-arm determination signal SgJH to the high level upon determination that the gate voltage VgeH of the corresponding upper-arm switch SWH is lower than or equal to the off-determination voltage Vjoff. Otherwise, each upper-arm determiner 132 is configured to set the logical level of the upper-arm determination signal SgJH to the low level upon determination that the gate voltage VgeH of the corresponding upper-arm switch SWH is higher than the on-determination voltage Vjoff.

Figure 15:
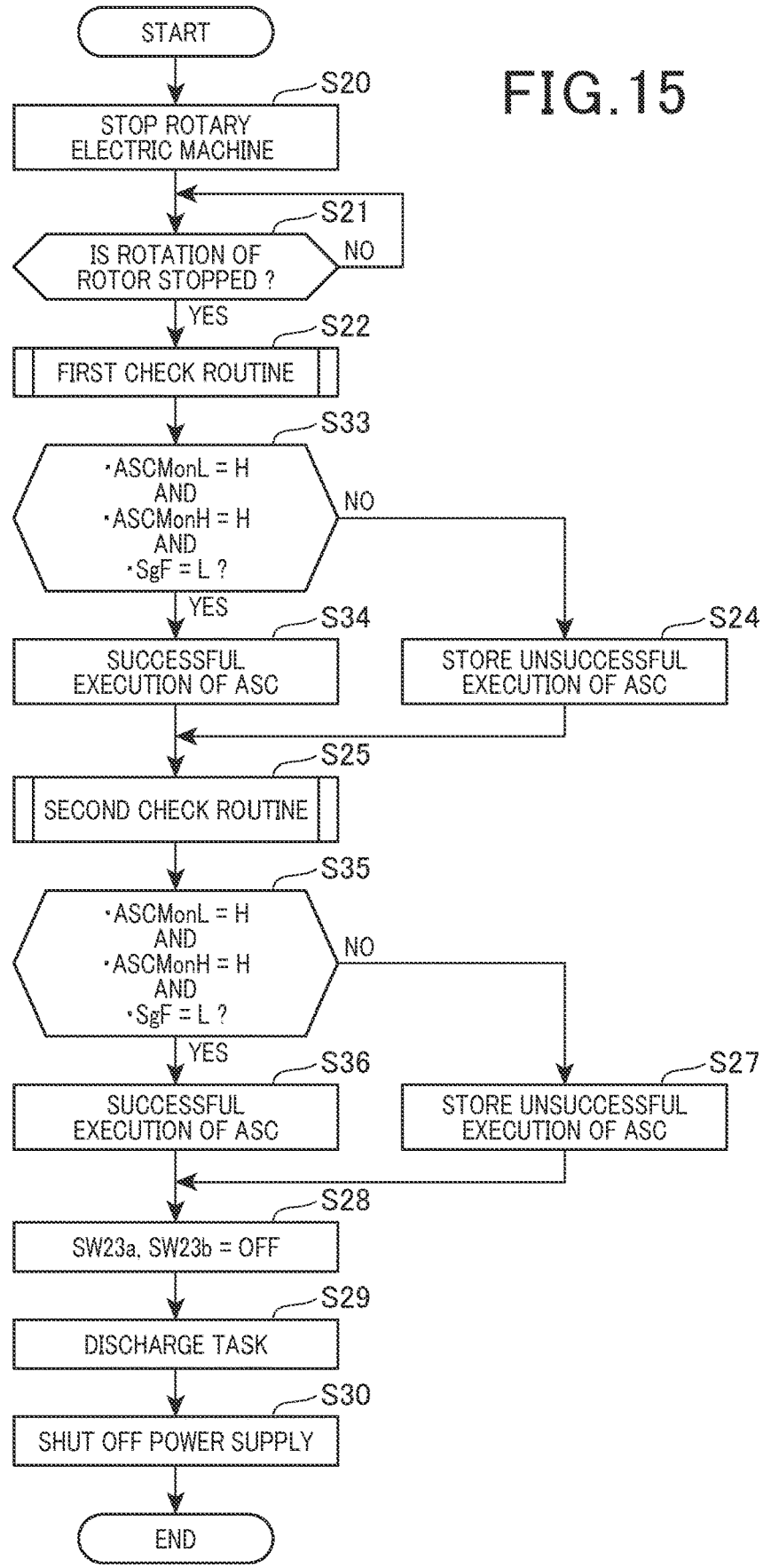
FIG. 15 is a flowchart schematically illustrating a check routine for checking whether successful execution of the three-phase short-circuit control routine is ensured according to the third embodiment.

The following describes a check routine for checking whether successful execution of the three-phase short-circuit control routine is ensured with reference to FIG. 15. Identical step numbers are assigned in FIGS. 9 and 15 to respective identical operations between the check routines illustrated in respective FIGS. 9 and 15.

Figure 16:
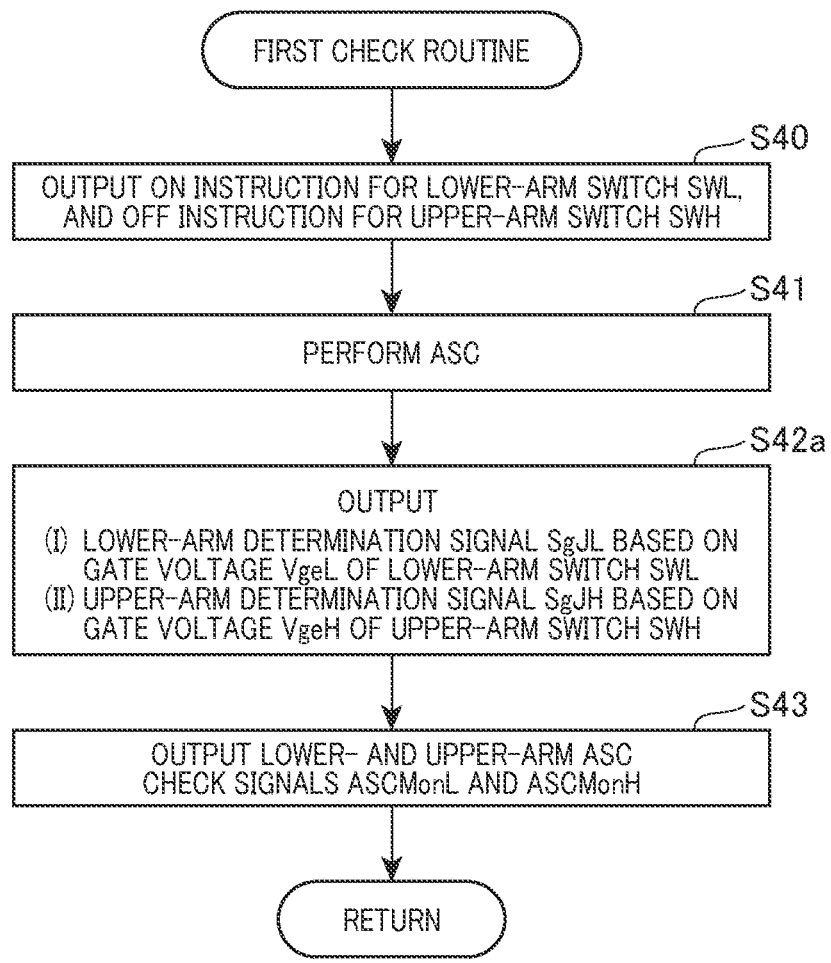
FIG. 16 is a flowchart schematically illustrating a first check routine included in the check routine illustrated in FIG. 15.

In step S22, the control circuit 50 performs a first check routine, which is illustrated in FIG. 16. Identical step numbers are assigned in FIGS. and 16 to respective identical operations between the first check routines illustrated in respective FIGS. 10 and 16.

In step S42a, each lower-arm determiner 112 determines whether the gate voltage VgeL of the corresponding lower-arm switch SWL is higher than or equal to the predetermined on-determination voltage Vjon. Each lower-arm determiner 112 sets the logical level of the lower-arm determination signal SgJL to the high level upon determination that the gate voltage VgeL of the corresponding lower-arm switch SWL is higher than or equal to the predetermined on-determination voltage Vjon. Otherwise, each lower-arm determiner 112 sets the logical level of the lower-arm determination signal SgJL to the low level upon determination that the gate voltage VgeL of the corresponding lower-arm switch SWL is lower than the predetermined on-determination voltage Vjon.

In step S42a, each upper-arm determiner 132 determines whether the gate voltage VgeH of the corresponding upper-arm switch SWH is lower than or equal to the predetermined off-determination voltage Vjoff. Each upper-arm determiner 132 sets the logical level of the upper-arm determination signal SgJH to the high level upon determination that the gate voltage VgeH of the corresponding upper-arm switch SWH is lower than or equal to the predetermined off-determination voltage Vjoff. Otherwise, each upper-arm determiner 132 sets the logical level of the upper-arm determination signal SgJH to the low level upon determination that the gate voltage VgeH of the corresponding upper-arm switch SWH is higher than the predetermined off-determination voltage Vjoff.

In step S33 of the check routine illustrated in FIG. 15, the microcomputer 60 determines whether successful execution of the three-phase short-circuit control routine is ensured in accordance with (i) the lower- and upper-arm ASC check signals ASCMonL and ASCMonH and (ii) the failure information signal SgF stored in the memory 60a.

Specifically, the microcomputer 60 determines that successful execution of the three-phase short-circuit control routine is ensured in step S34 upon determination that
(1) The logical level of the lower-arm ASC check signal ASCMonL is the high level
(2) The logical level of the upper-arm ASC check signal ASCMonH is the high level
(3) The logical level of the failure information signal SgF is the low level, which is a normally operation level Otherwise, the microcomputer 60 determines that successful execution of the three-phase short-circuit control routine is not ensured upon determination that at least one of the following conditions (I) to (III) is satisfied:
(I) The logical level of the lower-arm ASC check signal ASCMonL is the low level.
(II) The logical level of the upper-arm ASC check signal ASCMonH is the low level.
(III) The logical level of the failure information signal SgF is the high level.

The reason why the determination in step S33 uses the failure information signal SgF is because determination of whether successful execution of the three-phase short-circuit control routine is ensured is carried out using a result of normal control for adjusting the torque of the rotary electric machine 10 to a commanded value.

That is, the third embodiment does not use the output signal VcL outputted from each lower-arm voltage detector 111 for determining whether the corresponding lower-arm switch SWL is in the on state. For this reason, alternative information that ensures each lower-arm switch SWL being in the on state is needed. The third embodiment uses the failure information signal SgF as the alternative information. Because the low level of the failure information signal SgF represents that there are no failures in each lower-arm switch SWL during execution of the normal control of the rotary electric machine 10, it is possible to estimate that each lower-arm switch SWL can be driven in a desired on or off state. For this reason, using the failure information signal SgF in addition to the gate voltage VgeL of each lower-arm switch SWL enables whether each lower-arm switch SWL is switchable on to be ensured.

Additionally, the third embodiment does not use the output signal VcH outputted from each upper-arm voltage detector 131 for determining whether the corresponding upper-arm switch SWH is in the off state. For this reason, alternative information that ensures each upper-arm switch SWH being in the off state is needed. The third embodiment uses the failure information signal SgF as the alternative information. Because the low level of the failure information signal SgF represents that there are no failures in each upper-arm switch SWH during execution of the normal control of the rotary electric machine 10, it is possible to estimate that each upper-arm switch SWH can be driven in a desired on or off state. For this reason, using the failure information signal SgF in addition to the gate voltage VgeH of each upper-arm switch SWH enables whether each upper-arm switch SWH is switchable off to be ensured.

Figure 17:
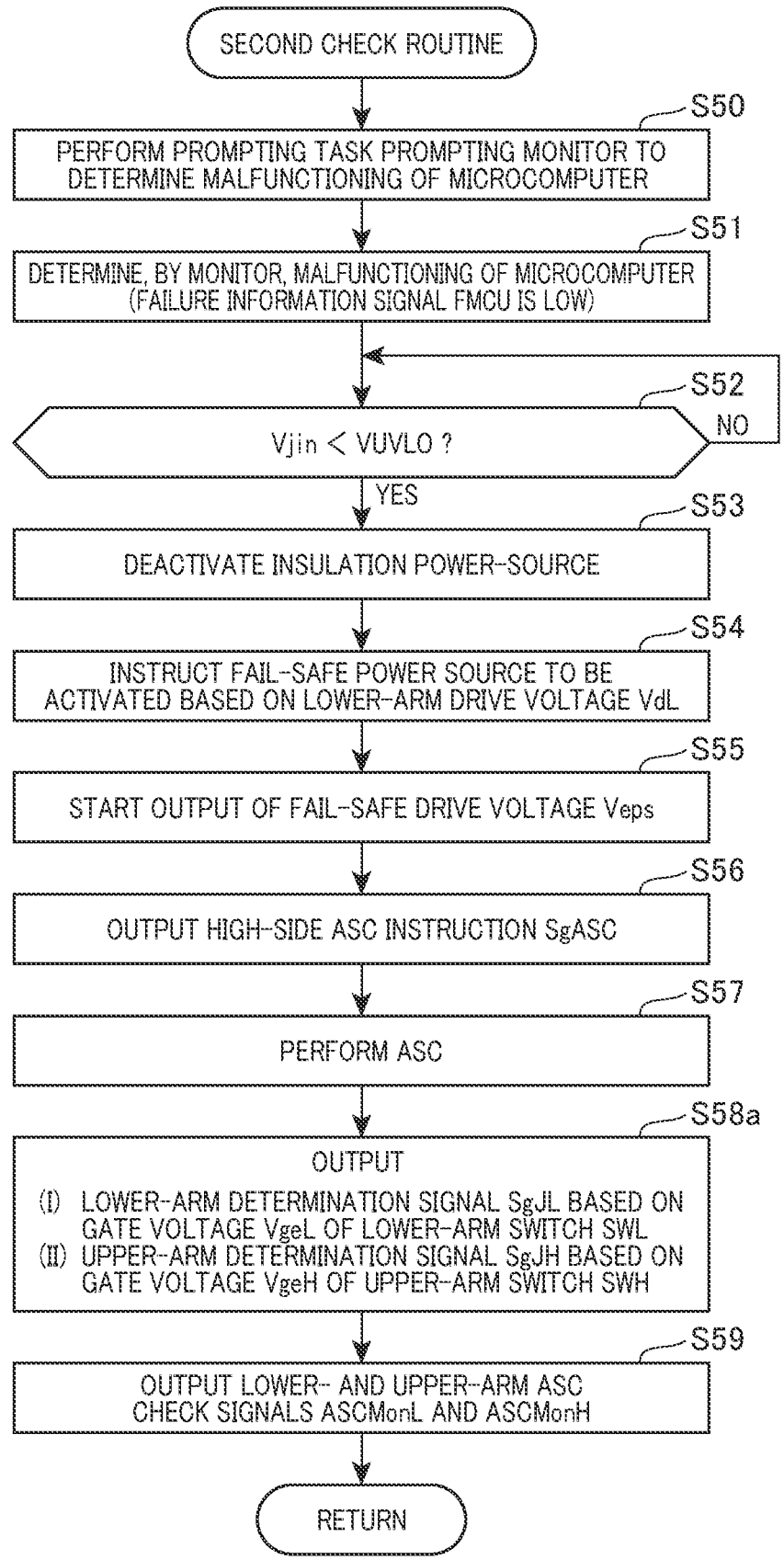
FIG. 17 is a flowchart schematically illustrating a second check routine included in the check routine illustrated in FIG. 15.

In step S25, the control circuit 50 performs a second check routine, which is illustrated in FIG. 17. Identical step numbers are assigned in FIGS. 11 and 17 to respective identical operations between the first check routines illustrated in respective FIGS. 11 and 17.

In step S58a, each lower-arm determiner 112 determines whether the gate voltage VgeL of the corresponding lower-arm switch SWL is higher than or equal to the predetermined on-determination voltage Vjon. Each lower-arm determiner 112 sets the logical level of the lower-arm determination signal SgJL to the high level upon determination that the gate voltage VgeL of the corresponding lower-arm switch SWL is higher than or equal to the predetermined on-determination voltage Vjon. Otherwise, each lower-arm determiner 112 sets the logical level of the lower-arm determination signal SgJL to the low level upon determination that the gate voltage VgeL of the corresponding lower-arm switch SWL is lower than the predetermined on-determination voltage Vjon.

In step S58a, each upper-arm determiner 132 determines whether the gate voltage VgeH of the corresponding upper-arm switch SWH is lower than or equal to the predetermined off-determination voltage Vjoff. Each upper-arm determiner 132 sets the logical level of the upper-arm determination signal SgJH to the high level upon determination that the gate voltage VgeH of the corresponding upper-arm switch SWH is lower than or equal to the predetermined off-determination voltage Vjoff. Otherwise, each upper-arm determiner 132 sets the logical level of the upper-arm determination signal SgJH to the low level upon determination that the gate voltage VgeH of the corresponding upper-arm switch SWH is higher than the predetermined off-determination voltage Vjoff.

In step S35 of the check routine illustrated in FIG. 15, the microcomputer 60 determines whether successful execution of the three-phase short-circuit control routine is ensured in accordance with (i) the lower- and upper-arm ASC check signals ASCMonL and ASCMonH and (ii) the failure information signal SgF stored in the memory 60a.

Specifically, the microcomputer 60 determines that successful execution of the three-phase short-circuit control routine is ensured in step S36 upon determination that
(1) The logical level of the lower-arm ASC check signal ASCMonL is the high level
(2) The logical level of the upper-arm ASC check signal ASCMonH is the high level
(3) The logical level of the failure information signal SgF is the low level, which is a normally operation level Otherwise, the microcomputer 60 determines that successful execution of the three-phase short-circuit control routine is not ensured upon determination that at least one of the following conditions (I) to (III) is satisfied:
(I) The logical level of the lower-arm ASC check signal ASCMonL is the low level.
(II) The logical level of the upper-arm ASC check signal ASCMonH is the low level.
(III) The logical level of the failure information signal SgF is the high level.

The reason why the determination in step S35 uses the failure information signal SgF is the same as that for step S33.

As described above, the microcomputer 60 according to the third embodiment is configured to determine whether successful execution of the three-phase short-circuit control routine is ensured in accordance with (1) The logical level of the lower-arm ASC check signal ASCMonL based on the gate voltage VgeL of each lower-arm switch SWL
(2) The logical level of the upper-arm ASC check signal ASCMonH based on the gate voltage VgeH of each upper-arm switch SWH
(3) The logical level of the failure information signal SgF obtained during execution of the normal control of the rotary electric machine 10

This configuration therefore makes it possible to determine whether successful execution of the three-phase short-circuit control routine is ensured while emitting, from the control circuit 50, any configuration required to detect the collector-emitter voltage VceH of each upper-arm switch SWH and the collector-emitter voltage VceL of each lower-arm switch SWL. That is, this configuration makes simpler the configuration of the control circuit 50 while ensuring that each of the upper- and lower-arm switches SWH and SWL can be driven in a desired on or off state.

Modification of the Third Embodiment

Any measure can be provided to reduce
(1) A lower-arm failure rate of the lower-arm switch configuration for each phase, which includes the lower-arm drive unit 82a, the lower-arm switch SWL, and an electrical path connecting between the gate of the lower-arm switch SWL and the lower-arm drive unit 82a
(2) An upper-arm failure rate of the upper-arm switch configuration for each phase, which includes the upper-arm drive unit 81a, the upper-arm switch SWH, and an electrical path connecting between the gate of the upper-arm switch SWH and the upper-arm drive unit 81a In this modification of the third embodiment, the microcomputer 60 can be configured to determine whether successful execution of the three-phase short-circuit control routine is ensured in accordance with only the logical level of the lower-arm ASC check signal ASCMonL based on the gate voltage VgeL of each lower-arm switch SWL and the logical level of the upper-arm ASC check signal ASCMonH based on the gate voltage VgeH of each upper-arm switch SWH without using the failure information signal SgF.

Fourth Embodiment

Figure 18:
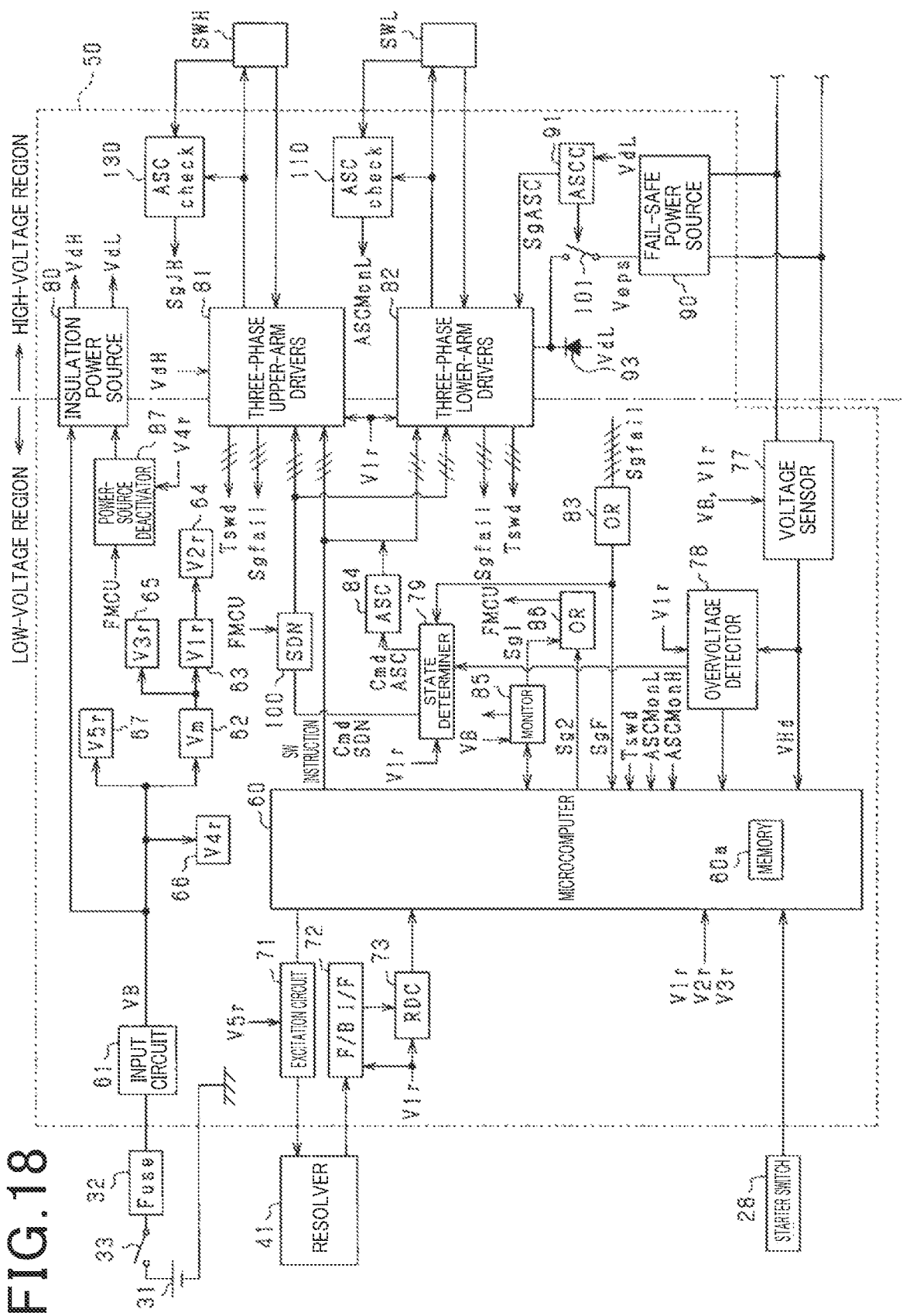
FIG. 18 is a circuit block diagram schematically illustrating the configurations of a control circuit and its peripheral components according to the fourth embodiment.
Figure 19:
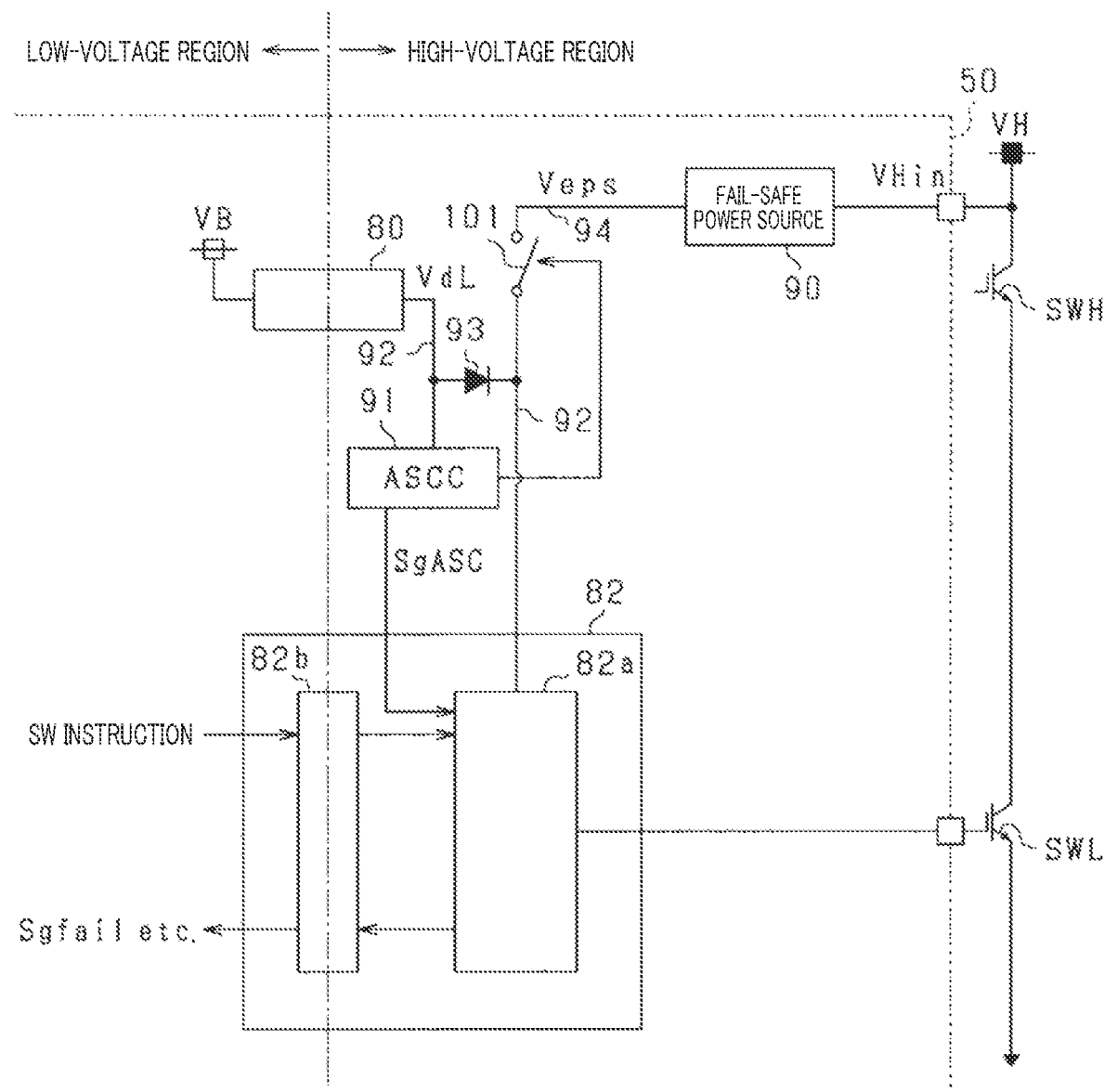
FIG. 19 is a circuit block diagram schematically illustrating the configurations of upper- and lower-arm drivers and their peripheral components according to the fourth embodiment.

The following describes the fourth embodiment of the present disclosure while focusing on different points of the fourth embodiment from the first to third embodiments with reference to FIGS. 18 to 20.

As illustrated in FIGS. 18 and 19, the configuration of one or more components of the control circuit 50 installed in each of the low- and high-voltage regions according to the fourth embodiment is changed from that according to the first embodiment. Identical reference characters are assigned in FIGS. 2 and 18 to respective identical components between the control circuits 50 illustrated in respective FIGS. 2 and 18. Similarly, identical reference characters are assigned in FIGS. 3 and 19 to respective identical components between the control circuits 50 illustrated in respective FIGS. 3 and 19.

Referring to FIG. 18, the control circuit 50 includes a shutdown instructor 100 installed in the low-voltage region thereof. The shutdown instructor 100 is comprised of a logic circuit to which the failure information signal FMCU is inputted from the OR circuit 86.

The shutdown instructor 100 is configured to perform, in response to change of the logical level of the inputted failure information signal FMCU from the low level to the high level, a shutdown control task of forcibly changing
(1) The switching instruction for each phase upper-arm driver 81 to the off instruction independently of whether the switching instruction inputted to each phase upper-arm driver 81 from the microcomputer 60 is the on instruction or the off instruction
(2) The switching instruction for each phase lower-arm driver 82 to the off instruction independently of whether the switching instruction inputted to each phase lower-arm driver 82 from the microcomputer 60 is the on instruction or the off instruction This configuration makes it possible to start the three-phase short-circuit control routine without waiting for decrease in the upper-arm drive voltage VdH. That is, this configuration starts the three-phase short-circuit control routine as immediately as possible after the occurrence of a failure in the control circuit 50.

As illustrated in FIG. 19, in place of the fail-safe diode 95, a fail-safe switch 101 is provided on the fail-safe power path 94. The high-side ASC instructor 91 switches the fail-safe switch 101 from the off state to the on state upon determination that the measured lower-arm drive voltage VdL starts to fall. This results in the fail-safe power source 90 starting to output the fail-safe drive voltage Veps to each lower-arm drive unit 82a. That is, the high-side ASC instructor 91 can output the high-side ASC instruction SgASC to each lower-arm drive unit 82a immediately after the switching instruction is forcibly changed to the off instruction.

An input voltage VHin to the fail-safe power source 90 starts to rise from 0 V in response to turn-on of the first and second shutoff switches 23a and 23b.

The fail-safe power source 90 according to the fourth embodiment is configured to activate at a timing when the input voltage VHin, which has started to rise, exceeds a predetermined reference voltage Vα during a predetermined period until the input voltage VHin reaches the terminal voltage VH across the smoothing capacitor 24, i.e., reaches the terminal voltage across the high-voltage power source 30. The reference voltage Vα is set to an activation voltage required for a controller of the fail-safe power source 90 to be activated. The activation voltage can be set to, for example, the predetermined cancel threshold for the low-voltage malfunction prevention task.

Next, the following describes how the fail-safe power source 90 works with reference to FIGS. 20A to 20F.

Figure 20A:
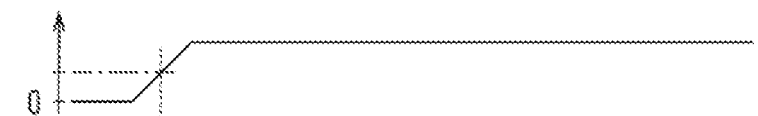
FIGS. 20A to 20F are a joint timing chart schematically illustrating how a fail-safe power source works.
Figure 20B:
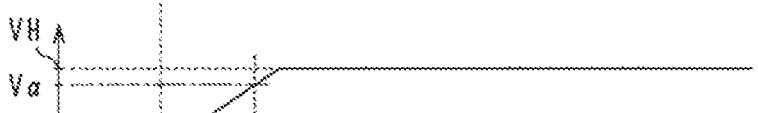
Figure 20C:
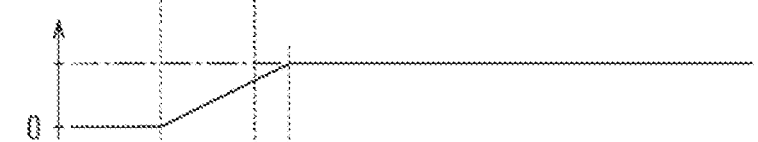

FIG. 20A represents how the output voltage VB of the input circuit 61 changes over time, FIG. 20B represents how the input voltage VHin to the fail-safe power source 90 changes over time, and FIG. 20C represents how the output voltage of each of the first to third low-voltage power supply circuits 63 to 65 changes over time.

Figure 20D:
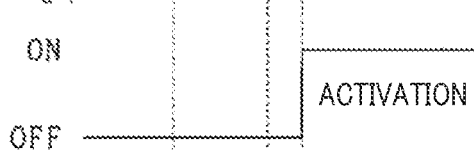
Figure 20E:
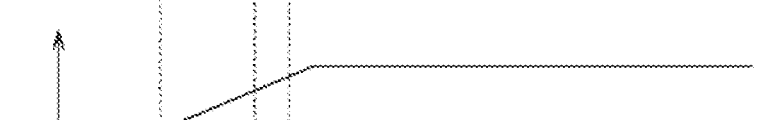
Figure 20F:
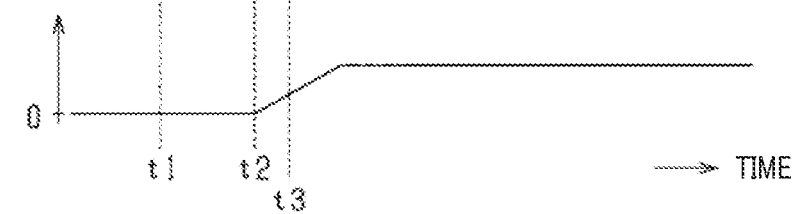

FIG. 20D represents how the operating state of the microcomputer 60 changes over time, FIG. 20E represents how the upper-arm drive voltage VdH and the lower-arm drive voltage VdL outputted from the insulation power source 80 change over time, and FIG. 20F represents how the output voltage Veps of the fail-safe power source 90 changes over time. Although the changes of the output voltages outputted from the respective first to third low-voltage power supply circuits 63 to 65 are actually different from one another, FIG. 20C shows the changes of the output voltages in an abbreviated form.

When the output voltage VB reaches a predetermined voltage at time t1, the output voltage of each of the first to third low-voltage power supply circuits 63 to 65 starts to rise at the time t1. After the first and second shutoff switches 23a and 23b are changed from the off state to the on state, the input voltage VHin to the fail-safe power source 90 exceeds the reference voltage Vα at time t2, resulting in the fail-safe power source 90 being activated. Thereafter, the microcomputer 60 is activated at time t3.

The above configuration of the control circuit 50 according to the fourth embodiment enables the fail-safe power source 90 to operate before the logical level of the failure information signal FMCU outputted from the OR circuit 86 is changed from the high level to the low level. Turning on the fail-safe switch 101 therefore enables the fail-safe power source 90 to output the fail-safe voltage Veps to each lower-arm drive unit 82a as immediately as possible, making it possible to immediately start the three-phase short-circuit control routine.

The above configuration that checks whether successful execution of the three-phase short-circuit control routine is ensured, which has been described in each of the first to third embodiments, can be applied to the fourth embodiment. In this application, the high-side ASC instructor 91 measures the lower-arm drive voltage VdL outputted from the insulation power source 80, and instructs the fail-safe switch 101 to be turned on after the measured lower-arm drive voltage VdL starts to fall in step S54 of FIG. 11. This results in the fail-safe power source 90 starting to output the fail-safe drive voltage Veps to each lower-arm driver 82 in step S55. The turn-on timing of the fail-safe switch 101 in step S54 can be carried out in the same operation in step S13 of FIG. 5.

Modifications of the Fourth Embodiment

The shutdown instructor 100 can be configured to forcibly change the switching instruction for any one of each upper-arm driver 81 and each lower-arm driver 82 to the off instruction. For example, the shutdown instructor 100 can be configured to forcibly change the switching instruction to only each upper-arm driver 81 to the off instruction, and turn on the three-phase lower-arm switches SWL using, as a trigger, a decrease in the lower-arm drive voltage VdL, which has been described in the first embodiment.

The shutdown instructor 100 can be configured to forcibly change the switching instruction to the off instruction using, as a trigger, another signal indicative of execution of the three-phase short-circuit control routine other than change of the logical level of the inputted failure information signal FMCU from the low level to the high level.

The fourth embodiment uses the shutdown instructor 100 as the configuration that forcibly turns off the upper-arm switches SWH, but the present disclosure is not limited thereto. Specifically, the fourth embodiment can be configured to stop the supply of the upper-arm drive voltage VdH to each upper-arm driver 81 to thereby forcibly turn off the corresponding upper-arm switch SWH, or transfer the off instruction to each upper-arm drive unit 81a through another insulation transfer unit, which differs from the upper-arm insulation transfer units 81b, to thereby forcibly turn off the corresponding upper-arm switch SWH.

Fifth Embodiment

Figure 21:
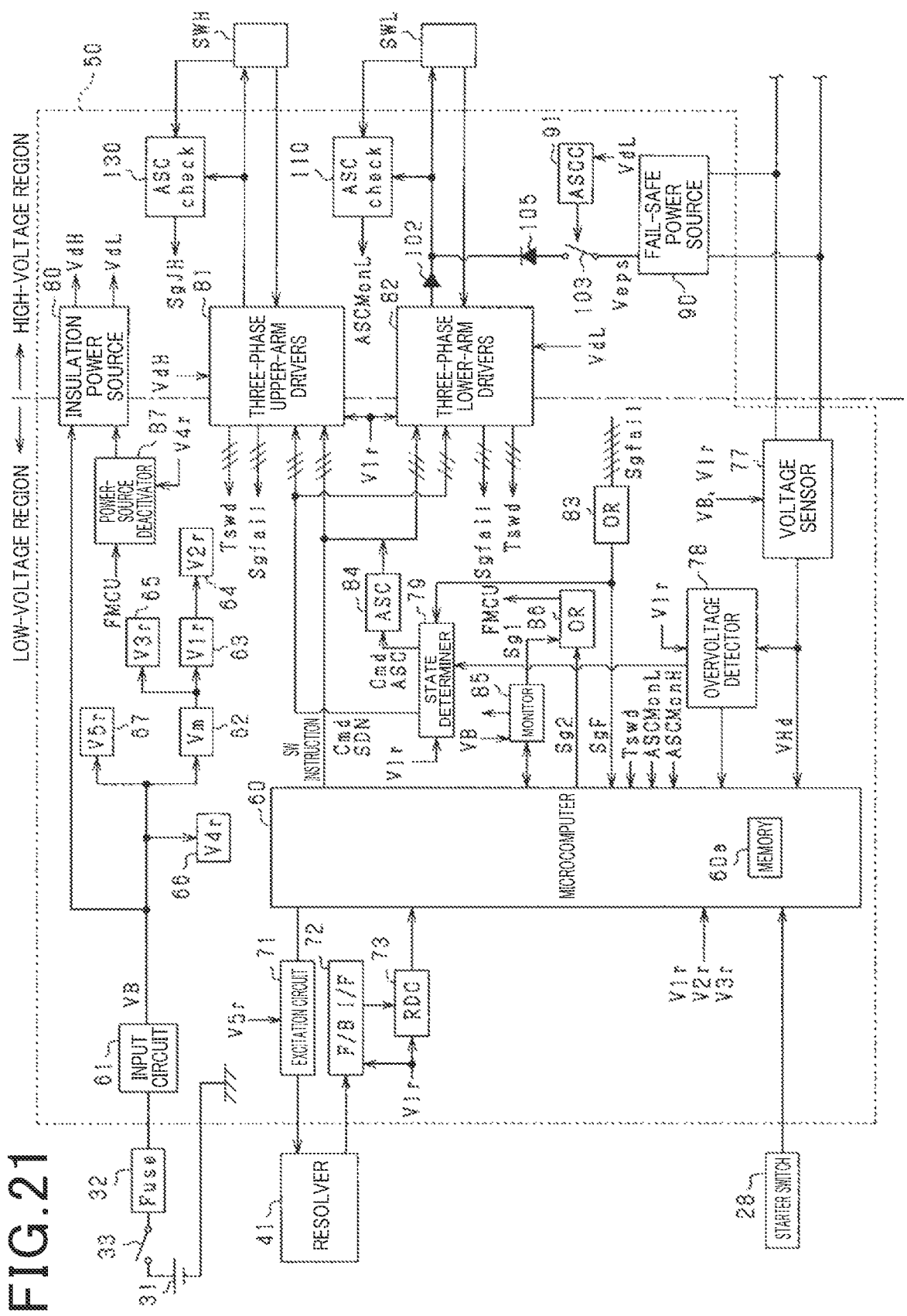
FIG. 21 is a circuit block diagram schematically illustrating the configurations of a control circuit and its peripheral components according to the fifth embodiment.
Figure 22:
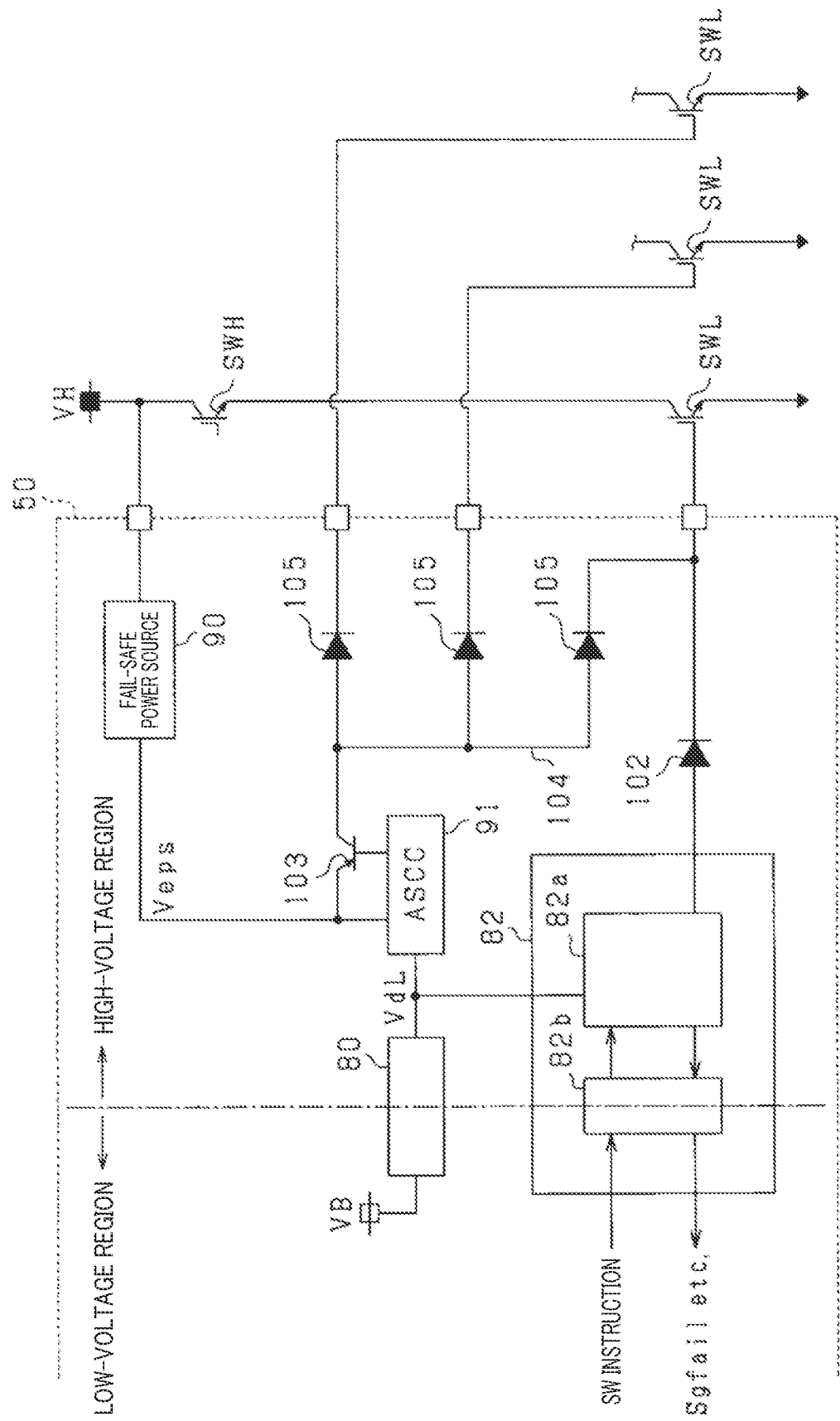
FIG. 22 is a circuit block diagram schematically illustrating the configurations of upper- and lower-arm drivers and their peripheral components according to the fifth embodiment.

The following describes the fifth embodiment of the present disclosure while focusing on different points of the fifth embodiment from the fourth embodiment with reference to FIGS. 21 and 22.

As illustrated in FIGS. 21 and 22, the configuration of one or more components of the control circuit 50 installed in each of the low- and high-voltage regions according to the fifth embodiment is changed from that according to the fourth embodiment in order to directly supply the fail-safe voltage Veps to the gate of each of the lower-arm switches SWL. Identical reference characters are assigned in FIGS. 18 and 21 to respective identical components between the control circuits 50 illustrated in respective FIGS. 18 and 21. Similarly, identical reference characters are assigned in FIGS. 19 and 22 to respective identical components between the control circuits 50 illustrated in respective FIGS. 19 and 22. The timing to activate the fail-safe power source 90 according to the fifth embodiment is set to be identical to that according to the fourth embodiment.

In the low-voltage region of the control circuit 50, the shutdown instructor 100 is eliminated.

Referring to FIGS. 21 and 22, the control circuit 50 includes first control diodes 102. Each of the first control diodes 102 is provided on, for example, a corresponding one of gate charge paths; each of the gate charge paths connects between the gate of the corresponding one of the lower-arm switches SWL and the corresponding one of the lower-arm drive units 82a. Each first control diode 102 is provided on the corresponding gate charge path with the anode connected to the corresponding lower-arm drive unit 82a. In FIG. 22, illustration of gate discharge paths of the respective lower-arm switches SWL is omitted.

The control circuit 50 includes a fail-safe switch 103. The fail-safe switch 103 connecting between the output terminal of the fail-safe power source 90 and a common path 104.

The control circuit 50 includes second control diodes 105, and the gates of the lower-arm switches SWL are connected to the common path 104 through the respective second control diodes 105.

The high-side ASC instructor 91 instructs the fail-safe switch 103 to be turned on after the measured lower-arm drive voltage VdL starts to fall. This results in the fail-safe power source 90 directly supplying the fail-safe drive voltage Veps to the gate of each lower-arm switch SWL, making it possible to perform the three-phase short-circuit control routine. The turn-on timing of the fail-safe switch 103 can be identical to the turn-on timing of the fail-safe switch 101 according to the fourth embodiment.

The fifth embodiment, like the fourth embodiment, makes it possible to check whether successful execution of the three-phase short-circuit control routine is ensured.

Other Modifications

The above embodiments can be variably modified as follows:

The microcomputer 60 can be programmed to determine, for each of the first and second check routines, whether the three-phase lower-arm switches SWL are switchable to be on using the following method.

Specifically, the microcomputer 60 determines whether a final switching instruction to be transmitted from the low-voltage region thereof to each upper-arm switch SWH is the off instruction. The final switching instruction for each upper-arm switch SWH is obtained based on a logical operation of both (1) The switching instruction outputted from the microcomputer 60 to the corresponding upper-arm insulation transfer unit 81b (2) The shutdown instruction CmdSDN outputted from the state determiner 79 to the corresponding upper-arm insulation transfer unit 81b The microcomputer 60 determines that the three-phase lower-arm switches SWL are switchable to be on upon determination that (i) the final switching instruction is the off instruction and (ii) the failure information signal SgF stored in the memory 60a has the low level.

Because each upper-arm switch SWH is configured not to be turned on based on the fail-safe voltage Veps of the fail-safe power source 90, whether the components of the control circuit 50 installed in the high-voltage region thereof, which are required to turn off the upper-arm switches SWH, operate normally is ensured based on the failure information signal SgF.

Whether the components of the control circuit 50 installed in the low-voltage region thereof, which are required to turn off the upper-arm switches SWH, operate normally is ensured based on the final switching instruction to be transmitted from the low-voltage region of the control circuit 50.

The above method according to this modification therefore makes it possible to determine whether the three-phase lower-arm switches SWL are switchable to be on.

The above method according to this modification enables elimination of the upper-arm ASC check unit 130, the upper-arm AND circuit 133, and the upper-arm insulation transfer unit 140 from the control circuit 50.

In this modification, each upper-arm driver 81 can be configured to receive the switching instruction outputted from the microcomputer 60 thereto, and the shutdown instruction CmdSDN outputted from the state determiner 79 thereto. Then, each upper-arm driver 81 can be configured to calculate the final switching instruction for the corresponding upper-arm switch SWH based on the logical operation of both the received switching instruction and the received shutdown instruction CmdSDN, thus outputting the final switching instruction for the corresponding upper-arm switch SWH to the microcomputer 60.

Another signal can be used as the final switching instruction to be transmitted from the low-voltage region of the control circuit 50 to each upper-arm switch SWH. For example, if the switching instruction for each upper-arm switch SWH outputted from the microcomputer 50 is inputted to the state determiner 79, the output signal of the state determiner 79 for each upper-arm switch SWH can be used as the final switching instruction to be transmitted from the low-voltage region of the control circuit 50 to the corresponding upper-arm switch SWH.

For example, the microcomputer 60 and/or the state determiner 79, which substitute for the power source deactivator 87 and the high-side ASC instructor 91, can be configured to determine whether there is a failure in the power control system, and perform the three-phase short-circuit control routine upon determination that there is a failure in the power control system. That is, the microcomputer 60 and/or the state determiner 79 can have a failure determiner and a fail-safe controller.

As the fail-safe power source 90, a switched-mode power supply, such as an isolated switched-mode power supply a non-isolated switched-power supply, is used, but a power supply comprised of a series power supply or a power source comprised of Zener diodes can be used as the fail-safe power source 90.

As described in the nineteenth modification of the first embodiment, each of the second to the fifth embodiments can use a selected power supply circuit, which differs from the first low-voltage power supply circuit 63, in preparation for the occurrence of a coupler anomaly in the control circuit 50.

Specifically, the configuration according to this modification deactivates the insulation power source 80 in response to a decrease in the output voltage of the selected power supply circuit, and executes the three-phase short-circuit control routine even if there is a coupler anomaly in the control circuit 50.

As each upper-arm driver 81, a driver installed in only the high-voltage region of the controller 50 can be used. Similarly, as each lower-arm driver 82, a driver installed in only the high-voltage region of the controller 50 can be used.

A booster converter can be provided between the smoothing capacitor 24 and the first and second shutoff switches 23a and 23b in the configuration illustrated in FIG. 1.

As switches constituting the switch device 20, N-channel MOSFETs, each of which includes an intrinsic diode, can be used in place of IGBTs. In this modification, the drain of such a N-channel MOSFET corresponds to a high-potential terminal, and the source thereof corresponds to a low-potential terminal.

A switch of each arm for each phase, which constitutes the switch device 20, can be comprised of a combination of at least two switches connected in parallel to each other, a combination of at least one SiC switch and at least one Si switch connected in parallel to each other, or a combination of at least one IGBT and at least one MOSFET connected in parallel to each other.

Torque of the rotary electric machine 10 is not limited to the controlled variable of the rotary electric machine 10, and the rotational speed of the rotary electric machine 10 can be used as the controlled variable of the rotary electric machine 10.

The rotary electric machine 10 is not limited to a permanent magnet synchronous rotary electric machine, but can be designed as, for example, a wound-field synchronous rotary electric machine or an induction rotary electric machine. In addition, the rotary electric machine 10 is not limited to the one used as a main engine. The rotary electric machine 10 can be used for a variety of purposes, such as an assist motor of electrical power steering systems or as a motor constituting an electric compressor for air conditioning.

The control circuits and control methods described in the present disclosure can be implemented by a dedicated computer including a memory and a processor programmed to perform one or more functions embodied by one or more computer programs.

The control circuits and control methods described in the present disclosure can also be implemented by a dedicated computer including a processor comprised of one or more dedicated hardware logic circuits.

The control circuits and control methods described in the present disclosure can further be implemented by at least one dedicated computer comprised of a memory, a processor programmed to perform one or more functions embodied by one or more computer programs, and one or more hardware logic circuits.

The computer programs described in the present disclosure can be stored in a computer-readable non-transitory storage medium as instructions executable by a computer and/or a processor.

While illustrative embodiments of the present disclosure have been described herein, the present disclosure is not limited to the embodiments described herein or disclosed configurations, but includes various modifications and adaptations and/or alternations within the equivalent scope of the descriptions. Additionally, various combinations, embodiments, combinations to which only one element or plural elements have been added, or modified embodiments to which only one element or plural elements have been added are within the category or scope of the present disclosure.

What is claimed is:

1. A control circuit for a power converter applicable to a system in which a power storage unit and a rotary electric machine including multiphase windings are provided, and the power converter includes multiphase switch modules, each of the switch modules including a pair of an upper-arm switch and a lower-arm switch, the upper-arm switch and the lower-arm switch of each phase switch module being electrically connected to a corresponding one of the multiphase windings, the control circuit comprising: a switching instruction generator configured to generate switching instructions for the respective upper- and lower-arm switches for drive control of the rotary electric machine, each switching instruction instructing turn-on or turn-off of the corresponding switch; a switch driver configured to perform a drive operation that turns on or off the respective upper- and lower-arm switches based on the respective switching instructions; a failure determiner configured to determine whether there is a failure in the system; a fail-safe controller configured to perform, in response to determination that there is a failure in the system, a short-circuit control routine that: turns on predetermined turn-on arm switches; and turns off predetermined turn-off arm switches, the turn-on arm switches being one of (i) the upper-arm switches and (ii) the lower-arm switches, the turn-off arm switches being the other of (i) the upper-arm switches and (ii) the lower-arm switches; and an on determiner configured to: detect a drive state of each turn-on arm switch upon determination that the turn-on is instructed for the corresponding turn-on arm switch by the switching instruction generator; and determine, based on the drive state of each turn-on arm switch, whether the turn-on arm switches are switchable to be on in preparation for the short-circuit control routine performed by a short-circuit controller.

2. The control circuit according to claim 1, wherein:
each of the upper- and lower-arm switches has a high-potential terminal and a low-potential terminal; and
the on determiner is configured to detect, as the drive state of each turn-on arm switch, a potential difference between the high-potential terminal and the low-potential terminal of the corresponding turn-on arm switch.

3. The control circuit according to claim 1, wherein:
each of the upper- and lower-arm switches has a gate terminal; and
the on determiner is configured to detect, as the drive state of each turn-on arm switch, a voltage at the gate terminal of the corresponding turn-on arm switch.

4. The control circuit according to claim 3, further comprising:
a storage unit that stores information indicative of an occurrence of a failure in at least one of (i) the switch driver and (ii) at least one of the upper- and lower-arm switch during the drive operation of the switch driver, wherein:
the on determiner is configured to determine, based on the voltage at the gate terminal of each turn-on arm switch and the information stored in the storage unit, whether the turn-on arm switches are switchable to be on in preparation for the short-circuit control routine performed by the short-circuit controller.

5. The control circuit according to claim 3, further comprising:
a fail-safe power source configured to generate electrical power based on power supply from the power storage unit,
wherein:
the fail-safe controller is configured to perform the short-circuit control routine based on the electrical power generated by the fail-safe power source based on an operation of the switching instruction generator; and
the on determiner is configured to detect the drive state of each turn-on arm switch when the turn-on is instructed for the corresponding turn-on arm switch by the operation of the switching instruction generator.

6. The control circuit according to claim 5, wherein:
the system includes:
a high-voltage power source connected to the power converter through an electrical path; and
a shutoff switch provided on the electrical path and configured to electrically connect or shut off between the high-voltage power source and the power converter;
the power storage unit is connected to a point of the electrical path, the point being located to be closer to the power converter than the shutoff switch is; and
the turn-on is instructed to each turn-on arm switch by the operation of the switching instruction generator while the high-voltage power source is electrically connected to the power converter.

7. The control circuit according to claim 5, further comprising:
a power source configured to generate electrical power to be supplied to the gate terminal of each turn-on arm switch,
wherein:
the failure determiner is configured to deactivate the power source upon determination that there is a failure in the system;
the fail-safe controller is configured to:
measure an output voltage of the power source; and
perform, based on the electrical power generated by the fail-safe power source, the short-circuit control routine after the measured output voltage starts to decrease; and
the on determiner is configured to perform a first routine and a second routine after the first routine,
the first routine being configured to:
detect the drive state of each turn-on arm switch irrespective of deactivation of the power source; and
determine, based on the drive state of each turn-on arm switch, whether the turn-on arm switches are switchable to be on in preparation for the short-circuit control routine performed by the short-circuit controller,
the second routine being configured to:
detect the drive state of each turn-on arm switch to which the turn-on is instructed in response to deactivation of the power source; and
determine, based on the drive state of each turn-on arm switch, whether the turn-on arm switches are switchable to be on in preparation for the short-circuit control routine performed by the short-circuit controller.

8. The control circuit according to claim 5, further comprising:
a monitor configured to monitor whether there is a failure in the switching instruction generator,
wherein:
the failure determiner is configured to deactivate the power source upon determination by the monitor that there is a failure in the switching instruction generator;
the fail-safe controller is configured to:
measure an output voltage of the power source; and
perform, based on the electrical power generated by the fail-safe power source, the short-circuit control routine after the measured output voltage starts to decrease;
the switching instruction generator is configured to perform a prompting task of prompting the monitor to determine that there is a failure therein; and
the on determiner is configured to detect the drive state of each turn-on arm switch to which the turn-on is instructed based on the prompting task of the switching instruction generator.

9. The control circuit according to claim 5, further comprising:
a discharge controller configured to:
cause the power storage unit to be discharged upon determination that a voltage across the power storage device is higher than or equal to a predetermined value; and
cause the fail-safe power source to start output of the electrical power upon determination that the voltage across the power storage device is lower than the predetermined value.

10. The control circuit according to claim 1, wherein:
the on determiner is configured to detect the drive state of each turn-on arm switch to which the turn-on is instructed while a rotor of the rotary electric machine is stopped.

11. The control circuit according to claim 1, further comprising:
an off determiner configured to:
detect a drive state of each turn-off arm switch; and
determine, based on the drive state of each turn-off arm switch, whether the turn-off arm switches are switchable to be off in preparation for the short-circuit control routine performed by the short-circuit controller.

12. A control circuit for a power converter applicable to a system in which a power storage unit and a rotary electric machine including multiphase windings are provided, and the power converter includes multiphase switch modules, each of the switch modules including a pair of an upper-arm switch and a lower-arm switch, the upper-arm switch and the lower-arm switch of each phase switch module being electrically connected to a corresponding one of the multiphase windings, the control circuit comprising: a switching instruction generator configured to generate switching instructions for the respective upper- and lower-arm switches for drive control of the rotary electric machine, each switching instruction instructing turn-on or turn-off of the corresponding switch; a switch driver configured to perform a drive operation that turns on or off the respective upper- and lower-arm switches based on the respective switching instructions; a failure determiner configured to determine whether there is a failure in the system; a fail-safe controller configured to perform, in response to determination that there is a failure in the system, a short-circuit control routine that: turns on predetermined turn-on arm switches; and turns off predetermined turn-off arm switches, the turn-on arm switches being one of (i) the upper-arm switches and (ii) the lower-arm switches, the turn-off arm switches being the other of (i) the upper-arm switches and (ii) the lower-arm switches; and an off determiner configured to: detect a drive state of each turn-off arm switch; and determine, based on the drive state of each turn-off arm switch, whether the turn-off arm switches are switchable to be off in preparation for the short-circuit control routine performed by a short-circuit controller.

13. The control circuit according to claim 12, wherein:
each of the upper- and lower-arm switches has a high-potential terminal and a low-potential terminal; and
the off determiner is configured to detect, as the drive state of each turn-off arm switch to which the turn-off is instructed for the corresponding turn-off arm switch, a potential difference between the high-potential terminal and the low-potential terminal of the corresponding turn-off arm switch.

14. The control circuit according to claim 12, wherein:
each of the upper- and lower-arm switches has a gate terminal; and
the off determiner is configured to detect, as the drive state of each turn-off arm switch to which the turn-off is instructed for the corresponding turn-off arm switch, a voltage at the gate terminal of the corresponding turn-off arm switch.

15. The control circuit according to claim 14, further comprising:
a storage unit that stores information indicative of an occurrence of a failure in at least one of (i) the switch driver and (ii) at least one of the upper- and lower-arm switch during the drive operation of the switch driver, wherein:
the off determiner is configured to determine, based on the voltage at the gate terminal of each turn-off arm switch and the information stored in the storage unit, whether the turn-off arm switches are switchable to be off in preparation for the short-circuit control routine performed by the short-circuit controller.

* * * * *